(12) United States Patent
Huang

(10) Patent No.: US 9,026,187 B2
(45) Date of Patent: May 5, 2015

(54) WIRELESS COMMUNICATION ACCESSORY FOR A MOBILE DEVICE

(71) Applicant: Mophie, Inc., Tustin, CA (US)

(72) Inventor: Daniel Huang, Irvine, CA (US)

(73) Assignee: Morphie, Inc., Tustin, CA (US)

( * ) Notice: Subject to any disclaimer, the term of this patent is extended or adjusted under 35 U.S.C. 154(b) by 0 days.

(21) Appl. No.: 14/014,095

(22) Filed: Aug. 29, 2013

(65) Prior Publication Data

US 2014/0065948 A1 Mar. 6, 2014

Related U.S. Application Data

(60) Provisional application No. 61/696,139, filed on Sep. 1, 2012.

(51) Int. Cl.
*H04M 1/00* (2006.01)
*H05K 5/00* (2006.01)
*H02J 7/02* (2006.01)
(Continued)

(52) U.S. Cl.
CPC .............. *H05K 5/0086* (2013.01); *H02J 7/025* (2013.01); *H02J 7/0045* (2013.01); *H02J 7/0047* (2013.01); *H04B 1/00* (2013.01)

(58) Field of Classification Search
CPC ................................ H05K 5/0086; H02J 7/025
USPC ................ 455/550.1, 556.1, 557, 573, 575.1, 455/575.8, 90.3, 41.1, 41.2, 41.3; 320/108, 320/115; 361/679.3, 679.03, 679.56
See application file for complete search history.

(56) References Cited

U.S. PATENT DOCUMENTS

D267,795 S 2/1983 Mallon
4,479,596 A 10/1984 Swanson
(Continued)

FOREIGN PATENT DOCUMENTS

CN 201252577 Y 6/2009
CN 202364273 U 8/2012
(Continued)

OTHER PUBLICATIONS

U.S. Appl. No. 14/187,046 Including its prosecution history, filed Feb. 21, 2014, To et al.
(Continued)

*Primary Examiner* — Ping Hsieh
(74) *Attorney, Agent, or Firm* — Knobbe, Martens, Olson & Bear LLP

(57) ABSTRACT

A mobile device peripheral that incorporates a repeater antenna inside of a protective case for a mobile device to extend the range of short-range communications while minimizing interference caused by the thickness or materials of the protective case. The repeater antenna can be capable of receiving a wireless signal from an antenna in the mobile device and transmitting the same signal or an amplified version of the same signal. The repeater antenna can be capable of receiving a wireless signal from an external antenna and transmitting the same signal or an amplified version of the same signal to the mobile device. The mobile device peripheral can also include a battery that provides additional power the mobile device. Without a repeater antenna, the materials and/or thickness of the additional battery and/or the case can partially or completely block a short-range, low-frequency, or low-power communication signal such as Near Field Communication (NFC).

27 Claims, 57 Drawing Sheets

(51) Int. Cl.
  *H02J 7/00* (2006.01)
  *H04B 1/00* (2006.01)

(56) References Cited

U.S. PATENT DOCUMENTS

| | | |
|---|---|---|
| 4,515,272 A | 5/1985 | Newhouse |
| D284,372 S | 6/1986 | Carpenter |
| 4,951,817 A | 8/1990 | Barletta et al. |
| D312,534 S | 12/1990 | Nelson et al. |
| 5,001,772 A | 3/1991 | Holcomb et al. |
| D322,719 S | 12/1991 | Jayez |
| D327,868 S | 7/1992 | Oka |
| 5,360,108 A | 11/1994 | Alagia |
| 5,368,159 A | 11/1994 | Doria |
| 5,383,091 A | 1/1995 | Snell |
| 5,386,084 A | 1/1995 | Risko |
| 5,508,123 A | 4/1996 | Fan |
| D372,896 S | 8/1996 | Nagele et al. |
| 5,586,002 A | 12/1996 | Notarianni |
| 5,604,050 A | 2/1997 | Brunette et al. |
| 5,610,979 A | 3/1997 | Yu |
| 5,708,707 A | 1/1998 | Halttunen et al. |
| 5,711,013 A | 1/1998 | Collett et al. |
| D392,248 S | 3/1998 | Johansson |
| D392,939 S | 3/1998 | Finke-Anlauff |
| 5,786,106 A | 7/1998 | Armani |
| 5,816,459 A | 10/1998 | Armistead |
| D400,495 S | 11/1998 | Deslyper et al. |
| 5,859,481 A | 1/1999 | Banyas |
| 5,864,766 A | 1/1999 | Chiang |
| D405,801 S | 2/1999 | Nagele et al. |
| D407,063 S | 3/1999 | Reis et al. |
| 5,876,351 A | 3/1999 | Rohde |
| D407,708 S | 4/1999 | Nagele et al. |
| 5,896,277 A | 4/1999 | Leon et al. |
| 5,959,433 A | 9/1999 | Rohde |
| 5,973,477 A | 10/1999 | Chang |
| D417,189 S | 11/1999 | Amero, Jr. et al. |
| 6,043,626 A | 3/2000 | Snyder et al. |
| D424,512 S | 5/2000 | Ho |
| 6,081,595 A | 6/2000 | Picaud |
| D428,019 S | 7/2000 | Amron |
| 6,082,535 A | 7/2000 | Mitchell |
| 6,171,138 B1 | 1/2001 | Lefebvre et al. |
| D438,004 S | 2/2001 | Watson et al. |
| 6,184,654 B1 | 2/2001 | Bachner, III et al. |
| D439,218 S | 3/2001 | Yu |
| 6,201,867 B1 | 3/2001 | Koike |
| 6,208,115 B1 | 3/2001 | Binder |
| D446,497 S | 8/2001 | Yu |
| 6,273,252 B1 | 8/2001 | Mitchell |
| 6,313,982 B1 | 11/2001 | Hino |
| 6,317,313 B1 | 11/2001 | Mosgrove et al. |
| 6,324,380 B1 | 11/2001 | Kiuchi et al. |
| 6,346,791 B1 | 2/2002 | Barguirdjian |
| 6,405,056 B1 | 6/2002 | Altschul et al. |
| D460,411 S | 7/2002 | Wang |
| D460,761 S | 7/2002 | Croley |
| 6,415,138 B2 | 7/2002 | Sirola et al. |
| 6,445,577 B1 | 9/2002 | Madsen et al. |
| 6,471,056 B1 | 10/2002 | Tzeng |
| D469,427 S | 1/2003 | Ma et al. |
| 6,536,589 B2 | 3/2003 | Chang |
| 6,538,413 B1 | 3/2003 | Beard et al. |
| D472,384 S | 4/2003 | Richardson |
| 6,552,513 B1 | 4/2003 | Li |
| 6,555,990 B1 | 4/2003 | Yang |
| 6,583,601 B2 | 6/2003 | Simoes et al. |
| 6,614,722 B2 | 9/2003 | Polany et al. |
| 6,626,362 B1 | 9/2003 | Steiner et al. |
| D481,716 S | 11/2003 | He et al. |
| D482,529 S | 11/2003 | Hardigg et al. |
| 6,646,864 B2 | 11/2003 | Richardson |
| D484,874 S | 1/2004 | Chang et al. |
| D485,834 S | 1/2004 | Davetas |
| 6,681,003 B2 | 1/2004 | Linder et al. |
| 6,701,159 B1 | 3/2004 | Powell |
| 6,708,887 B1 | 3/2004 | Garrett et al. |
| 6,714,802 B1 | 3/2004 | Barvesten |
| 6,819,549 B1 | 11/2004 | Lammers-Meis et al. |
| D500,041 S | 12/2004 | Tsujimoto |
| D506,612 S | 6/2005 | Rosa et al. |
| D508,495 S | 8/2005 | Bone et al. |
| D513,123 S | 12/2005 | Richardson et al. |
| 6,980,777 B2 | 12/2005 | Shepherd et al. |
| D513,451 S | 1/2006 | Richardson et al. |
| 6,992,461 B2 | 1/2006 | Liang et al. |
| D514,808 S | 2/2006 | Morine et al. |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| D517,007 S | 3/2006 | Yong-Jian et al. |
| D520,744 S | 5/2006 | Pangerc et al. |
| 7,050,841 B1 | 5/2006 | Onda |
| 7,069,063 B2 | 6/2006 | Halkosaari et al. |
| D525,582 S | 7/2006 | Chan |
| 7,072,699 B2 | 7/2006 | Eiden |
| 7,079,879 B1 | 7/2006 | Sylvester et al. |
| 7,081,736 B2 | 7/2006 | Seil et al. |
| D526,780 S | 8/2006 | Richardson et al. |
| D526,958 S | 8/2006 | Shimizu |
| D530,079 S | 10/2006 | Thomas et al. |
| D535,252 S | 1/2007 | Sandnes |
| 7,158,376 B2 | 1/2007 | Richardson et al. |
| 7,166,987 B2 | 1/2007 | Lee et al. |
| D537,063 S | 2/2007 | Kim et al. |
| 7,180,735 B2 | 2/2007 | Thomas et al. |
| 7,180,754 B2 | 2/2007 | Qin et al. |
| 7,194,291 B2 | 3/2007 | Peng |
| D540,539 S | 4/2007 | Gutierrez |
| 7,203,467 B2 | 4/2007 | Siddiqui |
| D542,286 S | 5/2007 | Taniyama et al. |
| D542,524 S | 5/2007 | Richardson et al. |
| D543,541 S | 5/2007 | Chung et al. |
| D544,486 S | 6/2007 | Hussaini et al. |
| 7,230,823 B2 | 6/2007 | Richardson et al. |
| D547,056 S | 7/2007 | Griffin et al. |
| D547,057 S | 7/2007 | Griffin et al. |
| D550,455 S | 9/2007 | Barnhart |
| D551,252 S | 9/2007 | Andre et al. |
| 7,266,391 B2 | 9/2007 | Warren |
| D551,856 S | 10/2007 | Ko et al. |
| D553,857 S | 10/2007 | Pendergraph et al. |
| D556,679 S | 12/2007 | Weinstein et al. |
| D556,681 S | 12/2007 | Kim |
| D557,205 S | 12/2007 | Kim et al. |
| D557,264 S | 12/2007 | Richardson et al. |
| D557,494 S | 12/2007 | Mayette et al. |
| D557,897 S | 12/2007 | Richardson et al. |
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin et al. |
| D560,229 S | 1/2008 | Yagi et al. |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |
| 7,428,427 B2 | 9/2008 | Brunstrom et al. |
| D577,904 S | 10/2008 | Sasaki |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |

(56) References Cited

U.S. PATENT DOCUMENTS

| | | |
|---|---|---|
| D584,732 S | 1/2009 | Cho et al. |
| 7,479,759 B2 | 1/2009 | Vilanov et al. |
| D587,008 S | 2/2009 | Richardson et al. |
| D587,896 S | 3/2009 | Aipa |
| D589,016 S | 3/2009 | Richardson et al. |
| 7,536,099 B2 | 5/2009 | Dalby et al. |
| D593,319 S | 6/2009 | Richardson et al. |
| D593,746 S | 6/2009 | Richardson et al. |
| D594,849 S | 6/2009 | Ko |
| 7,555,325 B2 | 6/2009 | Goros |
| D597,089 S | 7/2009 | Khan et al. |
| D597,301 S | 8/2009 | Richardson et al. |
| D598,407 S | 8/2009 | Richardson et al. |
| 7,577,462 B2 | 8/2009 | Kumar |
| D600,640 S | 9/2009 | Stein et al. |
| D600,908 S | 9/2009 | Richardson et al. |
| D601,955 S | 10/2009 | Ekmekdje |
| D601,959 S | 10/2009 | Lee et al. |
| D601,960 S | 10/2009 | Dai |
| 7,609,512 B2 | 10/2009 | Richardson et al. |
| D603,602 S | 11/2009 | Richardson et al. |
| D603,603 S | 11/2009 | Laine et al. |
| 7,612,997 B1 | 11/2009 | Diebel et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,782,610 B2 | 8/2010 | Diebel et al. |
| D623,179 S | 9/2010 | Richardson et al. |
| D623,180 S | 9/2010 | Diebel |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,908 S | 10/2010 | Huskinson |
| D624,909 S | 10/2010 | Huskinson |
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,568 S | 12/2010 | Richardson et al. |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| D636,386 S | 4/2011 | Richardson et al. |
| D636,387 S | 4/2011 | Willes et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |
| D637,591 S | 5/2011 | Willes et al. |
| D637,592 S | 5/2011 | Magness et al. |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,170 S | 7/2011 | Johnson et al. |
| D642,171 S | 7/2011 | Melanson et al. |
| D642,558 S | 8/2011 | Magness et al. |
| D643,029 S | 8/2011 | Feng |
| D643,424 S | 8/2011 | Richardson et al. |
| D644,215 S | 8/2011 | Dong |
| D644,216 S | 8/2011 | Richardson et al. |
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D647,084 S | 10/2011 | Fathollahi |
| D647,108 S | 10/2011 | Lee |
| 8,028,794 B1 | 10/2011 | Freeman |
| 8,046,039 B2 | 10/2011 | Lee et al. |
| D648,714 S | 11/2011 | Jones, III et al. |
| D648,715 S | 11/2011 | Jones, III et al. |
| D648,716 S | 11/2011 | Jones, III et al. |
| D648,717 S | 11/2011 | Fahrendorff et al. |
| D649,143 S | 11/2011 | Jones, III et al. |
| D649,539 S | 11/2011 | Hong |
| D650,810 S | 12/2011 | Lemelman et al. |
| D652,827 S | 1/2012 | Fahrendorff et al. |
| D652,828 S | 1/2012 | Fahrendorff et al. |
| D653,202 S | 1/2012 | Hasbrook et al. |
| D653,659 S | 2/2012 | Fahrendorff et al. |
| D654,069 S | 2/2012 | Kwon |
| D654,483 S | 2/2012 | Richardson et al. |
| D654,931 S | 2/2012 | Lemelman et al. |
| D655,281 S | 3/2012 | Turocy |
| D655,699 S | 3/2012 | Bau |
| D656,495 S | 3/2012 | Andre et al. |

(56) References Cited

U.S. PATENT DOCUMENTS

| | | |
|---|---|---|
| D658,165 S | 4/2012 | Freeman |
| 8,150,485 B2 | 4/2012 | Lee |
| D658,643 S | 5/2012 | Fahrendorff et al. |
| 8,167,127 B2 | 5/2012 | Martin et al. |
| D662,923 S | 7/2012 | Piedra et al. |
| D663,263 S | 7/2012 | Gupta et al. |
| D663,319 S | 7/2012 | Chen et al. |
| D664,091 S | 7/2012 | Pliner et al. |
| 8,224,408 B2 | 7/2012 | Tomasini et al. |
| D665,386 S | 8/2012 | Fathollahi |
| D665,735 S | 8/2012 | Kang et al. |
| 8,245,842 B2 | 8/2012 | Bau |
| 8,247,102 B2 | 8/2012 | Hua |
| D667,783 S | 9/2012 | Zhang et al. |
| D670,281 S | 11/2012 | Corpuz et al. |
| D670,689 S | 11/2012 | Wang |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 | 11/2012 | Kular et al. |
| 8,328,008 B2 | 12/2012 | Diebel et al. |
| D674,394 S | 1/2013 | Kajimoto |
| D675,603 S | 2/2013 | Melanson et al. |
| D676,032 S | 2/2013 | Stump et al. |
| D676,432 S | 2/2013 | Hasbrook et al. |
| 8,367,235 B2 | 2/2013 | Huang |
| 8,380,264 B2 | 2/2013 | Hung et al. |
| D677,249 S | 3/2013 | Li et al. |
| D678,869 S | 3/2013 | Diebel |
| 8,393,466 B2 | 3/2013 | Rayner |
| D679,271 S | 4/2013 | Liu |
| D679,684 S | 4/2013 | Baker et al. |
| D682,196 S | 5/2013 | Leung |
| 8,452,242 B2 | 5/2013 | Spencer, II |
| 8,457,701 B2 | 6/2013 | Diebel |
| D685,356 S | 7/2013 | Diebel |
| D686,152 S | 7/2013 | Lee et al. |
| D686,606 S | 7/2013 | Hong |
| 8,483,758 B2 | 7/2013 | Huang |
| D687,426 S | 8/2013 | Requa |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,531,833 B2 | 9/2013 | Diebel et al. |
| D691,990 S | 10/2013 | Rayner |
| 8,560,014 B1 | 10/2013 | Hu et al. |
| D693,801 S | 11/2013 | Rayner |
| 8,579,172 B2 | 11/2013 | Monaco et al. |
| D696,234 S | 12/2013 | Wright |
| D697,502 S | 1/2014 | Chu et al. |
| D704,688 S | 5/2014 | Reivo et al. |
| D710,795 S | 8/2014 | Gupta et al. |
| D711,312 S | 8/2014 | Tien |
| 2001/0054148 A1 | 12/2001 | Hoornaert et al. |
| 2002/0111189 A1 | 8/2002 | Chou |
| 2002/0147035 A1 | 10/2002 | Su |
| 2002/0197965 A1 | 12/2002 | Peng |
| 2003/0000984 A1 | 1/2003 | Vick, III |
| 2003/0096642 A1 | 5/2003 | Bessa et al. |
| 2003/0151890 A1 | 8/2003 | Huang et al. |
| 2003/0218445 A1 | 11/2003 | Behar |
| 2003/0228866 A1 | 12/2003 | Pezeshki |
| 2004/0096054 A1 | 5/2004 | Nuovo |
| 2004/0097256 A1 | 5/2004 | Kujawski |
| 2004/0104268 A1 | 6/2004 | Bailey |
| 2005/0090301 A1 | 4/2005 | Lange et al. |
| 2005/0093510 A1 | 5/2005 | Seil et al. |
| 2005/0116684 A1 | 6/2005 | Kim |
| 2005/0231159 A1 | 10/2005 | Jones et al. |
| 2005/0247787 A1 | 11/2005 | Von Mueller et al. |
| 2005/0248312 A1 | 11/2005 | Cao et al. |
| 2005/0286212 A1 | 12/2005 | Brignone et al. |
| 2006/0010588 A1 | 1/2006 | Schuster et al. |
| 2006/0052064 A1 | 3/2006 | Goradesky |
| 2006/0058073 A1 | 3/2006 | Kim |
| 2006/0063569 A1 | 3/2006 | Jacobs et al. |
| 2006/0099999 A1 | 5/2006 | Park |
| 2006/0105722 A1 | 5/2006 | Kumar |
| 2006/0105824 A1 | 5/2006 | Kim et al. |
| 2006/0125445 A1 | 6/2006 | Cao et al. |
| 2006/0205447 A1 | 9/2006 | Park et al. |
| 2006/0255493 A1 | 11/2006 | Fouladpour |
| 2007/0004450 A1 | 1/2007 | Parikh |
| 2007/0019804 A1 | 1/2007 | Kramer |
| 2007/0093140 A1 | 4/2007 | Begic et al. |
| 2007/0142097 A1 | 6/2007 | Hamasaki et al. |
| 2007/0152633 A1 | 7/2007 | Lee |
| 2007/0161404 A1 | 7/2007 | Yasujima et al. |
| 2007/0167190 A1 | 7/2007 | Moosavi et al. |
| 2007/0225031 A1 | 9/2007 | Bodkin et al. |
| 2007/0236180 A1 | 10/2007 | Rodgers |
| 2007/0261978 A1 | 11/2007 | Sanderson |
| 2007/0297149 A1 | 12/2007 | Richardson et al. |
| 2008/0007214 A1 | 1/2008 | Cheng |
| 2008/0026794 A1 | 1/2008 | Warren |
| 2008/0026803 A1 | 1/2008 | Demuynck |
| 2008/0032758 A1 | 2/2008 | Rostami |
| 2008/0053770 A1 | 3/2008 | Tynyk |
| 2008/0096620 A1 | 4/2008 | Lee et al. |
| 2008/0108395 A1 | 5/2008 | Lee et al. |
| 2008/0119244 A1 | 5/2008 | Malhotra |
| 2008/0123287 A1 | 5/2008 | Rossell et al. |
| 2008/0132289 A1 | 6/2008 | Wood et al. |
| 2008/0150367 A1 | 6/2008 | Oh et al. |
| 2009/0009945 A1 | 1/2009 | Johnson et al. |
| 2009/0017883 A1 | 1/2009 | Lin |
| 2009/0051319 A1 | 2/2009 | Fang et al. |
| 2009/0069050 A1 | 3/2009 | Jain et al. |
| 2009/0073650 A1 | 3/2009 | Huang et al. |
| 2009/0096417 A1 | 4/2009 | Idzik et al. |
| 2009/0108800 A1 | 4/2009 | Woud |
| 2009/0111543 A1 | 4/2009 | Tai et al. |
| 2009/0114556 A1 | 5/2009 | Tai et al. |
| 2009/0117955 A1 | 5/2009 | Lo |
| 2009/0128092 A1 | 5/2009 | Woud |
| 2009/0143104 A1 | 6/2009 | Loh et al. |
| 2009/0144456 A1 | 6/2009 | Gelf et al. |
| 2009/0146898 A1* | 6/2009 | Akiho et al. .................. 343/787 |
| 2009/0160399 A1 | 6/2009 | Woud |
| 2009/0160400 A1 | 6/2009 | Woud |
| 2009/0181729 A1 | 7/2009 | Griffin, Jr. et al. |
| 2009/0186264 A1* | 7/2009 | Huang ............................ 429/96 |
| 2009/0205983 A1 | 8/2009 | Estlander |
| 2009/0247244 A1 | 10/2009 | Mittleman et al. |
| 2009/0284216 A1 | 11/2009 | Bessa et al. |
| 2009/0301289 A1 | 12/2009 | Gynes |
| 2009/0312058 A9 | 12/2009 | Wood et al. |
| 2009/0314400 A1 | 12/2009 | Liu |
| 2009/0325657 A1 | 12/2009 | Ramsdell et al. |
| 2010/0013431 A1 | 1/2010 | Liu |
| 2010/0022277 A1 | 1/2010 | An et al. |
| 2010/0026589 A1 | 2/2010 | Dou et al. |
| 2010/0048267 A1 | 2/2010 | Lin |
| 2010/0064883 A1 | 3/2010 | Gynes |
| 2010/0078343 A1 | 4/2010 | Hoellwarth et al. |
| 2010/0088439 A1 | 4/2010 | Ang et al. |
| 2010/0093412 A1* | 4/2010 | Serra et al. .................. 455/575.8 |
| 2010/0096284 A1 | 4/2010 | Bau |
| 2010/0113106 A1 | 5/2010 | Supran |
| 2010/0195279 A1 | 8/2010 | Michael |
| 2010/0200456 A1 | 8/2010 | Parkinson |
| 2010/0203931 A1 | 8/2010 | Hynecek et al. |
| 2010/0224519 A1 | 9/2010 | Kao |
| 2010/0243516 A1 | 9/2010 | Martin et al. |
| 2010/0302716 A1 | 12/2010 | Gandhi |
| 2010/0328203 A1 | 12/2010 | Hsu |
| 2011/0049005 A1 | 3/2011 | Wilson et al. |
| 2011/0055447 A1 | 3/2011 | Costa |
| 2011/0084081 A1 | 4/2011 | Chung et al. |
| 2011/0090626 A1 | 4/2011 | Hoellwarth et al. |
| 2011/0117974 A1 | 5/2011 | Spitalnik et al. |
| 2011/0136555 A1 | 6/2011 | Ramies et al. |
| 2011/0159324 A1 | 6/2011 | Huang et al. |
| 2011/0199041 A1 | 8/2011 | Yang |

(56) References Cited

U.S. PATENT DOCUMENTS

| | | | |
|---|---|---|---|
| 2011/0253569 A1 | 10/2011 | Lord | |
| 2011/0259664 A1 | 10/2011 | Freeman | |
| 2011/0287726 A1 | 11/2011 | Huang | |
| 2011/0297578 A1 | 12/2011 | Stiehl et al. | |
| 2012/0013295 A1 | 1/2012 | Yeh | |
| 2012/0071214 A1 | 3/2012 | Ash, Jr. et al. | |
| 2012/0088555 A1* | 4/2012 | Hu | 455/573 |
| 2012/0088558 A1 | 4/2012 | Song | |
| 2012/0122520 A1* | 5/2012 | Phillips | 455/556.2 |
| 2012/0161696 A1* | 6/2012 | Cook et al. | 320/108 |
| 2012/0209745 A1 | 8/2012 | Spencer, II | |
| 2012/0282977 A1 | 11/2012 | Haleluk | |
| 2012/0303520 A1 | 11/2012 | Huang | |
| 2013/0045775 A1 | 2/2013 | Heywood | |
| 2013/0084799 A1 | 4/2013 | Marholev et al. | |
| 2013/0189923 A1* | 7/2013 | Lewin | 455/41.1 |
| 2013/0273983 A1 | 10/2013 | Hsu | |
| 2013/0314880 A1 | 11/2013 | Sun et al. | |
| 2014/0165379 A1 | 6/2014 | Diebel et al. | |

FOREIGN PATENT DOCUMENTS

| | | | |
|---|---|---|---|
| CN | 202535667 U | 11/2012 | |
| CN | 302510329 S | 7/2013 | |
| CN | 302573150 | 9/2013 | |
| JP | 8-18637 | 1/1996 | |
| JP | 2000-175720 | 6/2000 | |
| KR | 10-2005002796 | 3/2005 | |
| KR | 10-2008-0017688 | 2/2008 | |
| KR | 20-2010-0005030 | 5/2010 | |
| KR | 10-2010-0132724 | 12/2010 | |
| KR | 1020100132724 | * 12/2010 | |
| KR | 10-2011-0005507 | 1/2011 | |
| KR | 30-0650361 | 7/2012 | |
| TW | D150044 | 11/2012 | |
| TW | D156538 | 10/2013 | |
| WO | WO 95/15619 | 6/1995 | |
| WO | WO 97/33497 | 9/1997 | |

OTHER PUBLICATIONS

U.S. Appl. No. 14/205,024 Including its prosecution history, filed Mar. 11, 2014, Huang et al.
U.S. Appl. No. 14/205,167 Including its prosecution history, filed Mar. 11, 2014, Huang et al.
U.S. Appl. No. 29/427,724 Including its prosecution history, filed Jul. 20, 2012, Brand et al.
U.S. Appl. No. 29/382,515 Including its prosecution history, filed Jan. 4, 2011, Gallouzi et al.
U.S. Appl. No. 29/423,032 Including its prosecution history, filed May 25, 2012, Hasbrook et al.
U.S. Appl. No. 29/406,346 Including its prosecution history, filed Nov. 11, 2011, Brand.
U.S. Appl. No. 29/423,026 Including its prosecution history, filed May 25, 2012, Hasbrook et al.
U.S. Appl. No. 29/433,665 Including its prosecution history, filed Oct. 3, 2012, Namminga et al.
U.S. Appl. No. 29/464,620 Including its prosecution history, filed Aug. 19, 2013, Tsai.
U.S. Appl. No. 29/438,697 Including its prosecution history, filed Nov. 30, 2012, Namminga et al.
U.S. Appl. No. 29/451,703 Including its prosecution history, filed Apr. 6, 2013, Tsai et al.
U.S. Appl. No. 29/435,908 Including its prosecution history, filed Oct. 3, 2012, To et al.
U.S. Appl. No. 29/435,907 Including its prosecution history, filed Oct. 30, 2012, To et al.
U.S. Appl. No. 29/438,877 Including its prosecution history, filed Dec. 4, 2012, To et al.
U.S. Appl. No. 29/440,062 Including its prosecution history, filed Dec. 18, 2012, To et al.
U.S. Appl. No. 29/478,391 Including its prosecution history, filed Jan. 3, 2014, Namminga et al.
U.S. Appl. No. 29/478,390 Including its prosecution history, filed Jan. 3, 2014, Dang et al.
U.S. Appl. No. 29/478,383 Including its prosecution history, filed Jan. 3, 2014, Dang et al.
U.S. Appl. No. 29/478,388 Including its prosecution history, filed Jan. 3, 2014.
U.S. Appl. No. 14/020,710 Including its prosecution history, filed Sep. 6, 2013, Diebel et al.
International Search Report and Written Opinion of the International Searching Authority for PCT/US2011/037244, dated Jul. 19, 2011.
International Preliminary Report on Patentability for PCT/US2011/037244, dated Nov. 29, 2012.
International Search Report and Written Opinion of the International Searching Authority for PCT/US2011/037249, dated Jul. 13, 2011.
International Preliminary Report on Patentability for PCT/US2011/037249, dated Nov. 29, 2012.
International Search Report and Written Opinion of the International Searching Authority for PCT/US2011/037254, dated Jul. 13, 2011.
International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone-5-5s/.
Jeremy Horwitz, "Mophie Juice Pack Plus for iPhone 5," dated May 21, 2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Jeremy Horwitz, "Kensington Mini Battery Pack and Charger for iPhone and iPod," dated May 16, 2008, http://www.ilounge.com/index.php/reviews/entry/kensington-mini-battery-pack-and-charger-for-iphone-and-ipod/.
Kensington Mini Battery Pack and Charger for iPhone and iPod, dated Sep. 30, 2008, 1 Page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the-gadgeteer.com/2008/06/16/richard_solo_backup_battery_for_iphone_ipod/.
Devin Coldewey, "Combination iPhone battery pack and flash from FastMac," dated Nov. 4, 2008, http://crunchgear.com/2008/11/04/combination-iphone-battery-pack-and-flash-from-fastmac/.
"Cheap DIY iPhone External Battery," dated Jul. 22, 2008, http://fastdad.wordpress.com/2008/07/22/cheap-diy-iphone-external-battery/.
Jeremy Horwitz, "iLuv i603 / i604 Rechargeable Lithium Polymer Batteries with Silicone Skin," dated Jun. 27, 2006, http://www.ilounge.com/index.php/reviews/entry/iluv-i603-rechargeable-lithium-polymer-battery-with-silicone-skin/.

(56) References Cited

OTHER PUBLICATIONS

Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.
"PowerSkin Samsung Galaxy S3 Case with Backup Battery," dated Aug. 19, 2012 , http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.
Reexamination Control No. 90/013,319 including its prosecution history, filing date Sep. 18, 2014, Huang et al.
U.S. Appl. No. 14/494,348 including its prosecution history, filed Sep. 23, 2014, Huang et al.
U.S. Appl. No. 14/517,492 including its prosecution history, filed Oct. 17, 2014, Huang et al.
U.S. Appl. No. 14/517,428 including its prosecution history, filed Oct. 17, 2014, Huang et al.
U.S. Appl. No. 14/330,613 Including its prosecution history, filed Jul. 14, 2014, Diebel et al.
U.S. Appl. No. 29/499,868 Including its prosecution history, filed Aug. 19, 2014, Mophie, Inc.

International Search Report and Written Opinion of the International Searching Authority for PCT/US2014/017781, dated Jun. 8, 2014.
International Search Report and Written Opinion of the International Searching Authority for PCT/US2014/023592, dated Aug. 28, 2014.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?.
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.
Jeremy Horowitz, "PhoneSuit Mili Power Pack for iPhone," Jan. 29, 2009, http://www.ilounge.com/index.php/reviews/entry/phonesuit-mili-power-pack-for-iphone/.
Jeremy Horowitz, "FastMac TruePower iV Universal Battery Charger," Dec. 11, 2008, http://www.ilounge.com/index.php/reviews/entry/fastmac-truepower-iv-universal-battery-charger/.
Jeremy Horowitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feb. 21, 2008.
AVR458: Charging Lithium-Ion Batteries with ATAVRBC100, which appear to include a date of Aug. 2008.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
*Case-Ari, LLC* v. *mStation, Inc.*, Case No. 1:2010-CV-01874 in the United States District Court for the Northern District of Georgia, filed Jun. 17, 2010 (Docket).
*Daniel Huang* v. *GC Technology, LLC*, Case No. CV10-4705 CAS (VBKx) in the United States District Court for the Central District of California, filed Jun. 24, 2010 (Docket).
*Hali-Power, Inc.* v. *mStation Corp.*, Case No. 1:2010-CV-00773 in the United States District Court for the Northern District of New York, filed Jun. 30, 2010 (Docket).
*Mophie, Inc.* v. *Loza & Loza, LLP*, Case No. SACV11-00539 DOC (MLGx) in the United States District Court for the Central District of California, filed Apr. 7, 2011 (Docket).
Mophie's Complaint, filed Apr. 7, 2011 in *Mophie, Inc.* v. *Loza & Loza, LLP*, Case No. SACV11-00539 DOC (MLGx) in the United States District Court for the Central District of California.
*Mophie, Inc.* v. *Foreign Trade Corporation*, Case No. 8:12-CV-00292-JST-RNB in the United States District Court for the Central District of California, filed Feb. 24, 2012 (Docket).

(56) References Cited

OTHER PUBLICATIONS

*Mophie, Inc.* v. *Kdlinks Inc.*, Case No. 2:2012-CV-02639 in the United States District Court for the Central District of California, filed Mar. 27, 2012 (Docket).
*Otter Products, LLC* v. *Mophie, LLC*, Case No. 1:2012-CV-01969 in the United States District Court for the District of Colorado, filed Jul. 27, 2012 (Docket).
Mophie's Answer, filed Oct. 15, 2012 in *Otter Products, LLC* v. *Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC* v. *Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC* v. *Mophie, LLC*, Case No. 1:2012-CV-01969 in the United States District Court for the District of Colorado.
Mophie's Claim Construction Brief, filed Jun. 14, 2013 in *Otter Products, LLC* v. *Mophie, LLC*, Case No. 1:2012-CV-01969 in the United States District Court for the District of Colorado.
Otter's Claim Construction Brief, filed Jun. 14, 2013 in *Otter Products, LLC* v. *Mophie, LLC*, Case No. 1:2012-CV-01969 in the United States District Court for the District of Colorado.
Mophie's Brief in Response to Otter's Claim Construction Brief, filed Jun. 24, 2013 in *Otter Products, LLC* v. *Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC* v. *Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC* v. *Mophie, LLC*, Case No. 1:2012-CV-01969 in the United States District Court for the District of Colorado.
Joint Claim Construction Statement, filed Jun. 26, 2013 in *Otter Products, LLC* v. *Mophie, LLC*, Case No. 1:2012-CV-01969 in the United States District Court for the District of Colorado.
*Incase Designs, Inc.* v. *Mophie, Inc.*, Case No. 3:2013-CV-00602 in the United States District Court for the Northern District of California, filed Feb. 12, 2013 (Docket).
Mophie's Amended Answer and Counterclaims, filed May 8, 2013 in *Incase Designs, Inc.* v. *Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc.* v. *Mophie, Inc.*, Case No. 3:2013-CV-00602 in the United States District Court for the Northern District of California.
Mophie's Reply in Support of Motion to Stay and Supporting Declaration, filed Sep. 3, 2103 in *Incase Designs, Inc.* v. *Mophie, Inc.*, Case No. 3:2013-CV-00602 in the United States District Court for the Northern District of California.
*Incase Designs, Inc.* v. *Mophie, Inc.*, Case No. 3:2013-CV-03356 in the United States District Court for the Northern District of California, filed Jul. 18, 2013 (Docket).
*Incase Designs, Corp.* v. *Mophie, Inc.*, Case No. 3:2013-CV-04314 in the United States District Court for the Northern District of California, filed Sep. 18, 2013 (Docket).
Mophie Motion 1—To Be Accorded Benefit, filed Nov. 20, 2013 in Patent Interference No. 105,946(RES).
Declaration of John Feland, Ph.D, In Support of Mophie Motion 1 to Be Accorded Benefit, dated Nov. 20, 2013, in Patent Interference No. 105,946(RES).
Mophie Motion 2—For Judgment that Incase's Involved Claims Are Unpatentable, filed Nov. 20, 2013 in Patent Interference No. 105,946(RES).
Declaration of John Feland, Ph.D, In Support of Mophie Motion 2 For Judgement That Incase's Involved Claims Are Unpatentable, dated Nov. 20, 2013, in Patent Interference No. 105,946(RES).
Incase Motion 1—Motion for Benefit, filed Nov. 20, 2013 in Patent Interference No. 105,946(RES).
Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc.* v. *Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc.* v. *Source Vista*, Case No. 8:13-CV-01321 in the United States District Court for the Central District of California.
Shah's Answer, Affirmative Defenses, and Counterclaims to Plaintiff's Fifth Amended Complaint, filed Sep. 24, 2014, in *Mophie, Inc.* v. *Source Vista*, Case No. 8:13-CV-01321 in the United States District Court for the Central District of California.
Expert Report of Dr. David Munson, dated Aug. 28, 2014, in *Mophie, Inc.* v. *Source Vista*, Case No. 8:13-CV-01321 in the United States District Court for the Central District of California.
Expert Report of John Feland, Ph.D, dated Aug. 28, 2014, in *Mophie, Inc.* v. *Source Vista*, Case No. 8:13-CV-01321 in the United States District Court for the Central District of California.
Rebutal Expert Report of John Feland, Ph.D, dated Sep. 25, 2014, in *Mophie, Inc.* v. *Source Vista*, Case No. 8:13-CV-01321 in the United States District Court for the Central District of California.
Rebutal Expert Report of Dr. David Munson, dated Sep. 25, 2014, in *Mophie, Inc.* v. *Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc.* v. *Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc.* v. *Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc.* v. *Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc.* v. *Source Vista*, Case No. 8:13-CV-01321 in the United States District Court for the Central District of California.
John Feland, Ph.D. Deposition Transcript, dated Sep. 30, 2014, in *Mophie, Inc.* v. *Source Vista*, Case No. 8:13-CV-01321 in the United States District Court for the Central District of California.
Matthew Brand Deposition Transcript, dated Jul. 23, 2014, in *Mophie, Inc.* v. *Source Vista*, Case No. 8:13-CV-01321 in the United States District Court for the Central District of California.
Dharmesh Shah Deposition Transcript, dated Jul. 11, 2014, in *Mophie, Inc.* v. *Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc.* v. *Source Vista*, Case No. 8:13-CV-01321 in the United States District Court for the Central District of California.

(56) References Cited

OTHER PUBLICATIONS

Memorandum of Points and Authorities in Support of Mophie's Motion for Summary Judgment, filed Sep. 22, 2014, in *Mophie, Inc. v. Source Vista*, Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc. v. Source Vista*, Case No. 8:13-CV-01321 in the United States District Court for the Central District of California.
Mophie's Opposition to Shah and Serve Global's Motion for Partial Summary Judgment, dated Oct. 3, 2014, in *Mophie, Inc. v. Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc. v. Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc. v. Source Vista*, Case No. 8:13-CV-01321 in the United States District Court for the Central District of California.
Defendants' Opposition to Plaintiffs Motion for Summary Judgment, filed Oct. 3, 2014, in *Mophie, Inc. v. Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie, Inc. v. Source Vista*, Case No. 8:13-CV-01321 in the United States District Court for the Central District of California.
David Munson Deposition Transcript, dated Sep. 29, 2014, in *Mophie, Inc. v. Source Vista*, Case No. 8:13-CV-01321 in the United States District Court for the Central District of California.
Mophie's First Amended Complaint, filed Jun. 25, 2014, in *Mophie, Inc. v. UNU Electronics Inc.*, Case No. 8:13-CV-01705 in the United States District Court for the Central District of California.
UNU's Answer and Counterclaims, filed Jul. 10, 2014, in *Mophie, Inc. v. UNU Electronics Inc.*, Case No. 8:13-CV-01705 in the United States District Court for the Central District of California.
Mophie's Responses to Defendant's Third Set of Interrogatories (No. 12), dated Aug. 21, 2014, in *Mophie, Inc. v. UNU Electronics Inc.*, Case No. 8:13-CV-01705 in the United States District Court for the Central District of California.
Mophie's Responses to Defendant's First set of Requests for Admissions (Nos. 1-46), dated Aug. 19, 2014, in *Mophie, Inc. v. UNU Electronics Inc.*, Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc. v. UNU Electronics Inc.*, Case No. 8:13-CV-01705 in the United States District Court for the Central District of California.
Request for Ex Parte Reexamination of U.S. Patent No. 8,367,235, filed Aug. 14, 2014.
Corrected Request for Ex Parte Reexamination of U.S. Patent No. 8,367,235, filed Sep. 18, 2014.
Declaration of John Feland, Ph.D. In Support of Mophie's Opposition to Defendants Motion for Partial Summary Judgment, filed Oct. 3, 2014, in *Mophie, Inc. v. Source Vista*, Case No. 8:13-CV-01321 in the United States District Court for the Central District of California.
LivingSocial's Reply in Support of Motion for Summary Judgment, Filed Oct. 10, 2014, in *Mophie, Inc. v. Source Vista*, Case No. 8:13-CV-01321 in the United States District Court for the Central District of California.
Defendants' Reply in Support of Motion for Partial Summary Judgment, Filed Oct. 10, 2014, in *Mophie, Inc. v. Source Vista*, Case No. 8:13-CV-01321 in the United States District Court for the Central District of California.
Reply in Support of Mophie's Motion for Summary Judgment, Filed Oct. 10, 2014, in *Mophie, Inc. v. Source Vista*, Case No. 8:13-CV-01321 in the United States District Court for the Central District of California.
Mophie's Reply to Counterclaims of LivingSocial, filed Oct. 14, 2014, in *Mophie, Inc. v. Source Vista*, Case No. 8:13-CV-01321 in the United States District Court for the Central District of California.
Mophie's Reply to Counterclaims of Shah, filed Oct. 14, 2014, in *Mophie, Inc. v. Source Vista*, Case No. 8:13-CV-01321 in the United States District Court for the Central District of California.
Defendant's Response to Mophie's Fourth Set of Interrogatories, dated Sep. 23, 2014, in *Mophie, Inc. v. UNU Electronics Inc.*, Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc. v. UNU Electronics Inc.*, Case No. 8:13-CV-01705 in the United States District Court for the Central District of California.
Defendant's Preliminary Claim Constructions and Extrinsic Evicence, dated Oct. 14, 2014, in *Mophie, Inc. v. UNU Electronics Inc.*, Case No. 8:13-CV-01705 in the United States District Court for the Central District of California.
Plaintiff Mophie's Opening Brief on Claim Construction, filed Oct. 29, 2014, in *Mophie, Inc. v. UNU Electronics Inc.*, Case No. 8:13-CV-01705 in the United States District Court for the Central District of California.
Declaration of John Feland, Ph.D. In Support of Plaintiff's Preliminary Claim Constructions, filed Oct. 29, 2014, in *Mophie, Inc. v. UNU Electronics Inc.*, Case No. 8:13-CV-01705 in the United States District Court for the Central District of California.
Supplemental Declaration of John Feland, Ph.D. in Support of Plaintiff's Claim Constructions, filed Oct. 29, 2014, in *Mophie, Inc. v. UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc. v. UNU Electronics Inc.*, Case No. 8:13-CV-01705 in the United States District Court for the Central District of California.
Transcript of Deposition of John Feland, dated Oct. 21, 2014, in *Mophie, Inc. v. UNU Electronics Inc.*, Case No. 8:13-CV-01705 in the United States District Court for the Central District of California.
Defendant's Opening Claim Construction Brief, dated Oct. 29, 2014, in *Mophie, Inc. v. UNU Electronics Inc.*, Case No. 8:13-CV-01705 in the United States District Court for the Central District of California.
Order Granting Request for Ex Parte Reexamination of U.S. Patent No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc. v. Source Vista*, Case No. 8:13-CV-01321 in the United States District Court for the Central District of California.
Mophie's Memorandum in Support of its Motion for Reconsideration, filed Nov. 19, 2014, in *Mophie, Inc. v. Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc. v. Source Vista*, Case No. 8:13-CV-01321 in the United States District Court for the Central District of California.
Order Denying Plantiff's Motion for Reconsideration, dated Nov. 21, 2014, in *Mophie, Inc. v. Source Vista*, Case No. 8:13-CV-01321 in the United States District Court for the Central District of California.

* cited by examiner

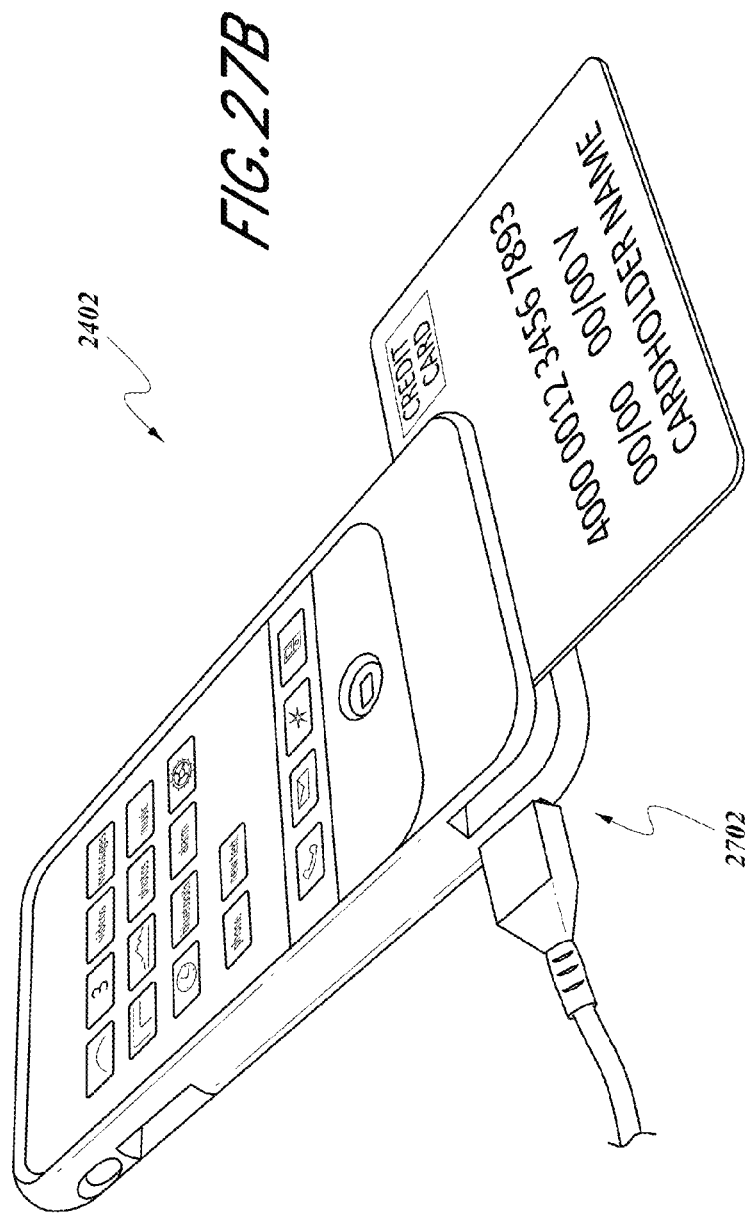

WIRELESS COMMUNICATION ACCESSORY FOR A MOBILE DEVICE

CROSS-REFERENCE TO RELATED APPLICATIONS

This application claims the benefit under 35 U.S.C. §119(e) of U.S. Provisional Patent Application No. 61/696,139, filed Sep. 1, 2012, and titled "WIRELESS COMMUNICATION REPEATER ANTENNA FOR A MOBILE DEVICE PERIPHERAL," the entirety of which is hereby incorporated by reference and made a part of this specification for all that it discloses.

INCORPORATION BY REFERENCE

The present Application incorporates by reference the following: U.S. patent application Ser. No. 12/357,262, entitled "BATTERY PACK, HOLSTER, AND EXTENDIBLE PROCESSING AND INTERFACE PLATFORM FOR MOBILE DEVICES," and filed Jan. 21, 2009, now U.S. Pat. No. 8,367,235, issued on Feb. 5, 2013; U.S. Provisional Patent Application No. 61/021,897, entitled "BATTERY PACK AND HOLSTER FOR MOBILE DEVICES," and filed Jan. 18, 2008; U.S. Provisional Patent Application 61/495,848, entitled "NEAR FIELD COMMUNICATION ACCESSORY FOR A MOBILE DEVICE," and filed Jun. 10, 2011; U.S. patent application Ser. No. 13/492,785, entitled "WIRELESS COMMUNICATION ACCESSORY FOR A MOBILE DEVICE," and filed Jun. 8, 2012, published as U.S. Patent Application Publication No. 2012/0303520 on Nov. 29, 2012; and U.S. Design Patent Application No. 29/427,724, entitled "MOBILE PHONE CASE," and filed Jul. 20, 2012.

BACKGROUND

1. Field of the Disclosure

Aspects of the present disclosure relate to accessories for mobile devices and, more particularly, to external protective cases and external battery packs for mobile electronic devices, where the external protective case/holster or external battery pack incorporates a repeater antenna.

2. Description of the Related Art

Many mobile devices (e.g., mobile phones, digital assistants, mobile communication devices, handheld computing devices, personal music/video/content players and storage devices) contain expensive, fragile equipment such as breakable glass touchscreens and lenses, easily scuffed decorative finishes, delicate internal electronic components, and easily broken or lost buttons or switches. People have also become more and more dependent on the data, contacts, and calendars stored in their mobile devices. These expensive devices and the stored critical data can be easily protected with an inexpensive protective case. Additionally these devices are often powered by battery power sources. Such battery power sources are often housed within the mobile device and may be changed and/or recharged as needed; some mobile devices have fully integrated batteries that cannot be swapped out. As more powerful mobile devices are designed and advanced apps (Geo-location, streaming video, device pairing, etc.) consume more and more power, the limited internal batteries face a losing battle, thereby shortening the time between charges, which limits the usefulness of a mobile device as a user is forced to locate a power source to recharge the battery source and wait until it is recharged.

Additionally, such mobile devices are typically designed to satisfy the needs of a wide array of consumers. For instance, such mobile devices may have somewhat limited processing capabilities (e.g., to extend battery power) and limited input/output capabilities. Consequently, users who wish to extend the capabilities of the mobile device to implement various types of solutions may be prevented from doing so by the battery life.

SUMMARY

Certain embodiments disclosed herein relate to mobile device accessories that extend the functionality and/or capabilities of mobile devices. For example, by supplying an external accessory containing an additional battery, more powerful devices and applications can be designed and used without the concern of regular power loss. The additional battery can be contained in an external case and can be electrically coupled through a wire or mounting system, but the additional battery can also be contained inside of another frequently used peripheral—a protective case. By incorporating an additional battery inside of a protective case for the mobile device, a user can reduce the number of peripherals to be carried at any one time and greatly increase the longevity of his or her mobile device by adding a little bit of extra thickness.

There is also a recent emphasis in modern mobile devices on short-range communication (e.g., for secure transactions). These can include a number of radio and infrared frequency communications such as those associated with NFC (Near Field Communication), Bluetooth®, Bluetooth® LE (low energy), 6LoWPAN (IPv6 over Low power Wireless Personal Area Network), ZigBee®, HSPA+(Evolved High-Speed Packet Access), UWB (Ultra-Wideband), Wireless USB, LTE (Long Term Evolution), GSM (Global System for Mobile Communications), WiMAX (Worldwide interoperability for Microwave Access), and EV-DO (Enhanced Voice-Data Optimized). These communications standards frequently, but not universally, communicate within the industrial, scientific, and medical radio bands as defined by the International Telecommunication Union Radiocommunication Sector's Radio Regulations. Some of these telecommunications standards, especially those with lower frequencies, have such a short effective range such that the thickness of a standard mobile device protective case could substantially dampen or interfere with the communication. For example, Near Field Communication (NFC) has a theoretical maximum effective range of approximately four centimeters; however the low-power implementation in many mobile devices has an effective range between about 1.0-2.5 centimeters.

In some embodiments, a mobile device peripheral for a mobile communication device is disclosed, comprising: a protective case and a repeater antenna. In some embodiments, the repeater antenna can be enclosed inside of the protective case. The repeater antenna can either include one or more passive antennas and/or one or more active antennas. In some embodiments, the repeater antenna comprises a first antenna electrically connected to a second antenna. Both antennas can be contained in one device, but the two antennas can also be located in separate peripherals that are capable of electrical coupling. The second antenna can transmit a signal received by the first antenna and vice versa. The second antenna can repeat (or re-transmit) a signal transmitted by the mobile device. In some embodiments, there can be one or more ferrite layers between the first antenna and the second antenna. The ferrite layers can be directly attached to one or both of the antennas (e.g., by adhesive sheets). The ferrite layers can block interference between the two antennas. Additionally the ferrite layers can increase the apparent magnetic depth of an antenna (e.g., a thin antenna), for example if the antenna is used as an inductor to induce a magnetic field from an electrical signal or to induce an electric signal from a magnetic field. In some embodiments, one or more insulating layers can be disposed between the first antenna and the second antenna. For example, there can be an insulating layer attached to the ferrite layer for one or both of the antennas. The insulating layer can be made of a thermoplastic such as Polyethylene Terephthalate; however other insulators may also be used. The ferrite layer can be made of Manganese-Zinc (Mn—Zn), sodium iron oxide (Na—Fe—O2), or some other ferrite material. The antenna can be simply and cheaply constructed using a flexible printed circuit (FPC).

In some embodiments, the mobile device peripheral can include a battery, e.g., in between the first antenna and the second antenna. Electrical insulating layers can be placed between one or more of the ferrite layers and the battery. In some embodiments, the battery is electrically insulated from the repeater antenna; however, in another embodiments, the battery can be used to amplify a signal received at one antenna to be more powerfully broadcast from the other antenna. In certain embodiments, the battery can 1) supply power to an attached mobile device, 2) amplify the signal from one or both of the antennas, or 3) both supply power to an attached mobile device and amplify the signal from one or both of the antennas. In some embodiments, the first antenna is not connected to the mobile device by an electrically conductive medium, and/or the second antenna is not connected to the mobile device by an electrically conductive medium.

The protective case can be made of one piece, two pieces, or more pieces that combine to protect the mobile device. For example, the protective case can be a single molded piece. In a three-piece embodiment, the protective case can include a first rigid portion and a second rigid portion that combine to partially enclose the mobile device and a flexible portion that stretches over the first rigid portion and second rigid portion. The three portions in combination can provide some protection from dust, liquid, and/or impact. In a two-piece embodiment, the protective case can include a first portion and a second portion. The first portion can include a back plane, a first sidewall connected to the back plane so that the first side wall can be positioned against or along a first side edge of the mobile device, and a second sidewall connected to the back plane (e.g., at an end generally opposite the first sidewall) such that the second sidewall can be positioned against or along a second side edge of the mobile device. The second portion can include a third sidewall that can be substantially perpendicular to the first sidewall and/or the second sidewall, and the third sidewall can be positioned against or along a third side edge of the mobile device when the second portion is seated against the first portion. The second portion can include an open side end generally opposite to the third sidewall, and the second portion can attach to the first portion through the open side end and when the second portion is seated against the first portion. The mobile device can be secured in place by at least the back plane, the first sidewall, the second sidewall, and/or the third sidewall, and the screen of the mobile device can remain visible when the mobile device is mounted into the case. In some embodiments, the mobile device peripheral can additionally include a processor, an external interface coupled to the processor, and an internal interface positioned to connect to a device interface on the mobile device and coupled to the processor. In some embodiments, the mobile device peripheral can further comprise a battery, and in some implementations the battery can be coupled to the processor. The battery can supply power to the mobile device (e.g., via an interface on the mobile device peripheral that is configured to couple to a device interface on the mobile device to provide an electrical connection between the battery and the mobile device). In some embodiments, the battery can amplify the signal transmitted by one or more of the antennas. In some embodiments, the repeater antenna is not connected to the mobile device by an electrically conductive medium. In some embodiments, the mobile device peripheral can include more than two coupled antennas, which—among other benefits—can allow short-range communication accessibility from multiple locations on the protective case. In some embodiments incorporating more than two coupled antennas, amplifying the signal through a power-source such as the battery can greatly improve functionality. The first antenna can be mounted to the back plane (e.g., so as to be opposite the mobile device). The mobile device peripheral can include an external wall on an opposite side of the peripheral from the back plane, and in some implementations, the second antenna can be mounted to the external wall.

In some embodiments, the antennas operate within the industrial, scientific and medical (ISM) radio bands as defined by the International Telecommunication Union Radiocommunication Sector's Radio Regulations. The ISM radio bands can include at least the frequencies shown below in Table 1. The repeater antenna can operate at a various frequencies or frequency ranges, e.g., frequency or frequency ranges associated with a center frequency of about 13.56 megahertz, with a center frequency of about 915 megahertz, with a center frequency of about 2.45 gigahertz, with a center frequency of about 5.8 gigahertz, with a center frequency of about, or with a center frequency of about 245 gigahertz, although various other frequencies or frequency ranges can be used (as shown in Table 1).

TABLE 1

| Frequency range | | Bandwidth | | Center frequency | |
|---|---|---|---|---|---|
| 6.765 | MHz | 6.795 | MHz | 30 KHz | 6.780 MHz |
| 13.553 | MHz | 13.567 | MHz | 14 KHz | 13.560 MHz |
| 26.957 | MHz | 27.283 | MHz | 326 KHz | 27.120 MHz |
| 40.660 | MHz | 40.700 | MHz | 40 KHz | 40.680 MHz |
| 433.050 | MHz | 434.790 | MHz | 1.84 MHz | 433.920 MHz |
| 902.000 | MHz | 928.000 | MHz | 26 MHz | 915.000 MHz |
| 2.400 | GHz | 2.500 | GHz | 100 MHz | 2.450 GHz |
| 5.725 | GHz | 5.875 | GHz | 150 MHz | 5.800 GHz |
| 24.000 | GHz | 24.250 | GHz | 250 MHz | 24.125 GHz |
| 61.000 | GHz | 61.500 | GHz | 500 MHz | 61.250 GHz |
| 122.000 | GHz | 123.000 | GHz | 1 GHz | 122.500 GHz |
| 244.000 | GHz | 246.000 | GHz | 2 GHz | 245.000 GHz |

The antennas can operate within the standards set for a number of radio and infrared frequency communications standards, for example, those standards associated with NFC (Near Field Communication), Bluetooth®, Bluetooth® LE (low energy), 6LoWPAN (IPv6 over Low power Wireless Personal Area Network), ZigBee®, etc. Some embodiments disclosed herein can be particularly beneficial for a short-range standard such as Near Field Communication (NFC). NFC can have a theoretical maximum range of approximately 4.0 centimeters, but mobile devices frequently have a more realistic maximum range of about 1.0-2.5 centimeters. With such a short maximum detection and communication range, a mobile device case can severely limit or completely block the mobile device antenna that is used to transmit and/or receive NFC signals. For example, the thickness of the case can impede the NFC antenna on the mobile device from coming into close enough proximity to receive and/or send NFC data. Also, the material of the case can interfere with, or otherwise impede, the NFC signal. In some embodiments, the case can include a battery or other electrical or mechanical components that can block, interfere with, or otherwise impede the NFC signal. By including a repeater antenna (e.g., inside of the protective case), the degrading influence of the case on the NFC signal can be reduced or eliminated. For example, the repeater antenna can include a first antenna disposed on a first side of the case near the mobile device and a second antenna disposed on a second side of the case that is further from the mobile device. When the mobile device transmits a signal, the first antenna can receive the signal, the signal can be relayed to the second antenna (e.g., via an electrical connection between the first and second antennas), and the second antenna can re-transmit the signal. When receiving a signal, the second antenna can receive the signal, the signal can be relayed to the first antenna, the first antenna can re-transmit the signal, and the antenna on the mobile device can receive the re-transmitted signal. Thus, in some embodiments, the range of the repeater antenna used together with the mobile device antenna can be calculated from the wall of the protective case rather than the wall of the mobile device. Although some embodiments disclosed herein are discussed in connection with Near Field Communication (NFC), the embodiments can also be used on connection with other signal types, ranges, and standards, even when not specifically stated.

Certain embodiments disclosed herein relate to a protective case for a mobile device. The protective case can include an internal cavity that partially encloses the mobile device when the mobile device is placed in the protective case. The protective case can include a back plane and at least two side walls, and an external back wall that is opposite the back plane. A first antenna can be mounted to the back plane and/or a second antenna can be mounted to the external back wall (e.g., to an inwardly facing inside surface of the external back wall).

The second antenna can be electrically connected to the first antenna. The first antenna can receive a signal from the mobile device and the second antenna can transmit the signal. The second antenna can repeat a signal transmitted by the mobile device. In some embodiments, the first antenna and/or the second antenna are not connected to the mobile device by an electrically conductive medium. The protective case can include a battery, and the battery can be located between the first antenna and the second antenna. Some embodiments can include an insulator layer between the first antenna and the battery.

Certain embodiments disclosed herein relate to a mobile device peripheral, which can include a first antenna, a second antenna that is electrically connected to the first antenna, and a third antenna that is electrically connected to the first antenna. In some embodiments, the first antenna can receive a first signal from a mobile device, the second antenna can transmit the first signal, and the third antenna can transmit the first signal. In some embodiments, the second antenna or the third antenna can receive a second signal, and the first antenna transmits the second signal (e.g., to the mobile device). The mobile device peripheral can include a power source, and the power source can amplify the first signal and/or the second signal. The power source can be a battery.

Certain embodiments disclosed herein relate to a method of transmitting a near field communication (NFC) signal from a mobile electronic device, which can be at least partially enclosed by a protective case. The method can include providing a mobile electronic device that is at least partially enclosed by a protective case and transmitting an NFC signal from the antenna of the mobile electronic device. The mobile electronic device can include a battery and an antenna configured to transmit near field communication (NFC) signals. The protective case can include a supplemental battery configured to charge the mobile electronic device. The protective case can include a repeater antenna that includes a first antenna disposed on a first side of the supplemental battery, a second antenna disposed on a second side of the supplemental battery, and an electrical connection that electrically couples the first antenna to the second antenna. The supplemental battery can be positioned to block or otherwise impede the NFC signal transmitted by the antenna on the mobile electronic device. The method can include includes receiving the NFC signal by the first antenna of the repeater antenna and relaying the NFC signal from the first antenna of the repeater antenna to the second antenna of the repeater antenna via the electrical connection. The method can include re-transmitting the NFC signal from the second antenna of the repeater antenna. In some embodiments, the re-transmitted signal from the second antenna can be the same as the signal from the antenna on the mobile electronic device, or the re-transmitted signal can be an amplified signal or other modified signal based on the signal received from the antenna on the mobile electronic device.

Certain embodiments disclosed herein relate to a method of receiving a near field communication (NFC) signal. The method can include providing a mobile electronic device that is at least partially enclosed by a protective case, as disclosed herein. The method can include receiving an incoming NFC signal by the second antenna of the repeater antenna, relaying the incoming NFC signal from the second antenna of the repeater antenna to the first antenna of the repeater antenna via the electrical connection, re-transmitting the NFC signal from the first antenna of the repeater antenna, and receiving the re-transmitted signal by the antenna of the mobile electronic device. In some embodiments, the re-transmitted signal from the first antenna can be the same as the signal received by the second antenna, or the re-transmitted signal can be an amplified signal or other modified signal based on the signal received by the second antenna.

Certain embodiments disclosed herein can relate to a protective case for a mobile electronic device. The protective case can include a housing that includes a cavity configured to at least partially enclose a mobile electronic device that has an antenna for transmitting and receiving signals from a rear of the mobile electronic device. The housing can include a back plane configured to be disposed rearward of the mobile electronic device. The protective case further include a battery inside the housing such that the battery is configured to be disposed rearward of the mobile electronic device. A first antenna can be disposed on a first side of the battery (e.g., facing forward) and configured to receive signals from, and transmit signals to, the antenna of the mobile electronic device. A second antenna can be disposed on a second side of the battery (e.g., facing rearward). The protective case can include an electrical connection that electrically couples the first antenna to the second antenna, and the electrical connection can be configured to communicate signals between the first antenna and the second antenna. The first antenna can be configured to re-transmit signals received by the second antenna, and the second antenna can be configured to re-transmit signals received by the first antenna. The re-transmitted signals can be the same as the received signals, or the re-transmitted signals can be amplified signals or other modified signals that are based on the received signals.

In some embodiments, a mobile electronic device can be at least partially enclosed by the housing of the protective case. The mobile electronic device can include an antenna for transmitting and receiving signals from a rear of the mobile electronic device, a battery, and a device interface. The protective case can include an interface configured to couple to the device interface to provide an electrical connection for the battery of the protective case to charge the mobile electronic device. The mobile electronic device can be a mobile phone or a tablet computer.

In various embodiments disclosed herein, the protective case can include an interface configured to couple to a device interface on the mobile electronic device to provide an electrical connection for the battery of the protective case to charge the mobile electronic device.

In some embodiments, the first antenna and the second antenna can be formed on a flexible printed circuit board. A first ferrite layer can be disposed between the battery and the first antenna. A second ferrite layer can be disposed between the battery and the second antenna. The first antenna and the second antenna can be configured to receive and transits near field communication (NFC) signals.

Various embodiments disclosed herein can relate to a case for a mobile electronic device. The case can include a housing configured to removably couple to a mobile electronic device, a first antenna inside the housing, and a second antenna inside the housing and spaced apart from the first antenna. The case can include a communication link between the first antenna and the second antenna. The first antenna can be configured to emit a signal that is based at least in part on a signal received by the second antenna, or the second antenna can be configured to emit a signal that is based at least in part on a signal received by the first antenna.

In some embodiments, the case can include a battery, e.g., disposed between the first antenna and the second antenna. The case can include an interface configured to couple to a device interface on the mobile electronic device to provide an electrical connection for the battery of the protective case to charge the mobile electronic device. In some embodiments, an air gap can be disposed between the first antenna and the second antenna. One or more insulating layers can be disposed between the first antenna and the second antenna. One or more ferrite layers can be disposed between the first antenna and the second antenna. A first ferrite layer can be disposed between the one or more insulating layers and the first antenna, and/or a second ferrite layer can be disposed between the one or more insulation layers and the second antenna. Some embodiments can include a battery disposed between the first antenna and the second antenna, and the one or more insulation layers can include a first insulating layer disposed between the battery and the first ferrite layer and/or a second insulating layer disposed between the battery and the second ferrite layer.

The first antenna and the second antenna can be positioned such that the first antenna is configured to be closer than the second antenna to the mobile electronic device, when the mobile electronic device is attached to the case.

In some embodiments, the case can include a battery configured to amplify the signal emitted by the first antenna or the signal emitted by the second antenna.

In some embodiments, the first antenna and the second antenna are configured to relay a signal for charging the mobile electronic device. A mobile electronic device can be coupled to the housing, and the mobile electronic device can include a mobile device antenna, a mobile device battery, and an electrical connection between the mobile device antenna and the mobile device battery. The second antenna can be configured to receive an input charging signal, and the first antenna can be configured to emit an output charging signal based at least in part on the input charging signal. The mobile device antenna can be configured to receive the output charging signal and to charge the mobile device battery via the electrical connection. In some embodiments, the signal for charging the mobile electronic device can include a magnetic field.

The case can include a third antenna in some implementations. A communication link can be included between the first antenna and the third antenna. The second antenna can be configured to emit a signal that is based at least in part on a signal received by the first antenna, and the third antenna can be configured to emit a signal that is based at least in part on a signal received by the first antenna.

Various embodiments can relate to a peripheral for a mobile electronic device. The peripheral can include a case configured to hold a mobile electronic device and a repeater antenna at least partially disposed inside the case.

The repeater antenna can include a first antenna disposed inside the case and a second antenna disposed in an additional peripheral separate from the case. Some embodiments can include a detachable electrical connector that electrically couples the first antenna to the second antenna when the electrical connector is attached. A battery can be disposed inside the case. In some embodiments the repeater antenna can include a first antenna on a first side of the battery and a second antenna on a second side of the battery.

In some embodiments, the repeater antenna can include a first antenna disposed inside the case, a second antenna disposed inside the case and spaced apart from the first antenna, and an electrical connection between the first antenna and the second antenna. The first antenna can be configured to emit a signal that is based at least in part on a signal received by the second antenna, and/or the second antenna can be configured to emit a signal that is based at least in part on a signal received by the first antenna.

In another aspect, an apparatus for repeating wireless signals of a mobile electronic device is disclosed herein. The apparatus can include a housing means for enclosing the mobile electronic device (e.g., which can include an antenna for transmitting and receiving the wireless signals, such as from a rear of the mobile electronic device). The apparatus can include first antenna means for transceiving the wireless signals from and to the antenna on the mobile electronic device. The apparatus can further include second antenna means for transceiving wireless signals outside the housing means. The apparatus can include connection means for coupling the first antenna means to the second antenna means.

Various features and elements listed above (and disclosed elsewhere herein) can be combined to form various combinations and subcombinations.

BRIEF DESCRIPTION OF THE DRAWINGS

FIGS. 27A and 27B illustrate perspective views of a mobile device housed within the casing of the payment processing accessory.

DETAILED DESCRIPTION OF CERTAIN EMBODIMENTS

Figure 1:
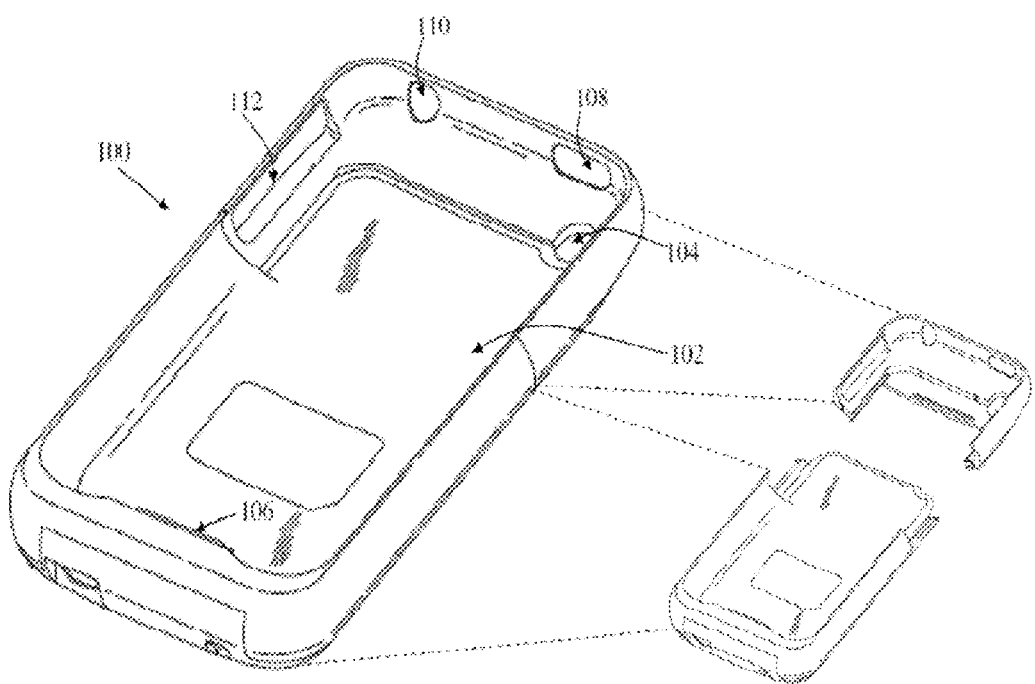
FIG. 1 illustrates a perspective view of a battery pack for a mobile device according to one example.

Hereinafter, certain exemplary embodiments according to the disclosed technology will be described with reference to the accompanying drawings, in which exemplary embodiments of the disclosed technology are shown. Like reference numerals designate like elements throughout the specification. As those skilled in the art would understand, the described embodiments may be modified in various different ways, all without departing from the spirit or scope of the disclosed technology. Thus, the drawings and description are to be regarded as illustrative in nature and not restrictive. In some cases, elements that are not essential to the complete understanding of the disclosed technology are omitted for clarity.

Since some of the sizes and thicknesses of constituent members shown in the accompanying drawings are arbitrarily given for better understanding and ease of description, the disclosed technology is not limited to the illustrated sizes and thicknesses. However, this disclosure includes various sizes, thickness, proportions, relative positions, etc. shown in the drawings.

In the drawings, the thickness of some layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it may be directly on the other element or intervening elements may also be present.

Throughout this specification and the claims that follow, when it is described that an element is "coupled" or "connected" to another element, the element may be directly coupled or directly connected to the other element, or the element may be indirectly coupled or indirectly connected to the other element, e.g., through a third element. In addition, unless explicitly described to the contrary, the word "comprise" and variations such as "comprises" or "comprising" will be understood to imply the inclusion of stated elements but not the exclusion of any other elements. Throughout this specification, it is understood that the term "on" and similar terms are used generally and are not necessarily related to a gravitational reference.

In the following detailed description, numerous specific details are set forth in order to provide a thorough understanding of the inventions. However, the inventions may be practiced without these specific details. In other instances, well known methods, procedures, and/or components have not been described in detail so as not to unnecessarily obscure aspects of the invention.

Various embodiments provide battery packs shaped to conform to the external shape of a mobile device, thereby providing a permanent or long-term replacement power source without significantly affecting the size and usability of the mobile device.

According to some embodiments, the battery pack can include a wireless communication module, which can be a Near Field Communication (NFC) interface. In this way, even non-NFC enabled mobile device could participate in NFC transactions. For the purpose of illustration, many of the figures and specific examples describe NFC modules; however, the disclosure includes not only NFC interfaces or even radio frequency interfaces generally, but is intended to cover all wireless communication types. Among the expressly included wireless communication methods are radio, Near Field Communication (NFC), Bluetooth®, Wi-Fi, cellular, infrared, satellite, GPD, electromagnetic radiation, IEEE 802.15.4, wireless USB, Ultra-Wideband (UWB), 6LoW-PAN (IPv6 over Low power Wireless Personal Area Network), HSPA+(Evolved High-Speed Packet Access), LTE (Long Term Evolution), GSM (Global System for Mobile Communications), WiMAX (Worldwide interoperability for Microwave Access), and EV-DO (Enhanced Voice-Data Optimized). The technology is not limited to only these communication standards, but at least all of these standards are expressly included within the meaning of a wireless communication.

According to another feature, the battery pack may provide recharge power to the mobile device while also providing an external signaling and/or charging interface to the mobile device. This way, the mobile device need not be removed from the battery pack in order to charge it or provide data (e.g., synchronization, etc.).

According to yet another feature, the battery pack may include one or more different types of communication interfaces to extend the communication capabilities of the mobile device. This allows the mobile device to communicate via other interfaces that may not be built into the mobile device.

According to yet another feature, the battery pack may include one or more processors to extend the processing capabilities of the battery pack. For instance, the one or more processors may increase the processing capabilities of the battery pack and/or provide purpose-specific processors. That is, the interface between the battery pack and mobile device may allow the mobile device to use the one or more processors to execute applications on the battery pack. Note that such applications may, in some instances, continue to operate even if the mobile device is detached from the battery pack.

According to yet another feature, the battery pack may include an inductive recharging device or a near-distance recharging device so that its power cells may be recharged without actually physically plugging it to a recharge power source.

First Embodiment of Battery Pack

FIG. 1 illustrates a perspective view of a battery pack for a mobile device according to one example. In this example, the battery pack 100 is shaped to receive or house a mobile phone within a contoured cavity 102. The battery pack 100 has an integrated rechargeable power cell capable of providing power to operate and/or recharge a mobile device mobile device. For illustrative purposes, mobile device is depicted as the mobile communication device sold under the trademark iPhone by Apple Inc.; it is understood by those familiar with the art that other mobile devices such as computers, mobile phones, media players, music players, personal digital assistants (PDAs), tablet computers, and the like may be equally applicable.

Figure 2:
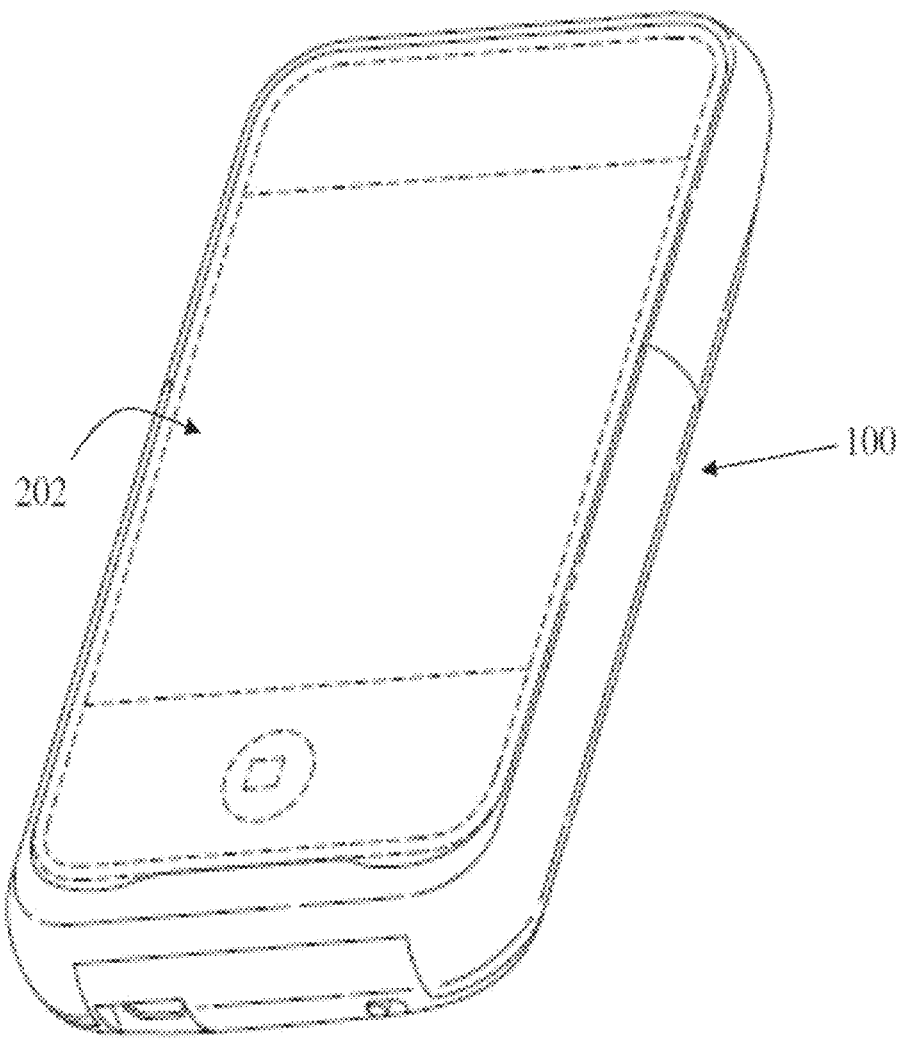
FIG. 2 illustrates how a mobile device can be housed within the battery pack of FIG. 1.

FIG. 2 illustrates how a mobile device can be housed within the battery pack 100 of FIG. 1. As can be appreciated from this figure, the battery pack 100 is shaped to closely wrap around the mobile device 202 and serves as a protective case for the mobile device 202.

Figure 3:
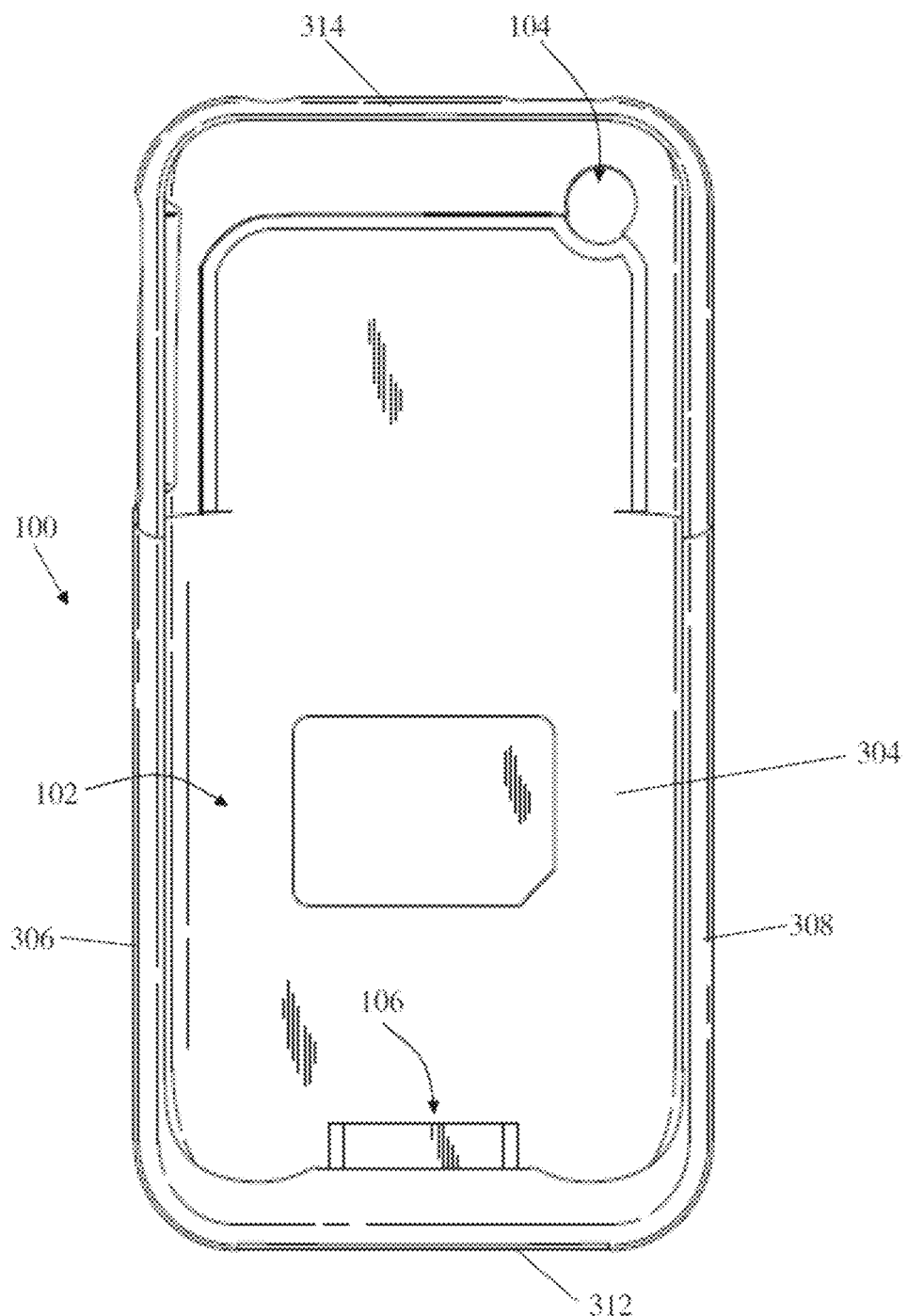
FIG. 3 illustrates a front view of the battery pack of FIG. 1.

FIG. 3 illustrates a front view of the battery pack 100 of FIG. 1. The battery pack 100 includes a back plane 304, first and second sides 306 and 308, a bottom side 312, and a top side 314. The back plane 304, first and second sides 306, bottom side 312 and top side 314 may be shaped to form a pocket or cavity 102 in which a mobile device to be powered can be housed. The top side 314 of the battery pack 100 may slide out to allow insertion and removal of the mobile device.

Referring again to FIG. 1, the battery pack 100 may include one or more openings 104, 108, 110, and 112 to facilitate access to various features of the mobile phone. For instance, a first opening 104 on the back plane 304 of the battery pack 100 may allow unobstructed view for a camera lens on the back of the mobile device. A second opening 108 may provide access to a screen on/off switch for the mobile device. A third opening 110 may provide access to an audio jack on the mobile device. A fourth opening 112 on the first side 306 may provide access to a volume control sliding switch.

The battery pack 100 may also include a connector or interface 106 within the cavity 102 (e.g., on the bottom side 312) through which power can be provided to the mobile device from the internal power cell of the battery pack 100. Additionally, the connector 106 may be coupled to an external interface to provide input and/or output signals to the mobile device.

From FIG. 1, it can be appreciated that the battery pack may include two sections that separate to allow insertion of the mobile device and can then be coupled together to secure the mobile device in place. The size and shape of the battery pack 100 may be approximately that of the external contour of a mobile device to which it is intended to provide power.

Figure 4:
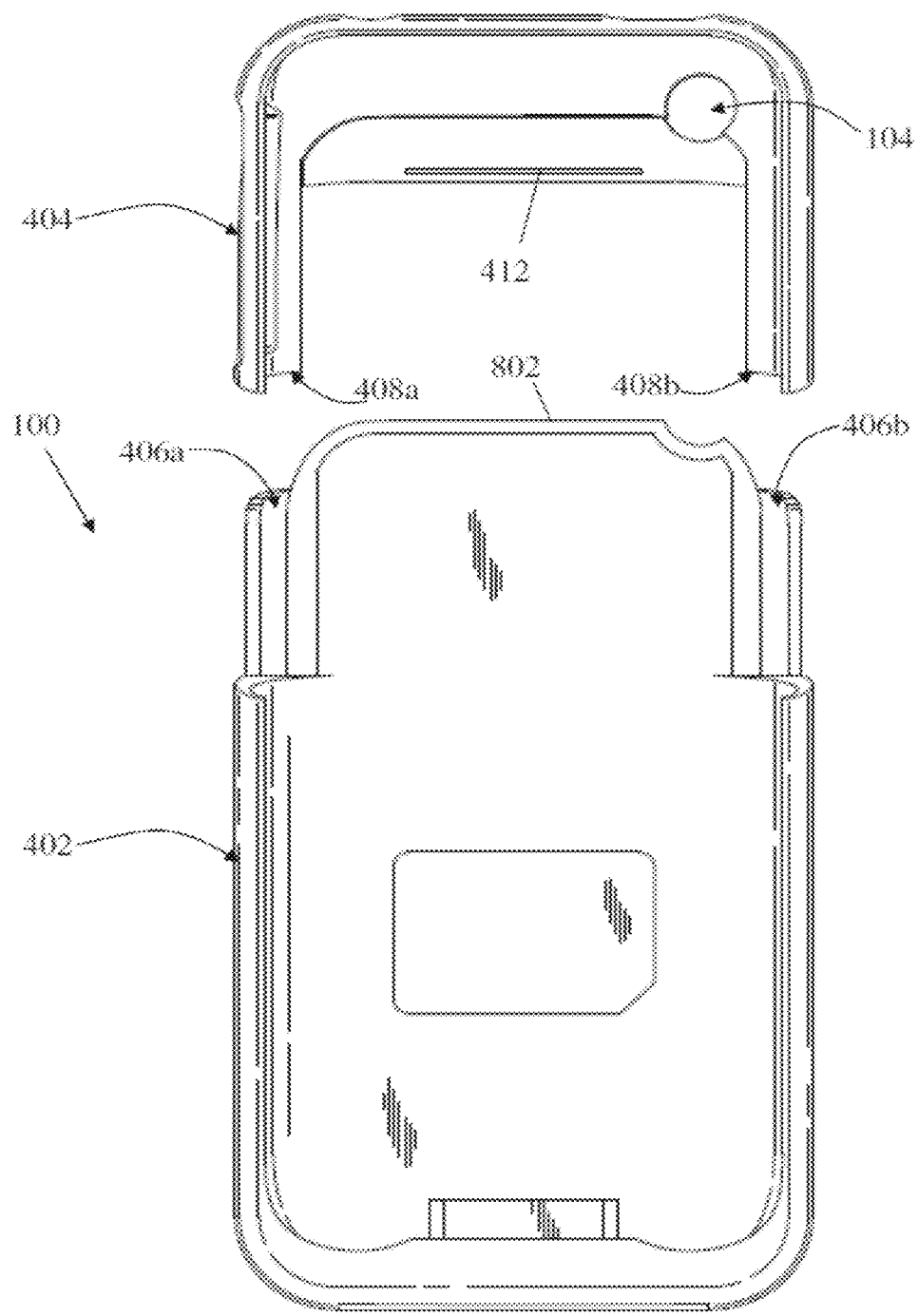
FIG. 4 illustrates the battery pack of FIG. 1 in an open configuration.

FIG. 4 illustrates the battery pack of FIG. 1 in an open configuration. The battery pack 100 may include a bottom section 402 and a top section 404 that can be separated from each other to insert a mobile device within the battery pack 100 and can then be coupled together to secure the mobile device in place. For example, the bottom section 402 may include receiving grooves 406a and 406b that receive rails 408a and 408b from the top section 404. In this manner, the top section 404 can be coupled to the bottom section 402 by pressure fit. For example, a tongue section 802 (FIG. 8) may slide on to the top section 404 such that an engaging tab 412 couples into a receiving groove 804 (FIG. 8) to secure the top section 404 to the bottom section 402.

Figure 5:
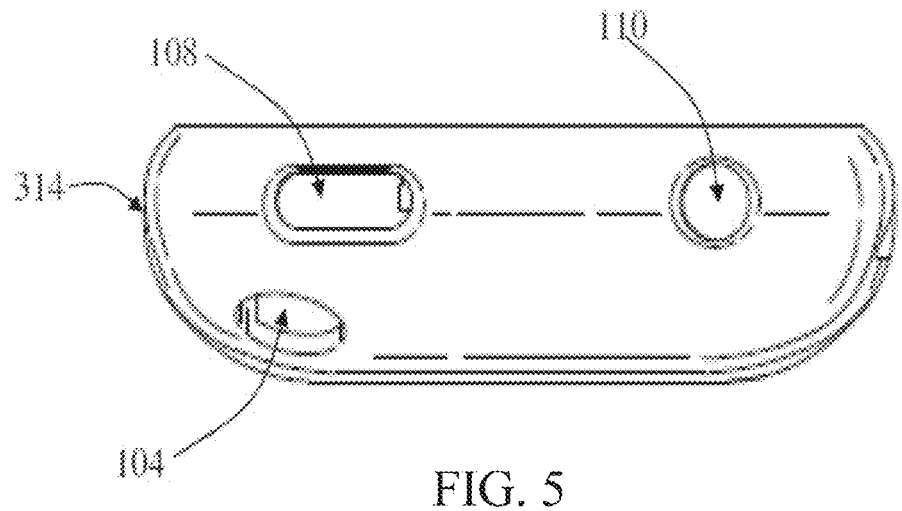
FIG. 5 illustrates a top view of the battery pack of FIG. 1.

FIG. 5 illustrates a top view of the battery pack 100 of FIG. 1. In this view, the top side 314 of the battery pack 100 is shown and the first opening 104, second opening 108, and third opening 110 can be appreciated.

Figure 6:
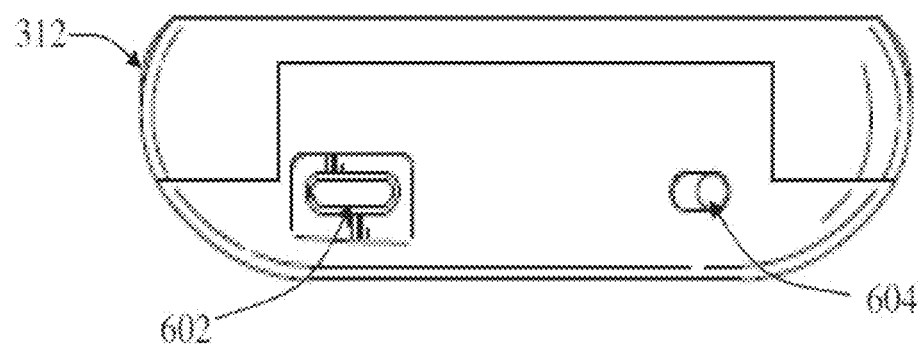
FIG. 6 illustrates a bottom view of the battery pack of FIG. 1.

FIG. 6 illustrates a bottom view of the battery pack 100 of FIG. 1. In this view, the bottom side 312 of the battery pack 100 is shown. In this view, an external interface 602 (e.g., mini or micro USB connector) is shown. This external interface 602 may serve to recharge the internal power cell of the battery pack. Additionally, the external interface 602 may also provide a pass-through signaling interface for the internal connector or interface 106, thereby allowing the mobile device to communicate via the external interface 602. A switch 604 may also be located on the bottom side 312 of the battery pack and can function to switch power from the battery pack On or Off. That is, when the mobile device has sufficient power on its own, the power cell of the battery pack is not needed and can be switched Off until it is needed.

Figure 7:
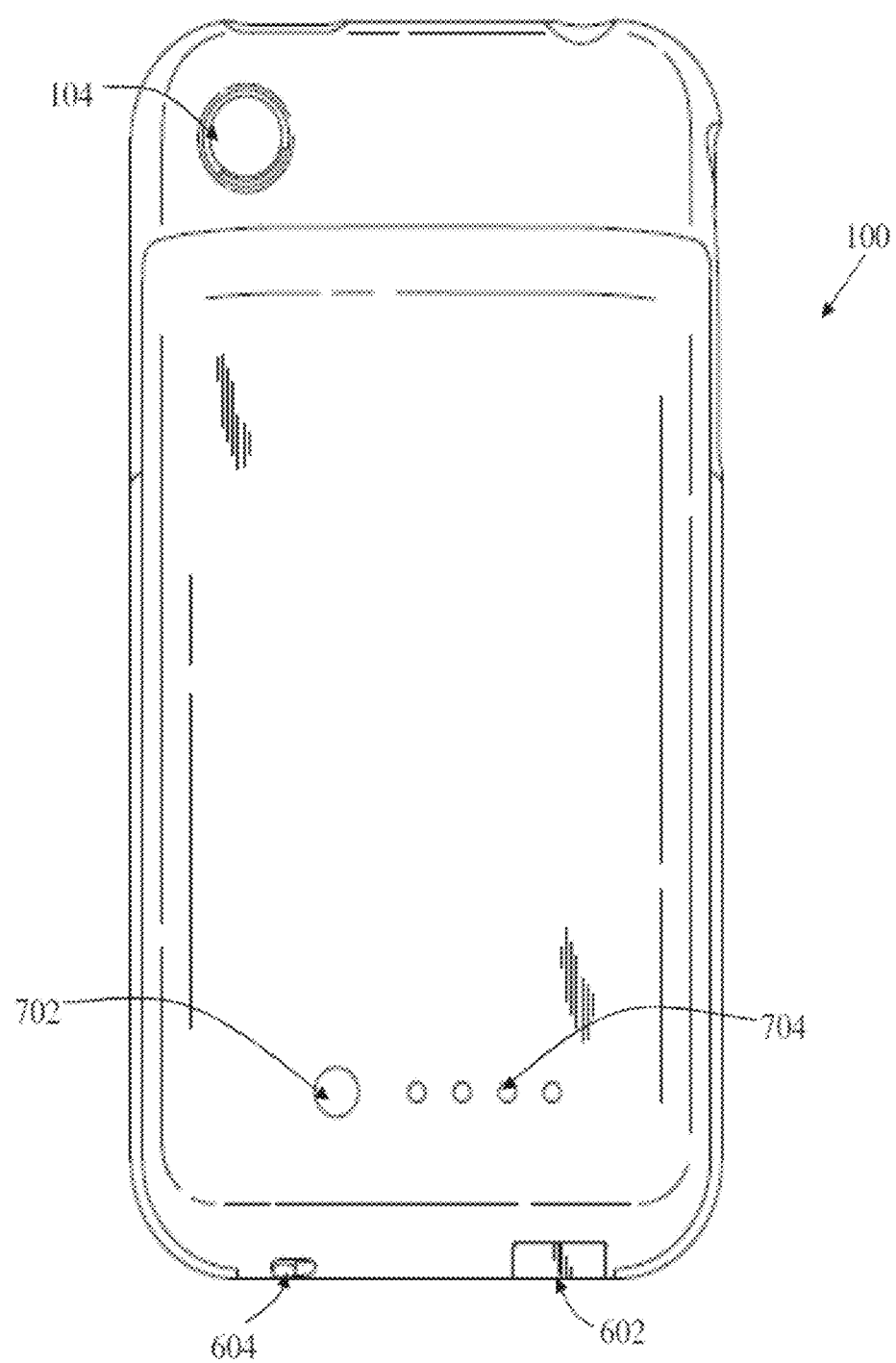
FIG. 7 illustrates a back view of the battery pack of FIG. 1.

FIG. 7 illustrates a back view of the battery pack 100 of FIG. 1. In this example, a test button 702 is provided that, when pushed, causes plurality of LED lights 704 to indicate the power or charge level of the internal power cell of the battery pack 100.

Figure 8:
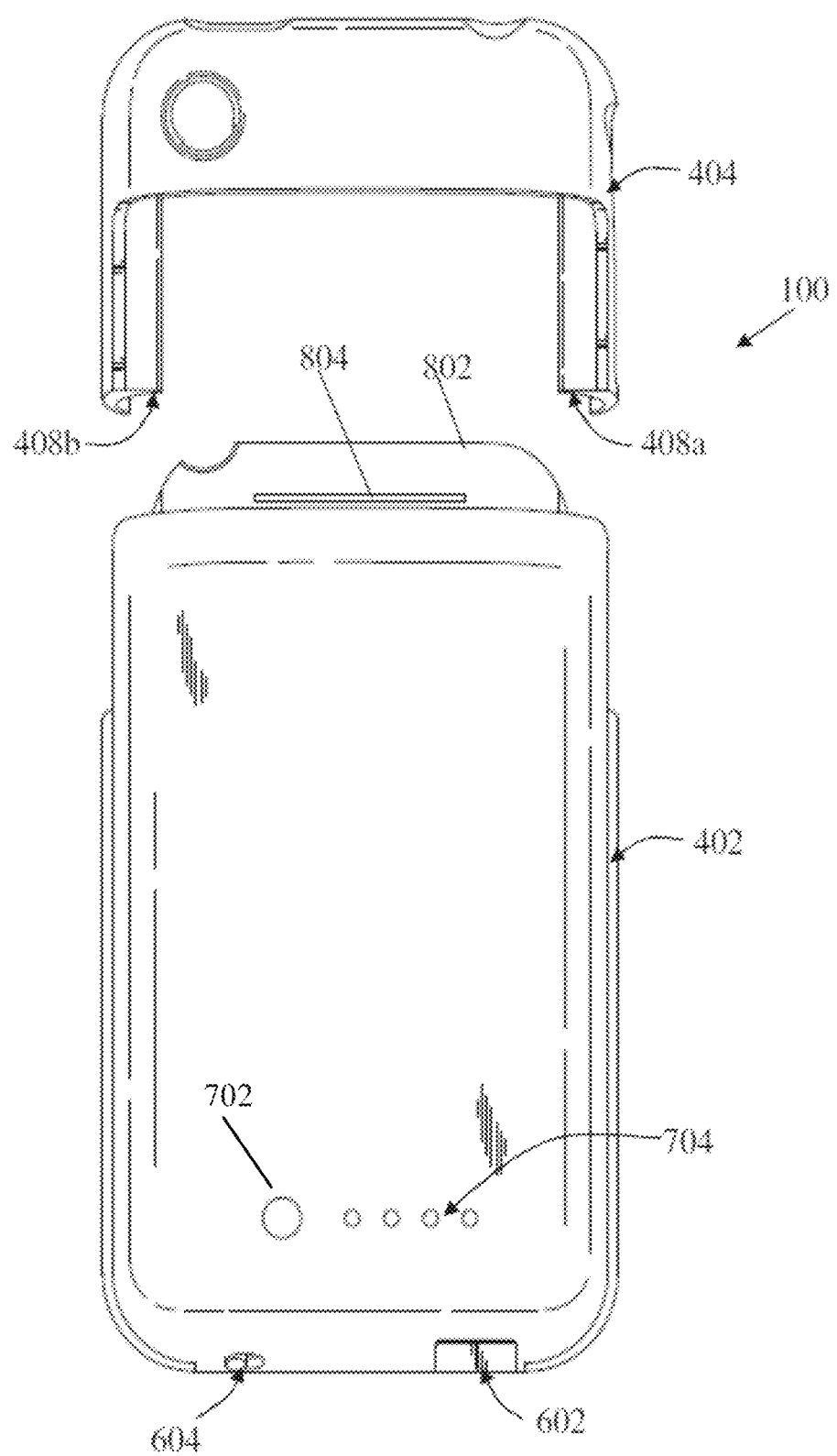
FIG. 8 illustrates back view of the battery pack of FIG. 1 in an open position.

FIG. 8 illustrates back view of the battery pack 100 of FIG. 1 in an open position.

Figure 9:
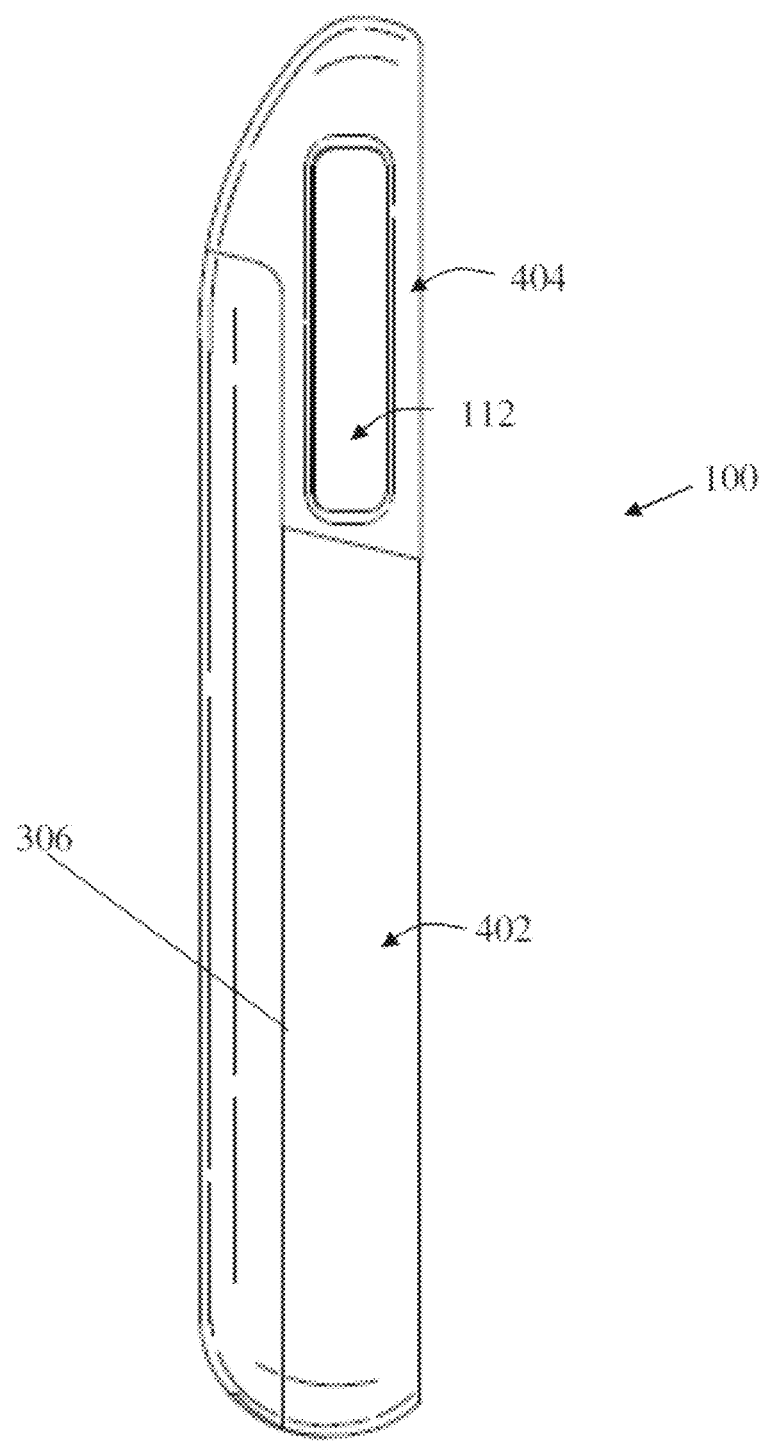
FIG. 9 illustrates a first side view of the battery pack of FIG. 1.

FIG. 9 illustrates a first side view of the battery pack of FIG. 1.

Figure 10:
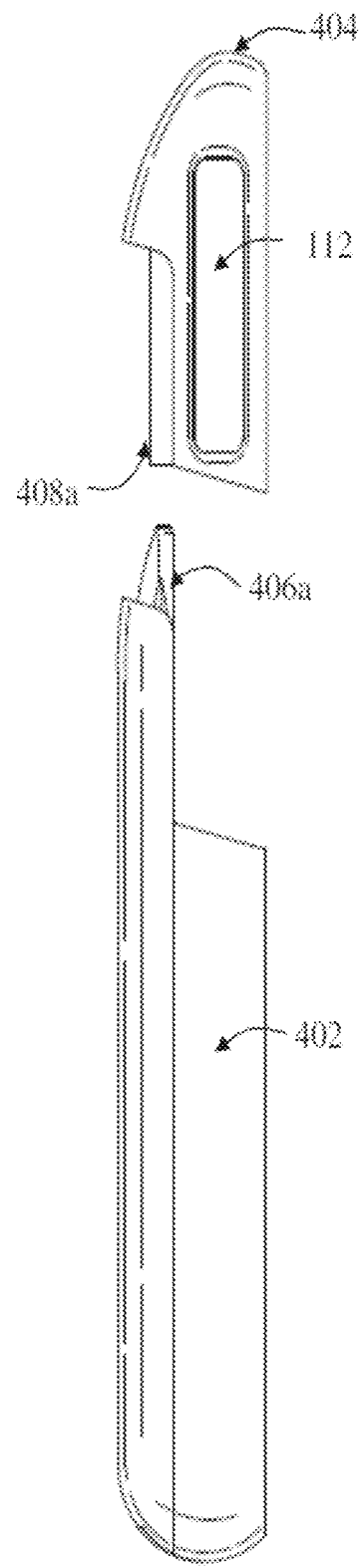
FIG. 10 illustrates the first side view of the battery pack of FIG. 1 in an open position.

FIG. 10 illustrates the first side view of the battery pack of FIG. 1 in an open position.

Figure 11:
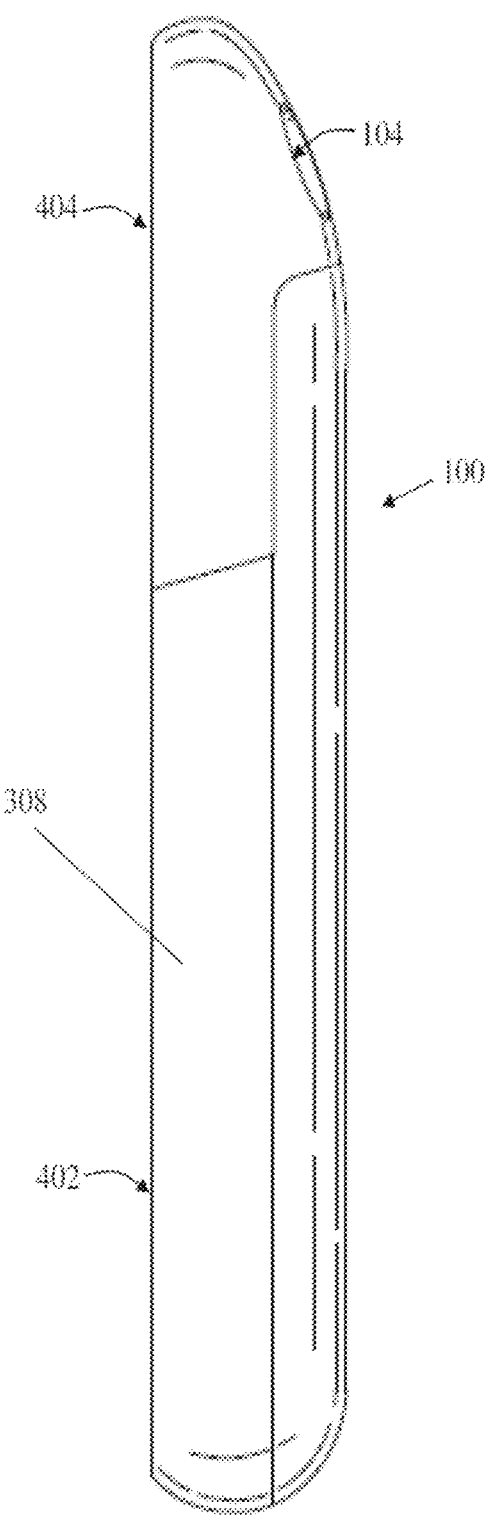
FIG. 11 illustrates a second side view of the battery pack of FIG. 1.

FIG. 11 illustrates a second side view of the battery pack of FIG. 1.

Figure 12:
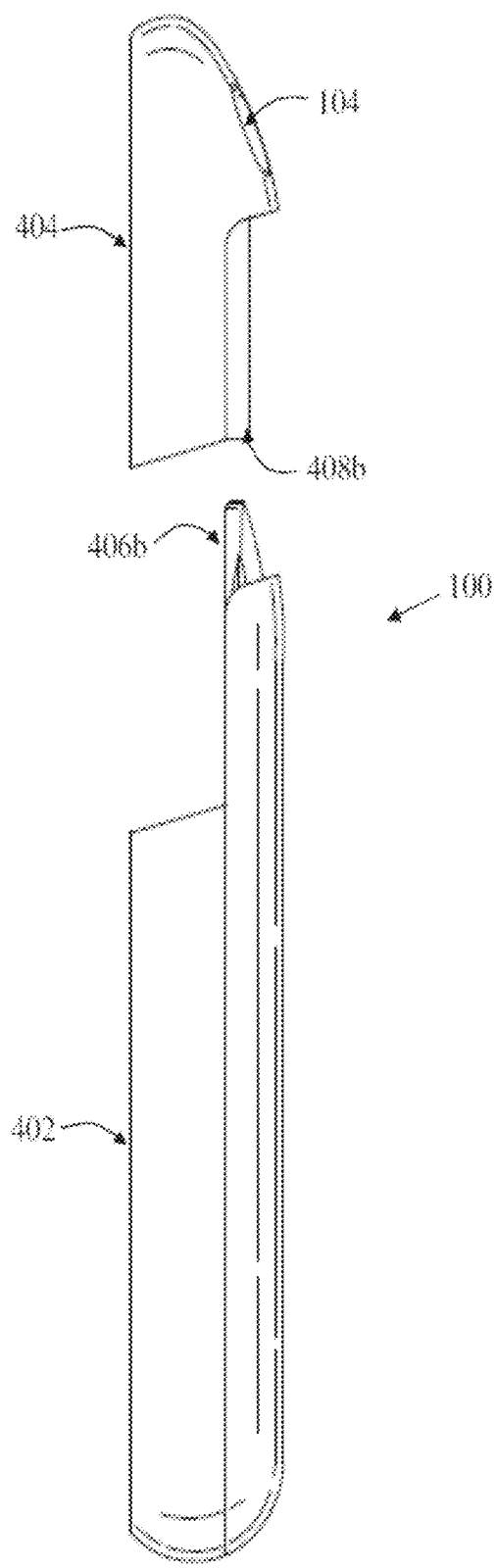
FIG. 12 illustrates the second side view of the battery pack of FIG. 1 in an open position.

FIG. 12 illustrates the second side view of the battery pack of FIG. 1 in an open position.

Figure 13:
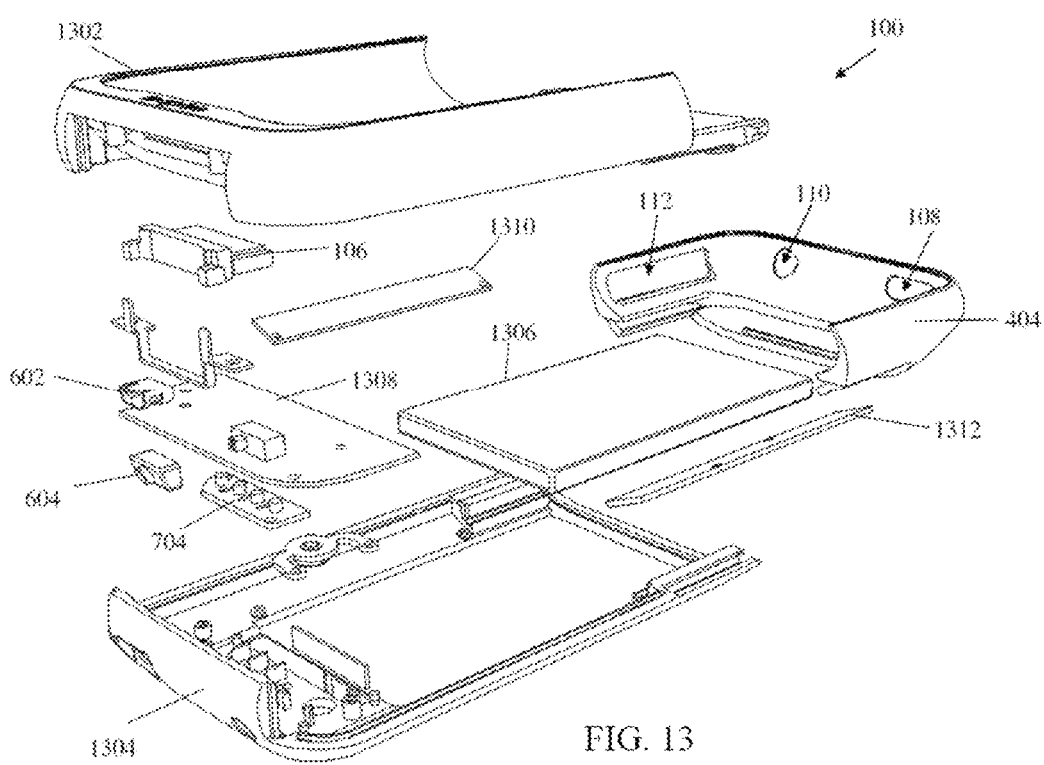
FIG. 13 is an exploded view of components of the battery pack of FIG. 1.

FIG. 13 is an exploded view of components of the battery pack of FIG. 1. In this example, the battery pack may include a first bottom section 1302 and a second bottom section 1304 which form a top and bottom shell in between which one or more circuit boards 1308, 1310, and/or 1312 and/or one or more power cells 1306 are housed. That is, the circuit boards 1308, 1310, 1312 and/or power cell(s) 1306 are sandwiched between the top and bottom sections 1302 and 1304 of the battery pack 100. Consequently, the rechargeable power cell(s) 1306 may be housed within the thickness of the back plane of the battery pack.

In some instance, the circuit boards and or power cell of the battery pack may cause interference with the antenna or signaling of the mobile device which is in close proximity. Consequently, one aspect provides for reducing the size of a primary circuit board 1308 by adding secondary circuit boards 1310 and 1312 which are electrically coupled to the primary circuit board 1308. This allows reducing the size of the circuit board 1308 thereby reducing interference to the antenna of the mobile device. Additionally, the ground for the power cell 1306 may be coupled to the ground for the mobile device (via the internal interface 106) to reduce interference to the mobile device.

Figure 14:
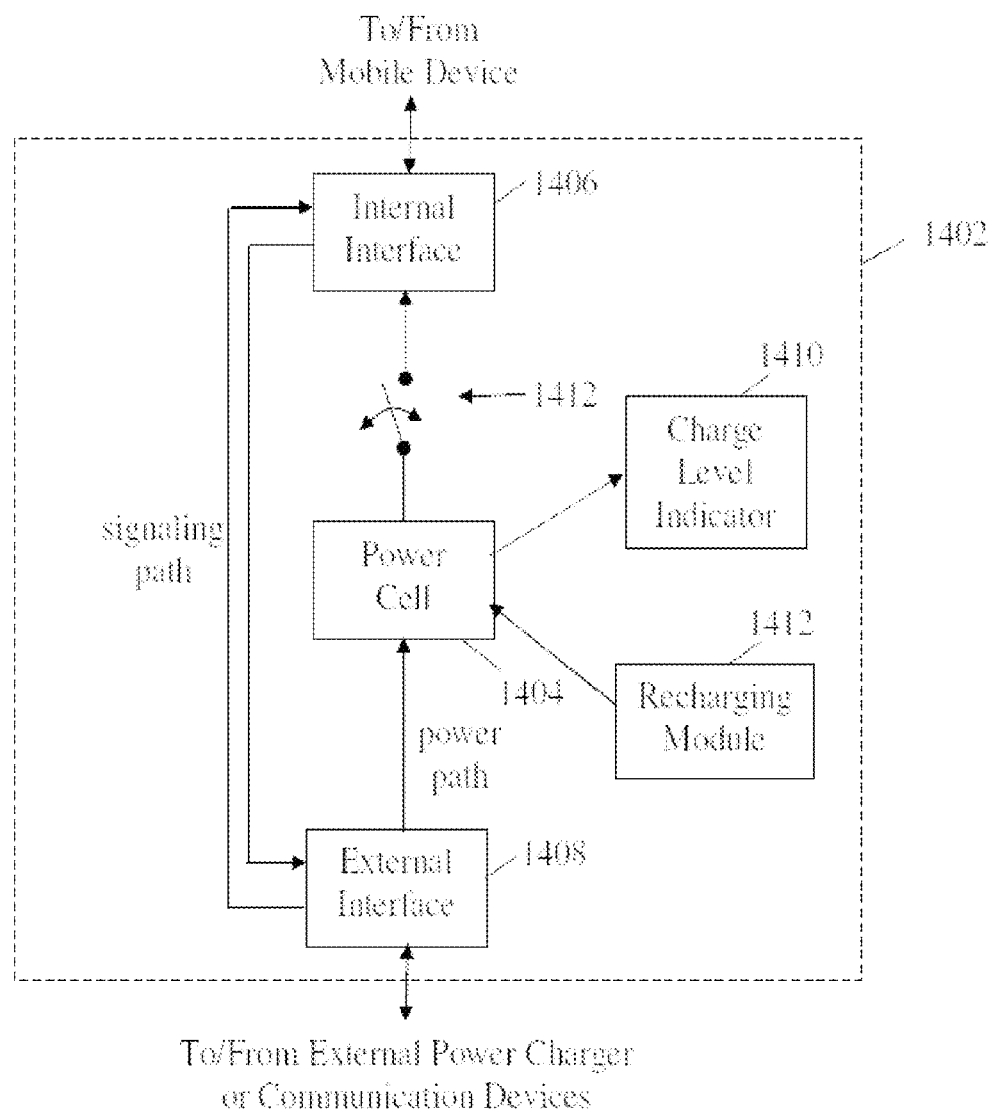
FIG. 14 illustrates a block diagram for the battery pack of FIG. 1.

FIG. 14 illustrates a block diagram for the battery pack 100 of FIG. 1. The battery pack 1402 may include a power cell 1404, an internal interface 1406, an external interface 1408, and charge level indicator 1410. The internal interface 1406 may be adapted to provide a mobile device power from the power cell 1404 as well as passing signal to/from the mobile device to the external interface 1408. The external interface 1408 may allow recharging of the power cell 1404 as well as passing signals to/from the mobile device via the internal interface 1406. A switch 1412 may allow switching power from the power cell 1404 to the mobile device On and Off as desired. Also, a charge level indicator 1410 permits displaying of the charge level of the power cell 1404. Additionally, a recharging module 1413 serves to recharge to power cell 1404 when needed.

Second Embodiment of Battery Pack

FIGS. 15-16 and 18-22 illustrate yet another embodiment of the power pack. In this embodiment, the power pack may operate as previously disclosed but does not include a top section. By removing the top section, the battery pack is more compact in size and ergonomic so that it does not significantly increase or change the size, thickness, and/or shape of mobile communication device 1602 secured thereto.

Figure 15:
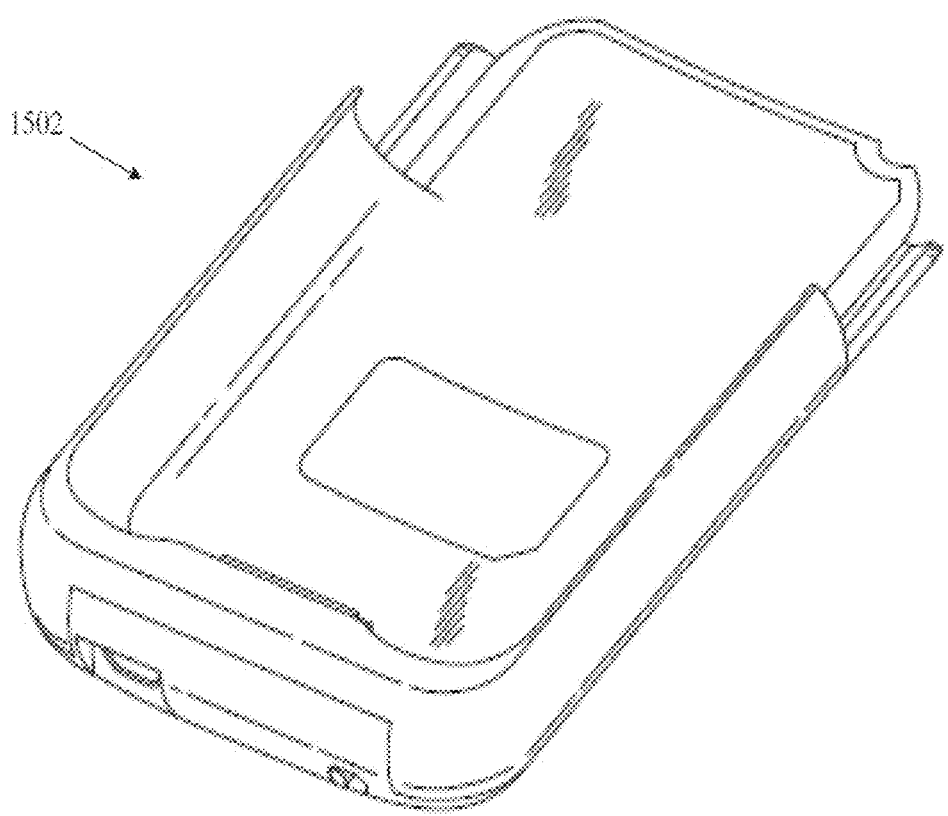
FIG. 15 illustrates a perspective view of the battery pack.

FIG. 15 illustrates a perspective view of the battery pack 1502.

Figure 16:
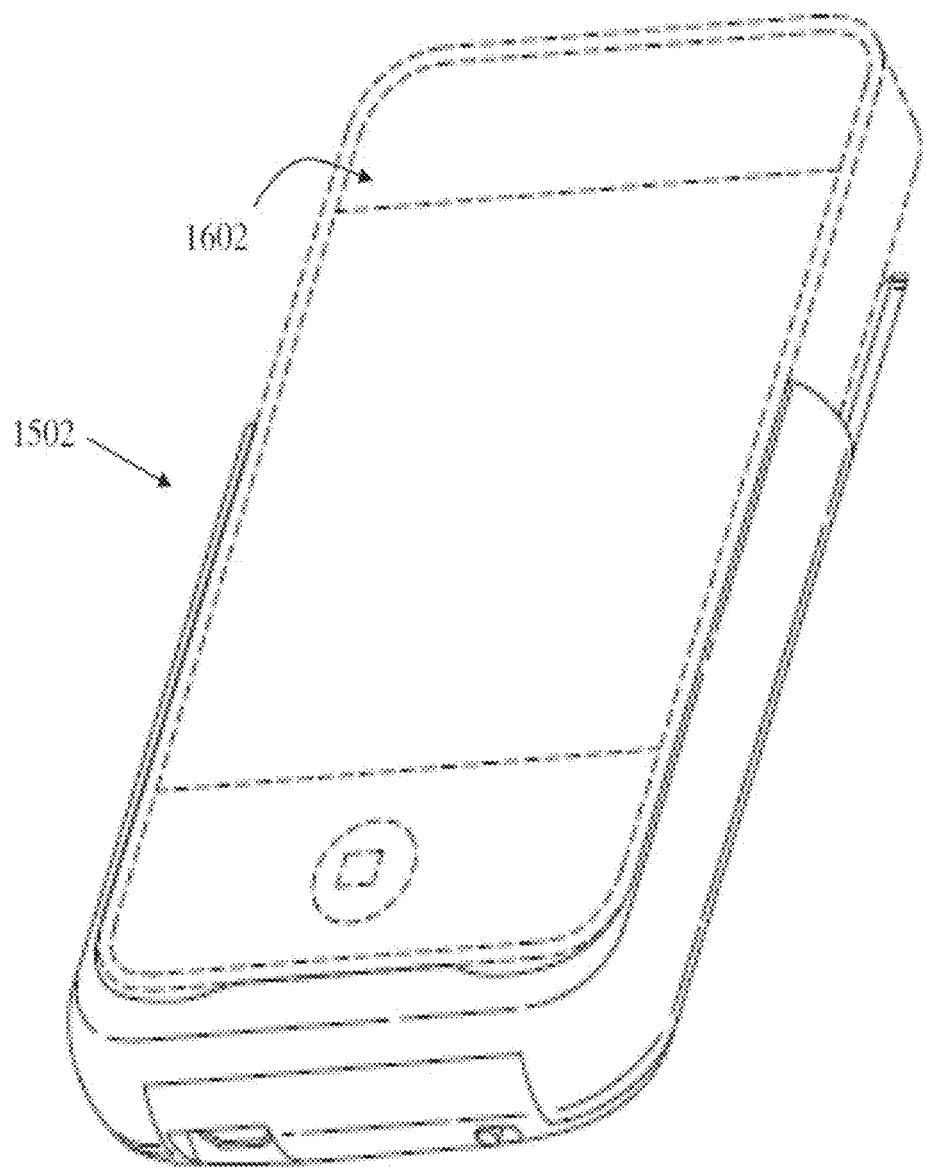
FIG. 16 illustrates a perspective view of the battery pack with a mobile device inserted therein.

FIG. 16 illustrates a perspective view of the battery pack 1502 with a mobile device 1602 inserted therein.

Figure 18:
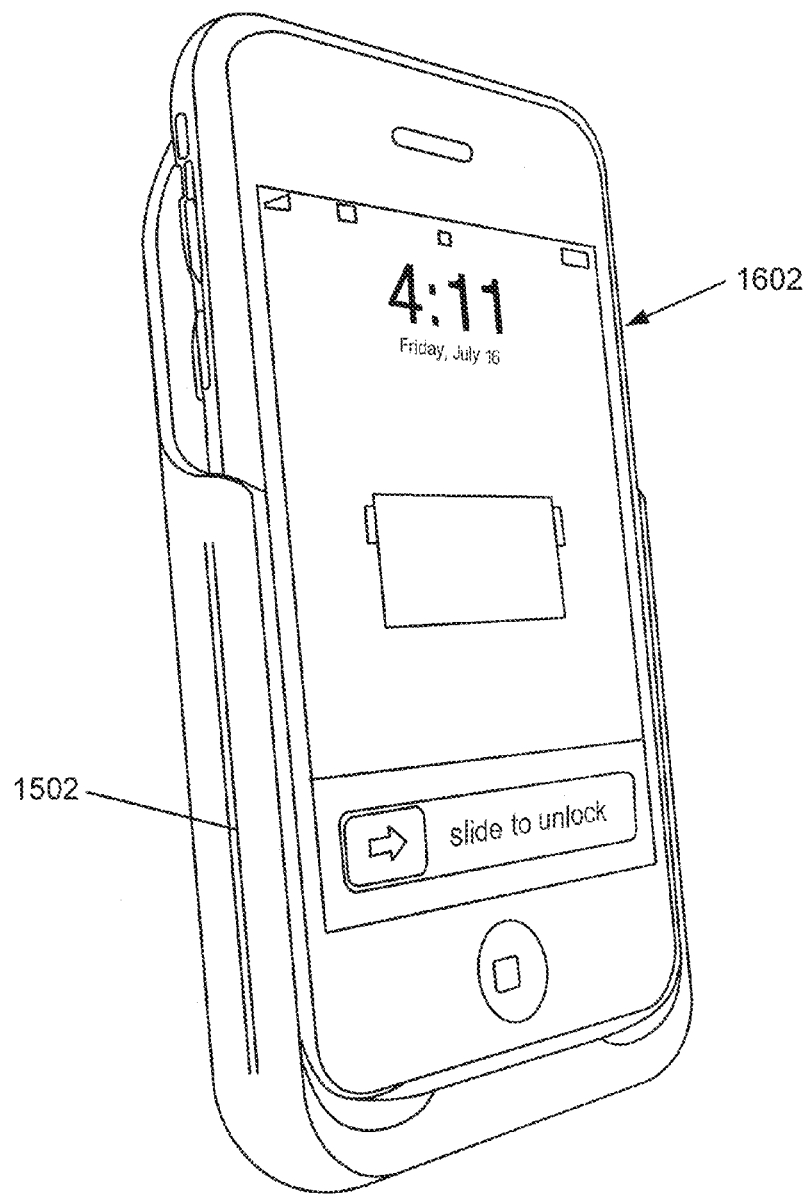
FIG. 18 illustrates another perspective view of the battery pack.

FIG. 18 illustrates another perspective view of the battery pack 1502.

Figure 19:
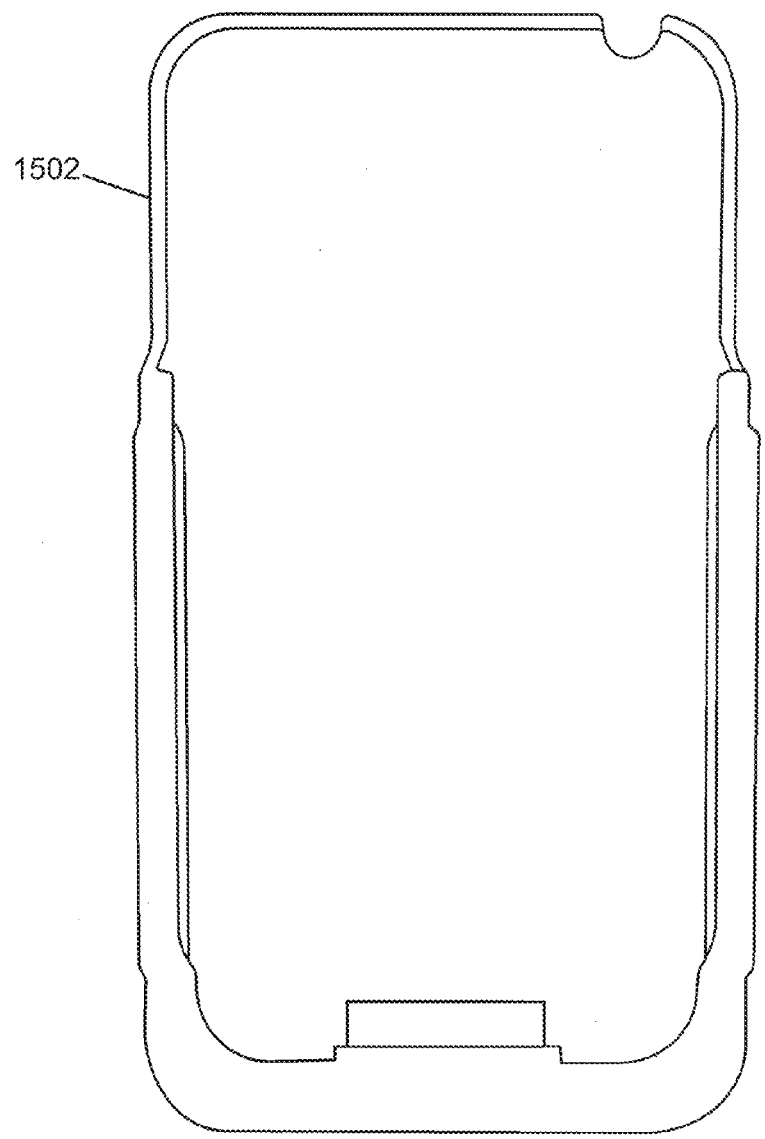
FIG. 19 illustrates a front view of the battery pack.

FIG. 19 illustrates a front view of the battery pack 1502.

Figure 20:
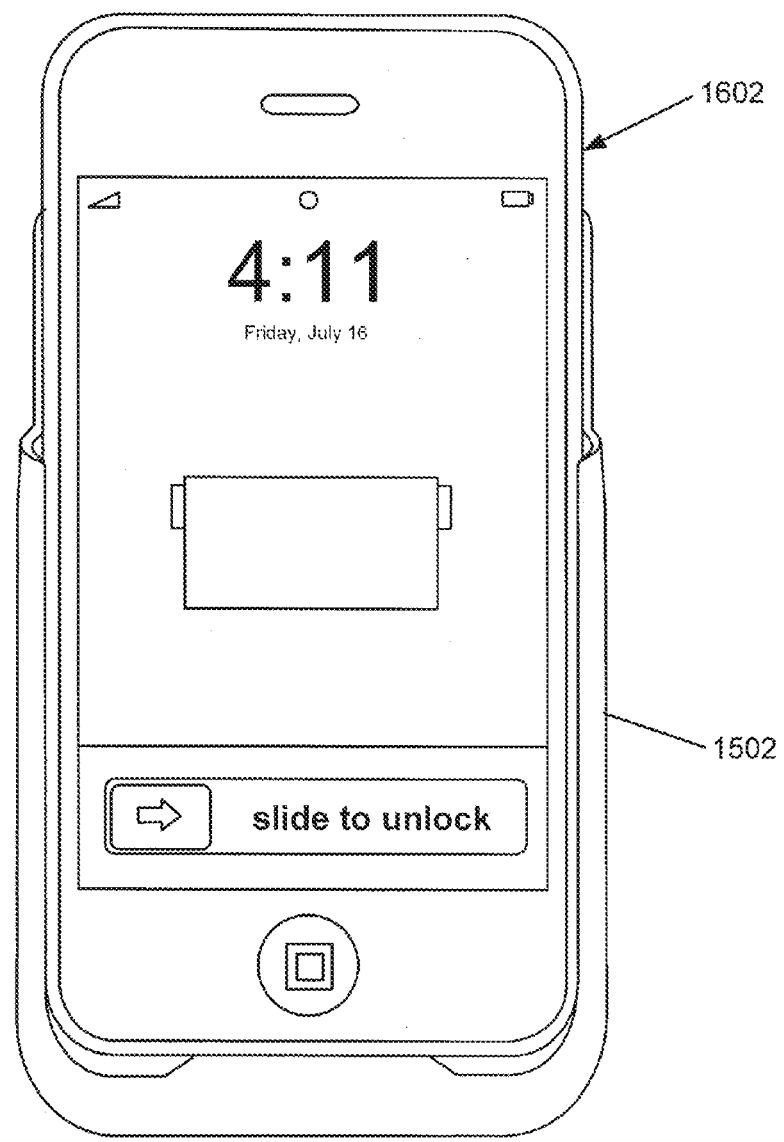
FIG. 20 illustrates a front view of the battery pack with the mobile device inserted therein.

FIG. 20 illustrates a front view of the battery pack 1502 with the mobile device inserted therein.

Figure 21:
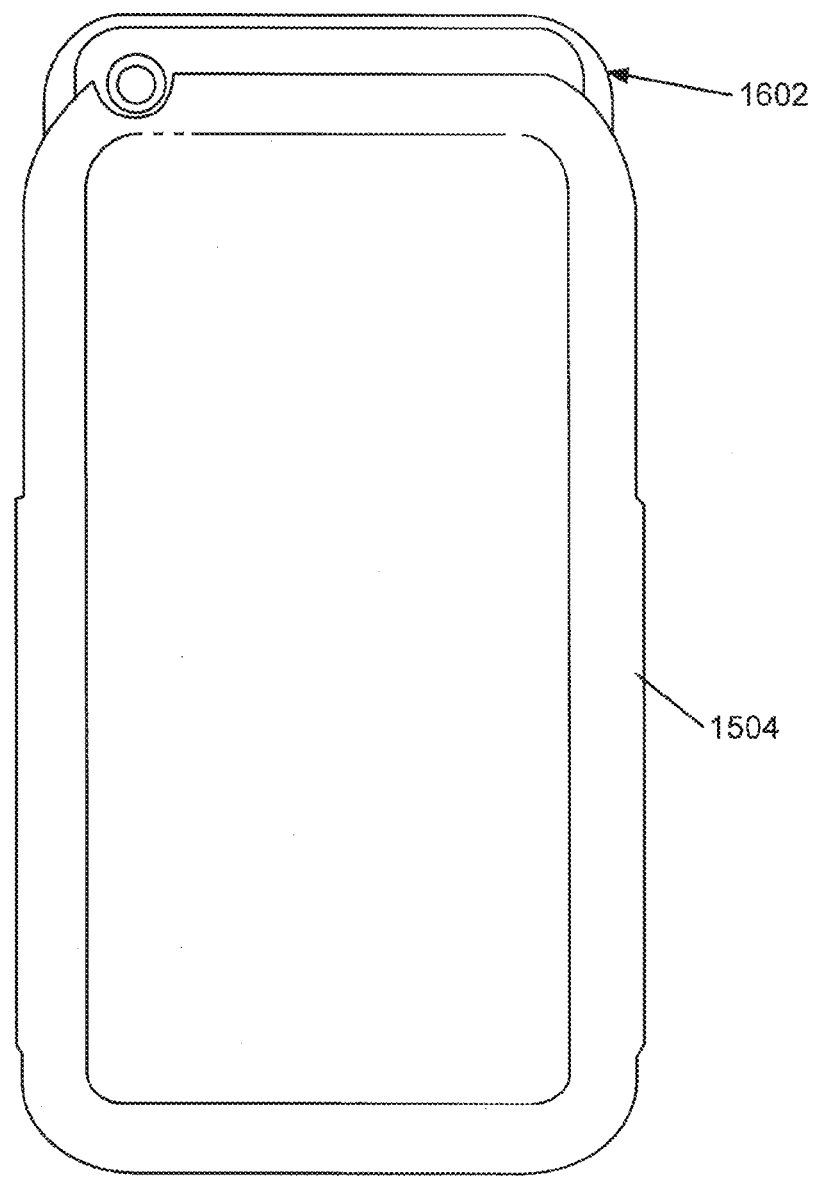
FIG. 21 illustrates a back view of the battery pack with the mobile device inserted therein.

FIG. 21 illustrates a back view of the battery pack 1502 with the mobile device 1602 inserted therein.

Figure 22:
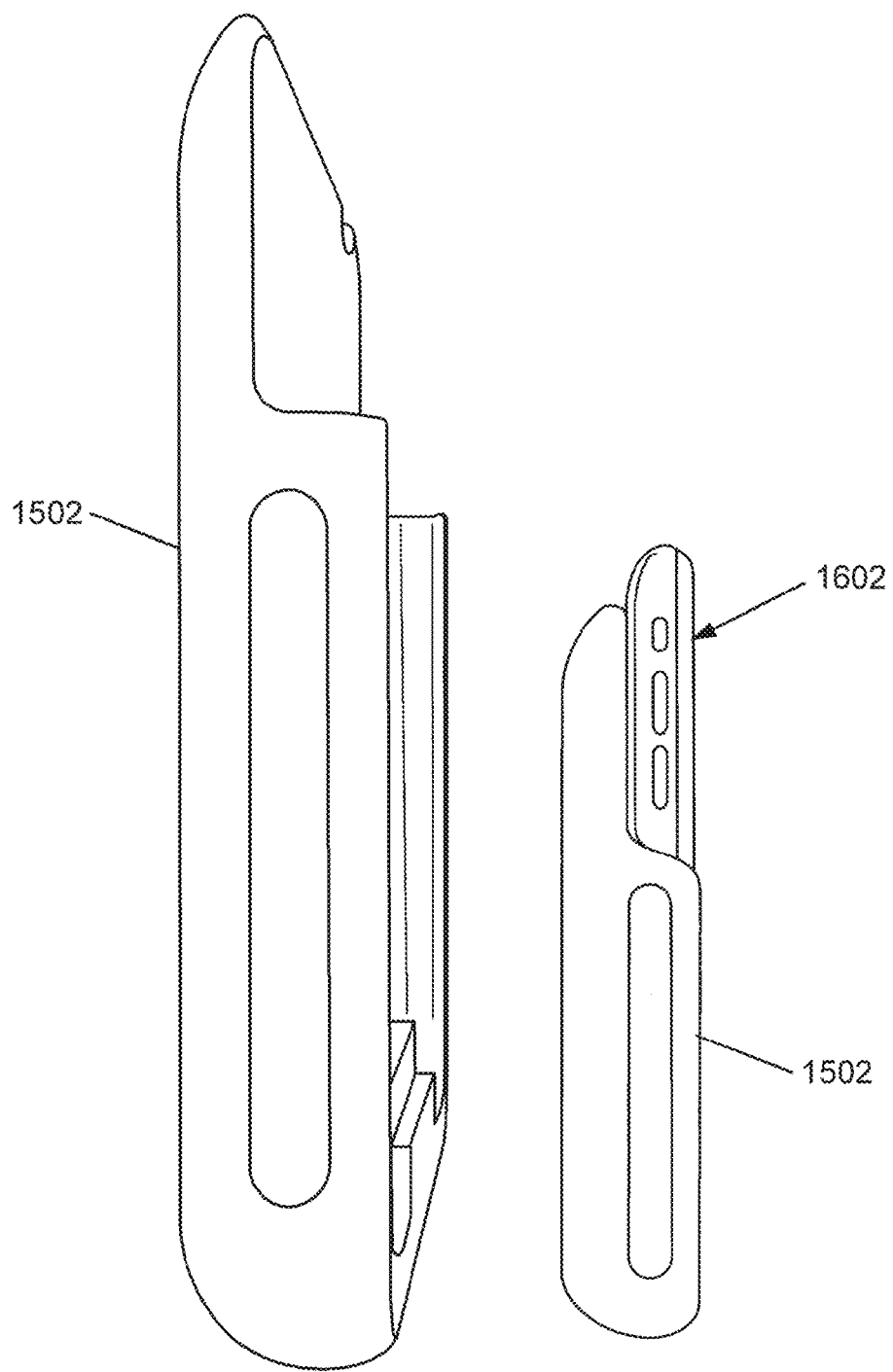
FIG. 22 illustrates a side view of the battery pack with and without the mobile device.

FIG. 22 illustrates a side view of the battery pack 1502 with and without the mobile device 1602. Note that, in some embodiments, the left and right sides may be symmetrical.

Extendible Processing and Interfacing Platform

Figure 17:
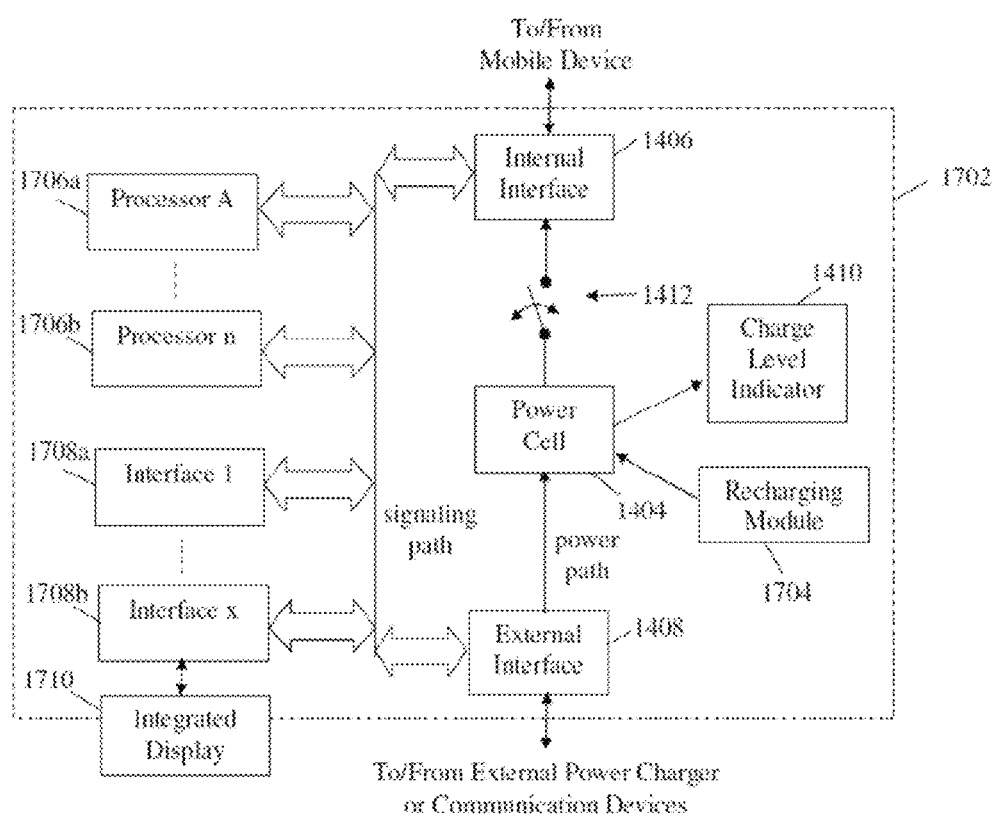
FIG. 17 illustrates a battery pack that also operates as an extendible processing and/or interfacing platform for a mobile device

FIG. 17 illustrates a battery pack that also operates as an extendible processing and/or interfacing platform for a mobile device. In one example, the battery pack 1702 may operate as described with reference to FIG. 14. In addition, the battery pack may also include one or more processors 1706 and/or one or more interfaces 1708. The one or more processors 1706a and 1706b may allow a mobile device coupled to the internal interface 1406 to extend its processing capabilities. For instance, the mobile device may cause one or more applications to be executed on the one or more processors 1706 while using a user display on the mobile device as an output interface. Additionally, the processors 1706a and/or 1706b may be purpose-specific processors that allow the mobile device to perform particular tasks not otherwise possible on its own. For example, the processors 1706 may provide analog-to-digital conversion, audio signal sampling, temperature measuring, etc., which may not be available to the standard mobile device.

The one or more interfaces 1708a and 1708b may also provide the mobile device a means by which to communicate or acquire signals. These interfaces 1708 may effectively expand the communication interfaces available to the mobile device by providing wired and/or wireless communication interfaces for various types of signals (e.g., audio, infrared, etc.).

The battery pack 1702 may also include a recharging module 1704 that facilitates recharging of the power cell 1404. For example, the recharging module 1704 may be a wireless or cordless charging device that inductively or otherwise facilitates recharging of the power cell 1404.

In one example implementation, the battery pack 1702 may be adapted to function as a Medical Processing Unit which may have built-in capabilities for monitoring real-time health conditions (e.g., alcohol levels in breath, pulse, temperature, blood pressure, test and/or diagnose diabetes, etc.) via build-in test port. Consequently, the battery pack 1702 can collect and/or process such collected data and store it in the mobile device. Note that the processing of such data may be directed by an application that operates either on the one or more processors of the battery pack 1702 and/or the processor(s) of the mobile device. According to one feature, if an abnormal health condition occurs (e.g., a heart attack, fainting, seizure, etc.), the Medical Processing Unit may detect this condition and automatically activate the mobile device (e.g., cellular phone) to send urgent text message or emails to a doctor, hospital, or emergency responder. The responding party (doctor, hospital, emergency responder) may be able to locate the patient via a global positioning system or information from the mobile device.

In another example implementation, the battery pack 1702 may be adapted to function as a Gaming Processing Unit that may include the capability of turning the mobile device into a real handheld gaming device with joysticks or large PSP/DS type of gaming buttons and communication devices. Consequently, the mobile device may be configured to operate as an input and/or output interface (e.g., via a display on the mobile device or battery pack) for a game.

In yet another example, the battery pack 1702 may be adapted to function as a Home Entertainment Unit that may include the capability of turning the mobile device into a Universal Smart Remote Control which can control all the IR activated units in a home or office (e.g., control garage doors, television sets, security alarm, air conditioning, lighting, etc.). For this purpose, the battery pack 1702 may include various interfaces 1708 that provide the specific infrared and/or wireless protocols and/or signaling to control such devices.

External Processing Mobile Accessory

As discussed above, in reference to FIG. 17, the battery pack 1702 may operate as an extendible processing unit that comprises one or more processors 1706a and 1706b, and one or more interfaces 1708a and 1708b. The one or more processors 1706a and 1706b may allow a mobile device coupled to the internal interface 1406 to extend its processing capabilities, while the one or more interfaces 1708a and 1708b may also provide the mobile device a means by which to communicate or acquire signals. This concept may be extended to an external processing mobile accessory that may include one or more processors and/or devices (with or without the external battery) that extends the functionality of, or adds capabilities to the mobile device.

More particularly, the external processing accessory may serve as a processing platform to which other application specific accessories may interchangeably couple to, in order to take advantage of the external processing accessory's hardware (e.g., processing circuitry, memory, I/O interfaces, etc.) and/or software (e.g., firmware, applications, operating system, etc.). For example, a third party vendor may wish to manufacture an application specific mobile device accessory that measures blood glucose levels. Ordinarily, the manufacturer of the blood glucose measuring accessory would have to design and manufacture the accessory to have complex hardware components and associated software/firmware that serve to measure, analyze, and communicate the blood glucose level information collected to the mobile device. For example, the accessory may have to comprise, at least, one or more processors, memory, and an interface that communicates with the mobile device. However, these hardware components used within a blood glucose measuring apparatus are all used to perform only one function: reporting a user's blood glucose levels. The blood glucose measuring apparatus would also necessarily require other hardware too, such as, an input that receives blood from the user.

If the third party vendor now wished to manufacture another application specific mobile device accessory, such as a bar code reader, another accessory would have to be designed and manufactured having processors, memory, and a mobile device communications interface, all dedicated—this time—to reading barcodes. Duplication of such hardware resources to perform different tasks is not cost effective. Therefore, there is a need for an external processing accessory that may be removably coupled to a plurality of different application specific accessories, so that the application specific accessories may share the external processing accessory's processors, memory, and communications interfaces to handle common tasks such as processing, storing data, and/or communicating with the mobile device. This would reduce the design complexity and cost of the application specific accessories.

Figure 51:
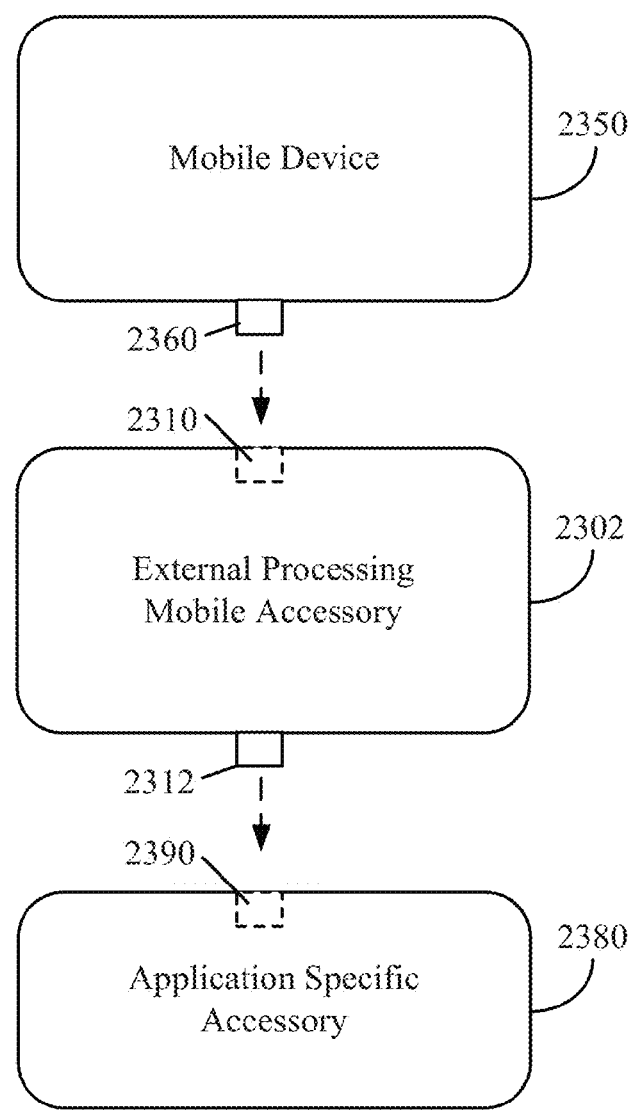
FIG. 51 illustrates a functional block diagram of one embodiment of an external processing mobile accessory configured to provide additional hardware and/or software resources to an application specific mobile device accessory and a mobile device.

FIG. 51 illustrates a functional block diagram of one embodiment of an external processing mobile accessory 2302 configured to provide additional hardware and/or software (e.g., firmware, applications, operating system, etc.) resources to an application specific mobile device accessory 2380 and a mobile device 2350. The external processing accessory 2302 may be housed within a casing that removably couples to the mobile device 2350. The internal interface 2310 of the external processing accessory 2302 transmits data to and receives data from the mobile device interface 2360 of the mobile device 2350. The external processing accessory 2302 also removably couples to the application specific accessory 2380. The external interface 2312 of the external processing accessory 2302 transmits data to and receives data from the communication interface 2390 of the application specific accessory 2380.

The external processing accessory 2302 serves as a bridge between the application specific accessory 2380 and the mobile device 2350. The external processing accessory 2302 may provide for a bulk of the processing, storing, and mobile device interface communication needs of the application specific device 2380. Thus, the application specific device 2380 may only need to comprise those hardware components that are uniquely necessary to perform its task (e.g., a barcode scanner input device for a barcode reader accessory; a blood reception unit for a blood glucose measuring accessory, etc.). Various application specific devices 2380 may be interchangeably coupled to the external processing accessory 2302 for use with the mobile device 2350. The various application specific devices 2380 may be manufactured by different third party entities.

The application specific accessory 2380 may be, for example, a blood glucose measuring accessory, a blood or breath alcohol measuring accessory, a finger print image reader accessory, a retinal image reader accessory, a barcode reader accessory, a matrix code (i.e., 2D barcode) reader accessory, a near field communication device accessory, a magnetic strip payment card reader accessory, a smart card (contactless and contact) payment card reader, or an inventory management accessory. The application specific accessory 2380 is not limited to these embodiments, but rather, it may be any accessory device with a specific application.

Figure 23A:
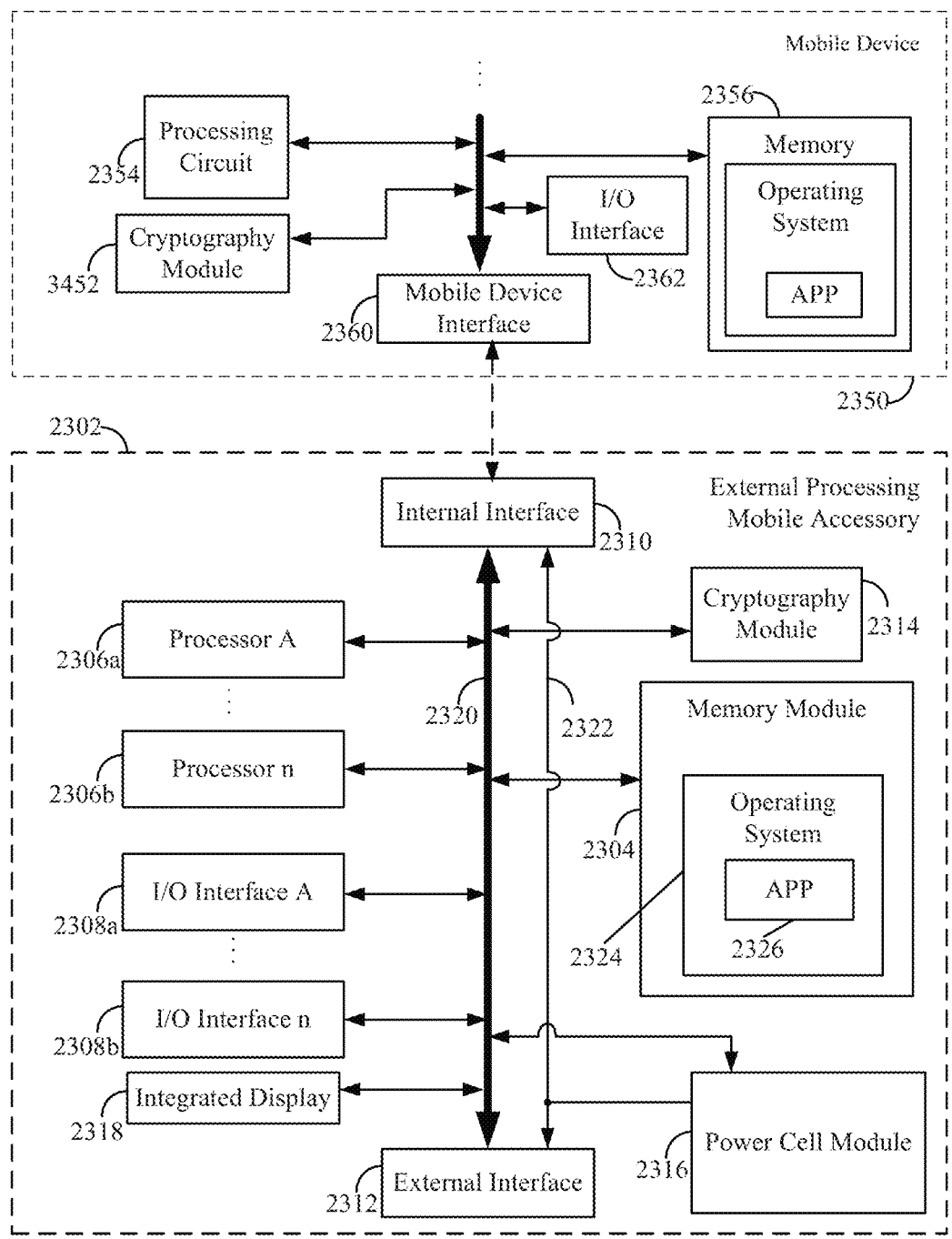
FIGS. 23A and 23B illustrate a functional block diagram of one embodiment of the components of the mobile device, the external processing accessory, and the application specific accessory.
Figure 23B:
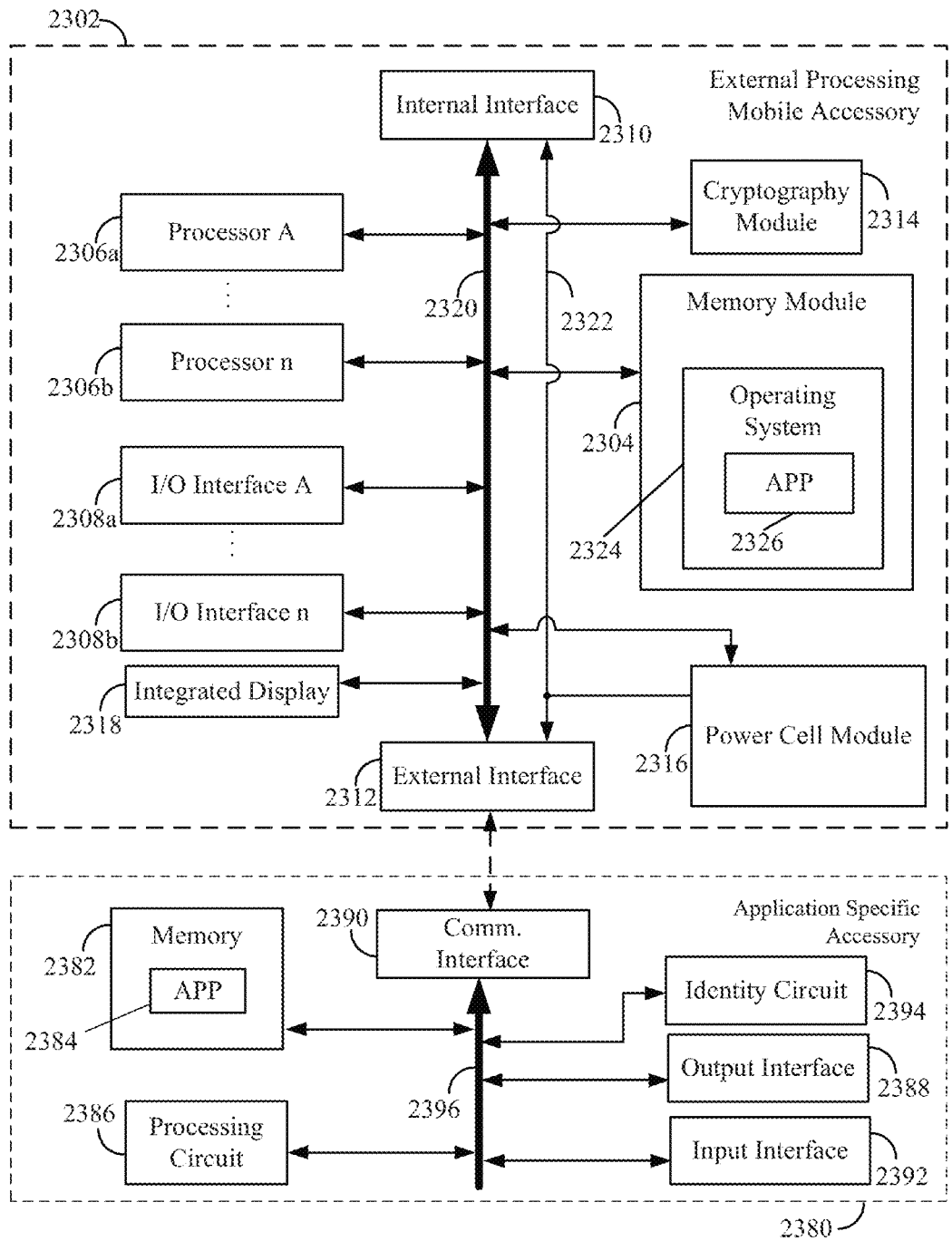

FIGS. 23A and 23B illustrate a functional block diagram of one embodiment of the components of the mobile device 2350, the external processing accessory 2302, and the application specific accessory 2380. The external processing accessory 2302 may comprise a memory circuit 2304 (also referred to as memory circuits), one or more processors 2306a and 2306b (also referred to as processing circuits), one or more input and output (I/O) interfaces 2308a and 2308b, an internal interface 2310, an external interface 2312, a cryptography module 2314, a power cell module 2316 (e.g., battery power source), an integrated display 2318, a bus 2320, and/or a power bus 2322. The bus 2320 serves as a communication interface between the one or more processors 2306a and 2306b, the one or more I/O interfaces 2308a and 2308b, the memory circuit 2304, the internal interface 2310, the external interface 2312, the cryptography module 2314, the power cell module 2316, and/or integrated display 2318.

The external processing accessory 2302 may transmit and receive data to the mobile device 2350. Specifically, the internal interface 2310 of the external processing accessory 2302 communicatively couples to the mobile device interface 2360 of the mobile device 2350. In one embodiment, the internal interface 2310 and mobile device interface 2360 physically couple to one another to transmit data through a wire, bus, and/or electrical contact connection. Such a connection may also serve to physically secure the external processing device 2302 to the mobile device 2350. Alternatively, or in addition to such a wired connection, the internal interface 2310 may transmit and receive data to the mobile device 2350 wirelessly, using for example a Bluetooth standard, or any one of the 802.11 standards.

Moreover, the external processing accessory 2302 may transmit to and receive data from the application specific accessory 2380. Specifically, the external interface 2312 of the external processing accessory 2302 communicatively couples to the communication interface 2390 of the application specific accessory 2380. In one embodiment, the external interface 2312 and communication interface 2390 physically couple to one another to transmit data through a wire, bus, and/or electrical contact connection. Such a connection may also serve to physically secure the external processing device 2302 to the application specific accessory 2380. Alternatively, or in addition to such a wired connection, the external interface 2312 may transmit and receive data to the application specific accessory 2380 wirelessly, using for example a Bluetooth standard, or any one of the 802.11 standards.

The power cell module 2316 is an optional module that may comprise the power cell 1404, charge level indicator 1410, recharging module 1704, and switch 1412 of FIG. 17. The power cell module 2316 and its components may perform some or all of the functions of the battery pack described in FIGS. 1-22. For example, the power cell module 2316 may provide power to the mobile device 2350 through the internal interface 2310 via the power bus 2322. The power cell module 2316 may also provide power to the application specific accessory 2380 through the external interface 2312 via the power bus 2322.

The memory circuit 2304 may comprise volatile and/or non-volatile storage devices for storing an operating system 2324, software applications 2326, and/or data. In one example, the memory circuit 2304 may comprise one or more independent computer data storage devices, such as, but not limited to, FLASH memory, ROM, RAM, hard disks, optical disks, and the like. The operating system (OS) 2324 can be any type of OS that adequately manages and coordinates the activities and sharing of the external processing accessory's 2302 resources, such as, but are not limited to, Android™, iPhone OS™, Symbian OS™, BlackBerry OS™, Windows Mobile™, Linux, Palm webOS™, and Maemo™. The OS 2324 may also host a variety of computing applications that are resident on memory circuit 2304.

In one embodiment, the memory circuit 2304 may include one or more software applications 2326 (also referred to as firmware) that are each associated with an application specific accessory 2380. For example, the memory circuit 2304 may contain an application 2326 specific to a glucose level measuring accessory, that when executed by the processors 2306a, 2306b, controls the glucose level measure accessory device and/or the external processing accessory 2302. The application 2326 controls the hardware associated with the application specific accessory 2380 and the external processing accessory 2302 and may control transmission and reception of data with the mobile device 2350. For example, the application 2326 when executed may cause the external interface 2312 to receive data from the communications interface 2390 of the application specific accessory 2380. The application 2326 may then cause the data to be processed by the processors 2306a, 2306b. The processed data may then be transmitted to the mobile device 2350 for display on the output interface 2362 (e.g., a display) of the mobile device 2350. The application 2326 may also control the internal interface 2310 to receive data from the mobile device 2350 in response to user interaction with the input interface (e.g., a keyboard) 2362 of the mobile device 2350.

In one embodiment, an application 2326 associated with a given application specific accessory 2380 is executed by the processor 2306a upon detection of the associated application specific accessory 2380. That is, the external processing accessory 2302 and/or the application specific accessory 2380 contains circuitry that allows for the automatic detection of a particular application specific accessory 2380 when it is coupled to the external processing accessory 2302 or otherwise turned on. When the application specific accessory 2380 is detected, the associated application 2326 of the application specific accessory 2380 is executed within the external processing accessory 2302 by one or more of the processors 2306a, 2306b. For example, in one embodiment, one or more of the pins of the external interface 2312 detects an identity circuit 2396 (See FIG. 23B) located within the applications specific accessory 2380 upon connection to the communication interface 2390. The identify circuit 2394 may comprise, for example, resistors and/or capacitors that have values uniquely associated with the specific application specific accessory 2380. The unique resistance and/or capacitance value associated with each application specific accessory 2380 allows the external processing accessory 2302 to determine which application(s) to execute upon connection and detection of a particular application specific accessory 2380. In other embodiments, the identity circuit 2394 may comprise identity information that is stored within memory, such as memory circuit 2382, and transmitted to the external processing accessory 2302 upon connection.

In one embodiment, the plurality of applications 2326 that are associated with application specific accessories 2380 may be stored on the memory circuit 2304 near the time of production of the external processing accessory 2302. In other embodiments, applications may be downloaded onto the memory circuit 2304 of the external processing accessory 2302 at a later time via the internal interface 2310 and/or one of the I/O interfaces 2308a, 2308b. In yet other embodiments, the application 2326 may be stored within the memory 2382 of the application specific accessory 2380 and transferred to the external processing accessory 2302 for storage and/or execution when the application specific accessory 2380 is coupled to the external processing accessory 2302. Updates to the applications 2326 may be downloaded to the external processing accessory 2302 by any of the above means.

The cryptography module 2314 of the external processing accessory 2302 may serve to encrypt and/or decrypt data sent wirelessly or by wire between the internal interface 2310 and the mobile device interface 2360. The cryptography module 2314 may also serve to encrypt and/or decrypt data sent wirelessly or by wire between the external interface 2312 and the communication interface 2390 of the application specific accessory 2380. Various types of data encryption techniques may be utilized that are well known in the art including: symmetric-key cryptography such as Data Encryption Standard (DES), Advanced Encryption Standard (AES), hashing functions (MD5, SHA-1, SHA-2, SHA-3, etc.); and asymmetric-key cryptography such as digital signature schemes like the Rivest, Shamir and Adleman (RSA) algorithm and the Digital Signature Algorithm (DSA). The cryptography modules 2314 and 2352 may be implemented using hardware circuitry, software, or both.

Referring to FIG. 23B, the application specific accessory 2380 may comprise a memory circuit 2382, a processing circuit 2386, an output interface 2388, a communication interface 2390, one or more input interfaces 2392, an identity circuit 2394, and a bus 2396. The bus communicatively couples the memory 2382, the processing circuit 2386, the output, input, and communication interfaces 2388, 2392, and 2390, and the identity circuit 2394 to one another. The communication interface 2390 allows for wireless or wire line communication with the external processing accessory 2302. The specific input interface 2392 for a particular application specific accessory 2380 may vary widely depending on the type of application specific accessory 2380. For example, a blood glucose level measuring accessory may have a receiver adapted to receive blood and measure its glucose level as one of its input interface 2392. A barcode reader accessory may have a barcode scanner as its input and output interface 2392, 2388 to read barcodes.

Ideally, the processing circuit 2386 and memory circuit 2382 of the application specific accessory 2380 are simple in design and low cost. The bulk of the processing and storing functions should ideally be carried out by the external processing accessory 2302 to minimize the complexity and cost of the application specific accessory 2380. Thus, the processing circuit 2386 and memory circuit 2382 of the application specific accessory 2380 may perform only those functions necessary to communicate data received from the input interface 2392 and/or identity circuit 2394 to the external processing accessory 2302 via the communication interface 2390. The processing circuit 2386 and memory circuit 2382 may also control the output interface 2388.

In one embodiment, the memory circuit 2382 stores applications 2384 associated with the application specific accessory 2380. The applications 2384 may be transmitted to the external processing accessory 2302 upon connection to the external processing accessory 2302. The external processing accessory 2302 may then execute the applications 2384 to control communication and operation of the application specific accessory 2380, and transmit any received and/or processed data to the mobile device 2350. In some embodiments, one or more of the applications 2384, may be executed on the processing circuit 2386 of the application specific accessory 2380 to control hardware components of the application specific accessory 2380.

A software development kit (SDK) may also be provided to a potential manufacturer of an application specific accessory 2380. The manufacturer may use the SDK to create unique applications 2326 for a given application specific accessory 2380. The SDK 2326 may include such tools as, but not limited to, a source code editor, a compiler, build automation tools, a debugger, and other utilities that may be presented in an integrated development environment (IDE). The SDK allows users and potential manufacturers to create a variety of unique applications for application specific accessories 2380 that are executed on the one or more processors 2306a and 2306b, and may also utilize the various types of resources available on a particular embodiment of the external processing accessory 2302.

Payment Processing Mobile Accessories
Magnetic Strip Card Reader Embodiment

Figure 24:
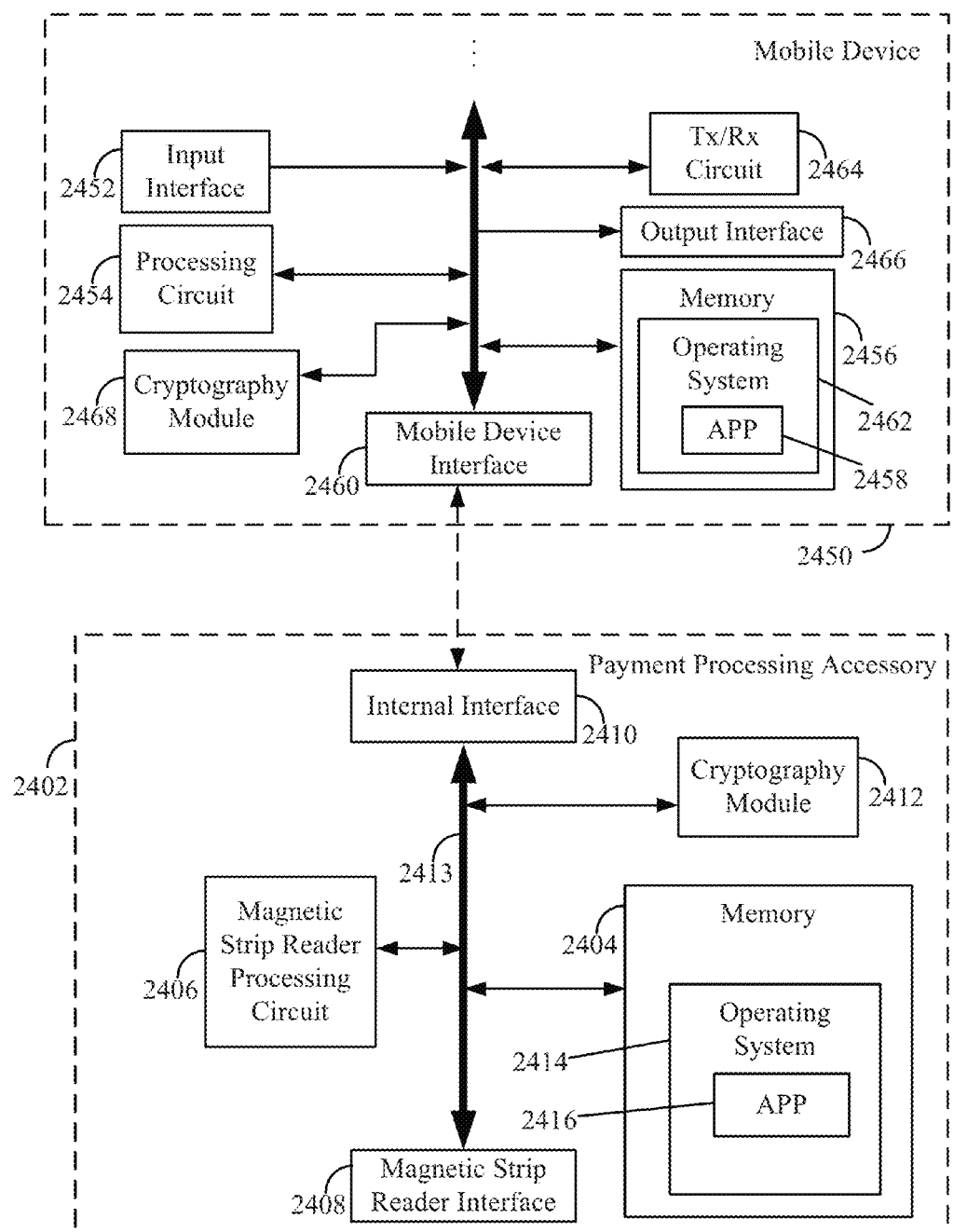
FIG. 24 illustrates a functional block diagram of one embodiment of a payment processing mobile accessory adapted to read data stored on magnetic strips of a payment card.

In some embodiments, an accessory for a mobile device is described that allows the mobile device to receive and process payment transactions from a magnetic strip credit card and/or "smart card" (RFID contact or contactless) based payment card. FIG. 24 illustrates a functional block diagram of one embodiment of a payment processing mobile accessory 2402 (also referred to as a "payment processing accessory 2402") adapted to read data stored on one or more magnetic strips associated with a payment card. The payment processing accessory 2402 may comprise a memory circuit 2404, a magnetic strip reader processing circuit 2406, a magnetic strip reader interface 2408, an internal interface 2410, a cryptography module 2412, and a bus 2413. The bus 2413 allows for communication between the memory circuit 2404, the magnetic strip reader processing circuit 2406, the magnetic strip reader interface 2408, the internal interface 2410, and the cryptography module 2412.

The memory circuit 2404 may comprise volatile and/or non-volatile storage devices for storing an operating system 2414, software applications 2416 (including firmware), and/or data. The memory circuit 2404 may comprise one or more independent computer data storage devices, such as, but not limited to, flash memory, ROM, RAM, hard disks, optical disks, solid-state memory such as flash memory, or any other computer data storage known in the art. The operating system (OS) 2414 can be any type of OS that adequately manages and coordinates the activities and sharing of the payment processing accessory's 2402 resources, such as, but are not limited to, Android™, iPhone OS™, Symbian OS™, BlackBerry OS™, Windows Mobile™, Linux, Palm webOS™, and Maemo™. The OS 2414 may also host a variety of applications 2416 that are resident on memory module 2404. The applications 2416, when executed by magnetic strip reader processing circuit 2406, may control operation of the payment processing accessory 2402. For example, the application 2416 may control how and when payment data is received from the magnetic strip reader interface 2408, how that data is processed, and how it is transmitted to the mobile device 2450 for further processing.

The cryptography module 2412 of the payment processing accessory 2402 may serve to encrypt and/or decrypt any data received or transmitted wirelessly or by wire from the internal interface 2410 to the mobile device interface 2460. The cryptography module 2412 may also serve to encrypt and/or decrypt any data received from the magnetic strip reader interface. For example, at some point after receiving data associated with a payment card from the magnetic strip reader interface, the cryptography module 2412 may encrypt the received data with an encryption scheme before transmitting the data to the mobile device 2450. The encrypted data may then be transmitted to a merchant account provider for decryption and approval. Various types of data encryption techniques may be utilized including: symmetric-key cryptography such as DES, AES, hashing functions (MD5, SHA-1, SHA-2, SHA-3, etc.); and asymmetric-key cryptography such as digital signature schemes like RSA and DSA. The cryptography modules 2412 and 2468 may be implemented using hardware circuitry, software, or both.

In one embodiment, a private and public key pair may be shared between a merchant account provider and the payment processing accessory 2402. Specifically, the merchant account provider that issues the payment cards stores the private key within its system and keeps this key secure. The merchant account provider may then distribute a corresponding public key to the payment processing accessory 2402, which may be stored on the memory circuit 2404. The cryptography module 2412 may then use the public key stored to sign/encrypt data associated with a payment card received from the magnetic strip reader interface 2408. The signed data may then be securely transmitted to the mobile device 2450 which then transmits the account information and purchase amount to the merchant account provider for decryption and approval. In one embodiment, the public key may be programmed into the memory 2404 near the time the accessory 2402 is manufactured. In other embodiments, the public key may be transmitted to the accessory 2402 via a mini-USB interface 2702 (see FIG. 27A). In yet other embodiments, the public key may be transmitted to the accessory 2402 by the mobile device 2450 through the internal interface 2410.

The magnetic strip reader interface 2408 is configured to read magnetic strips on various payment cards, such as credit cards, debit cards, charge cards, pre-paid credit cards, and/or any other card based payment systems that utilize magnetic strips. Magnetic strip reader interface 2408 can be, for example, capable of reading standard three-track strip cards following the ISO/IEC standard 7811.

The magnetic strip reader interface 2408 is configured to read account information and other data associated with a magnetic strip payment card (hereinafter referred to as a "Magcard"). In one example, account information and other data received from the Magcard is read by the magnetic strip reader interface 2408 in connection with and/or to facilitate a purchase transaction. For example, upon swiping a Magcard through the magnetic strip reader interface 2408, the account information and other data is received by the magnetic strip reader interface 2408 and transmitted via the bus 2413 to the magnetic strip reader processing circuit 2406 for processing. The processing circuit 2406 may execute one or more applications 2416 stored within the memory 2404 to carry out specific tasks in connection to facilitating the purchase transaction. For example, the magnetic strip reader processing circuit 2406 may control the magnetic strip reader interface 2408 to receive the account information and the other data. The processing circuit 2406 may then process the data by confirming its authenticity (valid bit string length, unexpired card, etc.). The processing circuit 2406, in conjunction with the cryptography module 2412 may also encrypt the data received. The processing circuit 2406 may then process the data for transmission to the mobile device 2450 through the internal interface 2410. These steps may be performed automatically after the Magcard is swiped through the magnetic strip reader interface 2408.

In other embodiments, the account information and other data may also be transmitted via the bus 2413 to the memory module 2404 for storage. In one example, the magnetic strip reader processing circuit 2406 may be a programmable logic array that processes account information and other data directly received from the magnetic strip reader interface 2408.

In one embodiment, the mobile device 2450 may execute a payment processing application 2458 on the mobile device processing circuit 2454 to receive and process the account information and other data received from the payment processing accessory 2402. The payment processing application 2458 may be a unique application specially developed by a particular merchant account provider using a software development kit (SDK) provided to the merchant account provider by the manufacturer of the payment processing accessory 2402. The application 2458, once executed, may allow a user of the mobile device 2450 to enter detailed information related to the particular purchase transaction. For example, the user may be prompted to enter purchase amount information, a card holder's signature, date of transaction, etc. into an input interface 2452, such as a keyboard, touch-screen display, etc., of the mobile device 2450. Other information may also be entered such as any security passwords necessary to proceed with the transaction, for example, a PIN known to either the card holder or the merchant processing the transaction.

Once the necessary account information and other data has been received by the mobile device 2450 from the payment processing accessory 2402, and any details regarding the purchase amount have been entered, the transmission and receive (Tx/Rx) circuit 2464 of the mobile device 2450 may wirelessly transmit the account information (e.g., credit card number) and purchase transaction information (e.g., transaction amount, etc.) through the mobile device's wireless network to the merchant account provider for approval. The Tx/Rx circuit 2464 of the mobile device 2450 may also receive an acknowledgment message from the merchant account provider that the charge was approved (or another message that it was declined). The acknowledgment message may be communicated to the purchaser or merchant via the output interface 2466 of the mobile device 2450.

Upon approval, a receipt detailing the transaction may be generated by the mobile device 2450. A signature of the card holder may also be entered through the input interface 2452 of the mobile device to validate the transaction. The receipt information along with any signature may be transmitted wirelessly, or by wire contact, to a local printer for printing. In other embodiments, an email address associated with the purchaser or the Magcard may be entered into the mobile device 2450 via the input interface 2452. Then, upon approval of the transaction the receipt can be emailed to the email address entered by the mobile device 2450. In yet other embodiments, a receipt detailing the transaction may be generated either before or after a signature is acquired from the purchaser via the input interface 2452.

In other embodiments, a user may start a purchase transaction by launching the payment processing application 2458 on the mobile device 2450 to initialize the payment processing accessory 2402. The processing circuit 2454 may then execute the application 2458 to generate a read request signal that is transmitted to the magnetic strip reader processing circuit 2406 through the mobile device interface 2460—internal interface 2410 connection. Once the processing circuit 2406 of the payment processing accessory 2402 receives the read request signal, it initializes the magnetic strip reader interface 2408 to enter an idle state that is ready to receive account information and other data from a Magcard. In the idle state, the magnetic strip reader interface 2408 will receive the data once a Magcard is swiped. When no read request signal is present, or has not been received in a given time period, hardware components within the payment processing accessory 2402 may be turned off or put in a lower power standby mode thereby minimizing power consumption by the payment processing accessory 2402 when no purchase transaction is expected.

If during the idle state, a Magcard is swiped through the magnetic strip reader interface 2408, the processing circuit 2406 receives the account information and associated data of the Magcard and may process, encrypt, and/or store the data as discussed above. The data may also be transmitted to the mobile device 2450 for completion of the purchase transaction as discussed in the embodiment above.

In other embodiments, the payment processing accessory 2402 may do more than read information from a Magcard and provide it to the mobile device 2450 for processing a purchase transaction. For instance, in cases where the mobile device may not have a connection to a network through which a transaction can be validated (e.g., through which a credit card payment can be approved), the payment processing accessory 2402 may itself include a wireless connection that is capable of communicating with a merchant account provider to validate the transaction. In some implementations, the payment processing accessory 2402 may be powered by the mobile device 2450 via the internal interface 2410, while in other implementations the payment processing accessory 2402 may have its own internal power source (e.g., power cell module 2316 in FIG. 23A).

In yet other implementations, the payment processing accessory 2402 may include an input device to authenticate the user of the Magcard. For example, the payment processing accessory 2402 may include a finger print scanner that collects the payor's finger print and provides it to the mobile device 2450 via the internal interface 2410. The finger print information may be subsequently sent to a merchant account provider for verification as part of authenticating the payment using the Magcard.

It should be understood that the payment processing accessory 2402 is not limited to just a magnetic card reader. In various implementations the payment processing accessory 2402 may include a smart card, proximity reader, and/or bar code scanner adapted to collect information from a payor's payment card.

Figure 25:
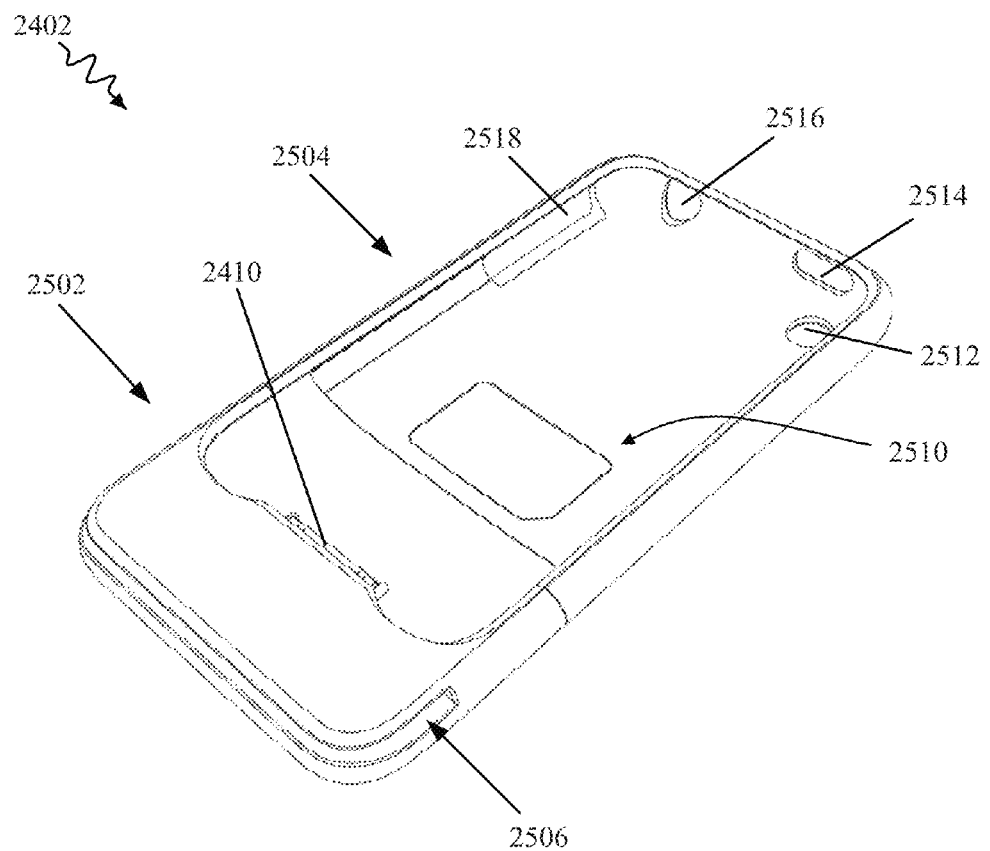
FIG. 25 illustrates a front perspective view of the payment processing accessory.

FIG. 25 illustrates a perspective view of one embodiment of the payment processing accessory 2402. In this example, the payment processing accessory 2402 comprises a casing or holster that is shaped to receive or house a mobile device within a cavity 2510. The cavity 2510 may be contoured to match the outer shape of the particular mobile device the payment processing accessory 2402 is intended to mate with and provide payment card transaction processing capabilities to. FIG. 25 illustrates the internal interface connector 2410 that couples to the corresponding mobile device interface 2460 for the transmission of data between the accessory 2402 and mobile device 2450. The internal interface connector 2410 may snap or lock into place with the mobile device interface 2460 to provide a secure physical connection between the accessory 2402 and mobile device 2450.

The payment processing accessory 2402 may include one or more openings 2512, 2514, 2516, and 2518 to facilitate access to various features of the mobile device. For instance, a first opening 2512 may allow an unobstructed view for a camera lens on the back of the mobile device. A second opening 2514 may provide access to a screen on/off switch for the mobile device. A third opening 2516 may provide access to an audio jack on the mobile device. A fourth opening 2518 may provide access to a volume control sliding switch.

Figure 26:
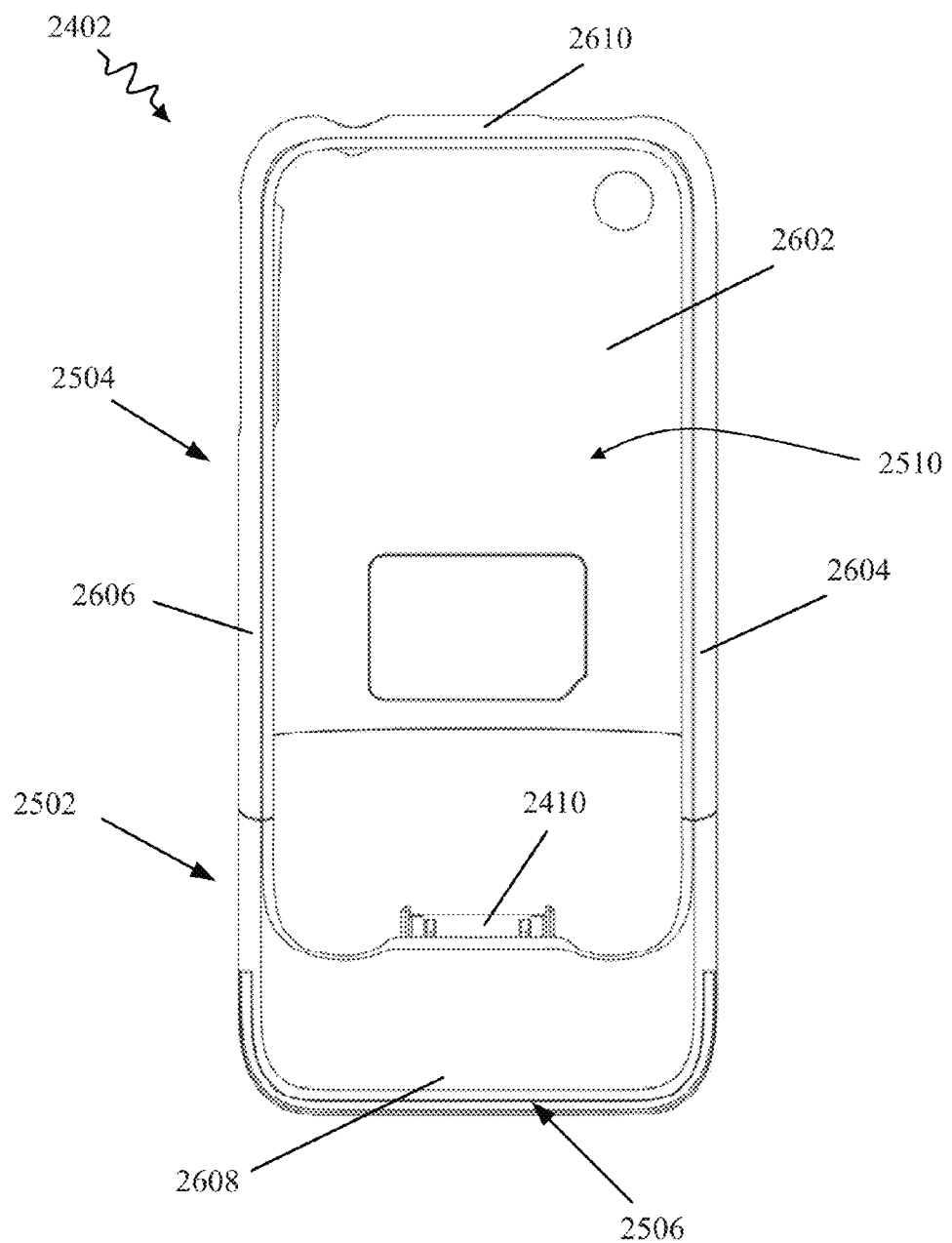
FIG. 26 illustrates a front view of the payment processing accessory.

FIG. 26 illustrates a front view of the payment processing accessory 2402 of FIG. 25. The payment processing accessory 2402 includes a back plane 2602, first and second sides 2604 and 2606, a bottom side 2608, and a top side 2610. The back plane 2602, first and second sides 2604 and 2606, bottom side 2608, and top side 2610 may be shaped to form a pocket or cavity 2510 in which a mobile device can be housed. The top side 2610 of the payment processing accessory 2402 may slide out to allow insertion and removal of the mobile device.

Referring back to FIG. 25, the payment processing accessory 2402 comprises a bottom section 2502 and a top section 2504 that can be separated from each other to allow a mobile device to be inserted within the cavity 2510. The two sections can then be coupled together to secure the mobile device in place. The payment processing accessory 2402 also comprises a magnetic strip swiping region 2506 within which the magnetic strip reader interface is housed. The magnetic strip reader interface is configured to read Magcard account information and other data associated with the Magcard. The magnetic strip reader interface obtains this information when the Magcard is swiped through the magnetic strip swiping region 2506 causing the magnetic strip of the Magcard containing the aforementioned data to come into contact with the magnetic strip reader interface.

In the embodiment shown, the magnetic strip swiping region 2506 is located along the bottom side 2608 of the mobile device 2450. This feature allows a user to conveniently hold the mobile device and payment processing accessory 2402 in his/her palm along the first and second sides 2604 and 2606, while sliding a Magcard along the magnetic strip swiping region 2506. In this fashion the magnetic strip swiping region 2506 is not obstructed by the user's hand when the payment processing accessory 2402 housing the mobile device is held is held along the first and second sides 2604 and 2606.

The circuits and/or components of the payment processing device 2402 may be housed within the bottom section 2502 and/or top section 2504. For example, the magnetic strip reader processing circuit 2406 and magnetic strip reader interface 2408 may be housed within the bottom section 2502. A power cell module 2316 may be housed within the thickness of the back plane 2602 of the top section 2504.

Figure 27A:
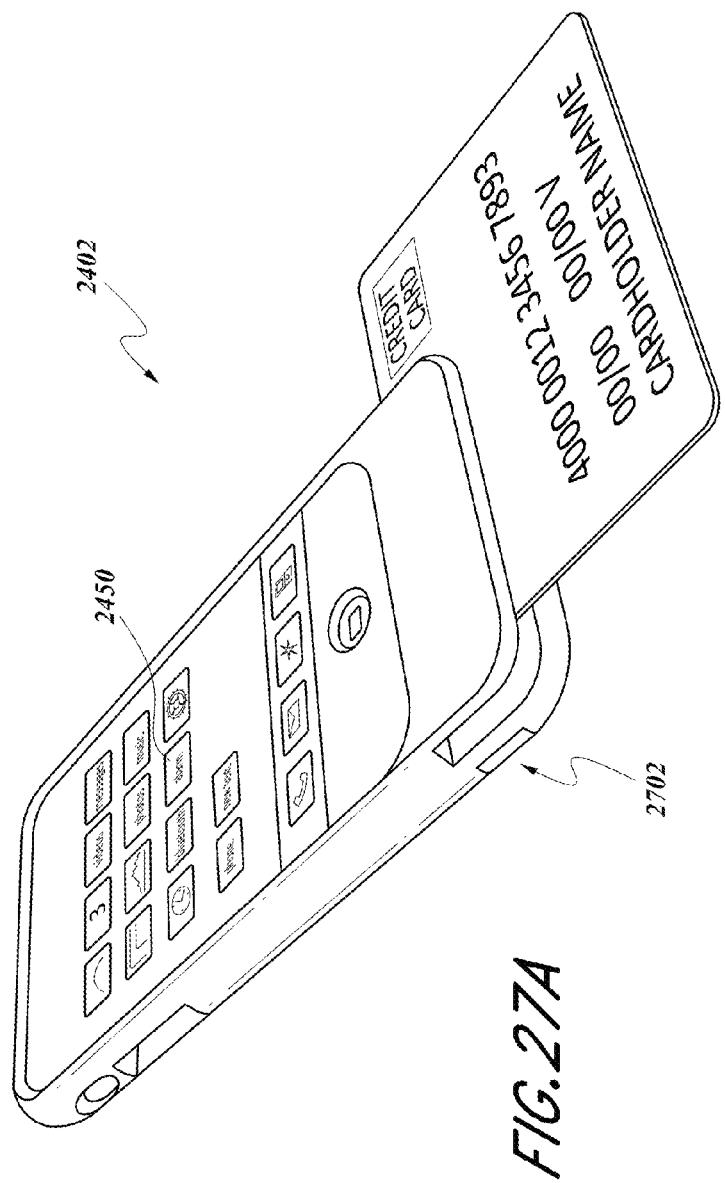

FIGS. 27A and 27B illustrate perspective views of a mobile device 2450 housed within the casing of the payment processing accessory 2402. As can be appreciated from the figures, the payment processing accessory 2402 is shaped to closely wrap around the mobile device 2450, and serves as a protective case for the mobile device 2450. FIGS. 27A and 27B illustrate how a credit card may be swiped through the magnetic strip swiping region 2506. FIG. 27A illustrates an embodiment of the payment processing accessory 2402 that features a mini-USB interface 2702 for charging of the battery of the mobile device 2450, and/or providing a means for communication with the payment processing accessory 2402. FIG. 27B illustrates how an interface cable may be connected to the mini-USB interface 2702 to charge the mobile device 2450 and/or communicate with payment processing accessory 2402.

Figure 28:
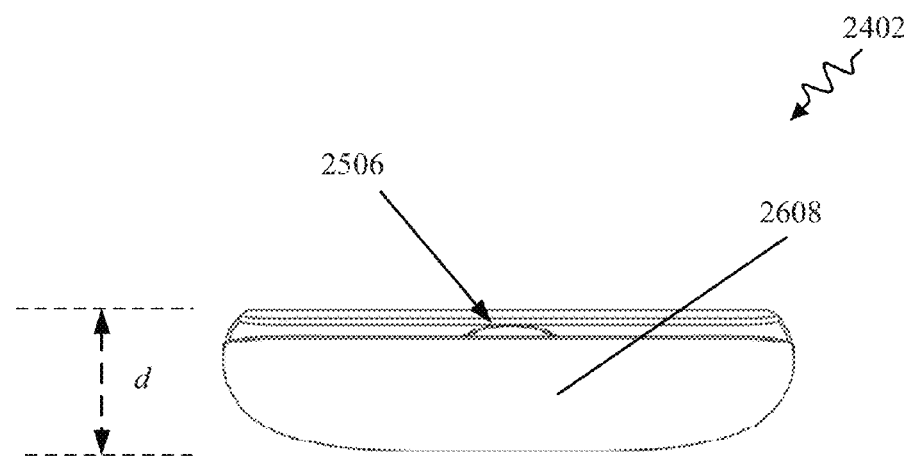
FIG. 28 illustrates a bottom view of the payment processing accessory.
Figure 29:
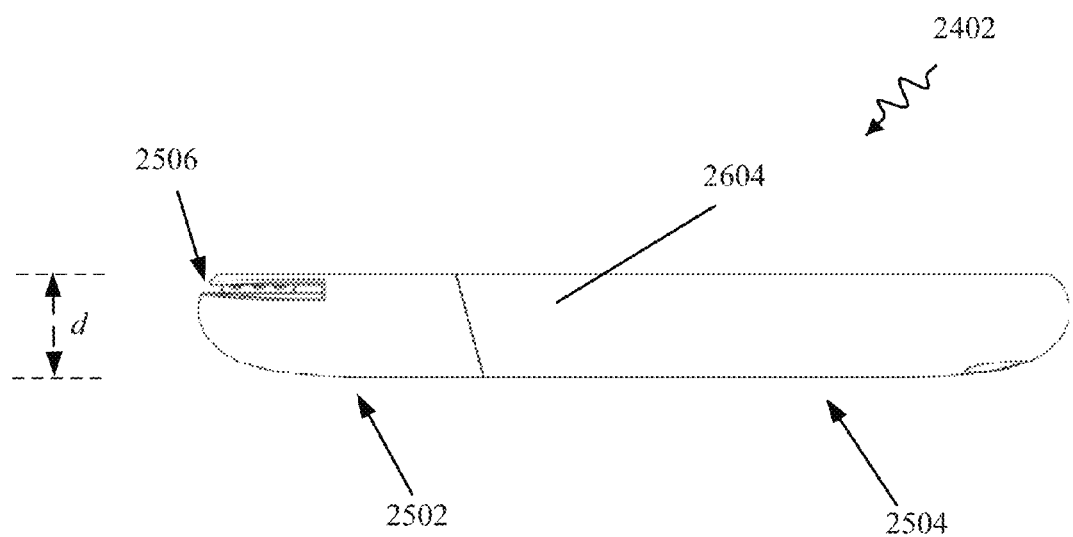
FIG. 29 illustrates a side view of the payment processing accessory.

FIG. 28 illustrates a bottom view of the payment processing accessory 2402. FIG. 29 illustrates a side view of the payment processing accessory 2402. FIGS. 28 and 29 illustrate a measurement d that represents the maximum depth of the casing of the payment processing accessory 2402 (also referred to as the thickness of the payment processing accessory 2402). In the preferred embodiment, the depth d is designed to be as thin as possible so that the overall depth/thickness of the mobile device 2450 and payment processing accessory 2402 together is not substantially more than the depth/thickness of the mobile device 2450 by itself. In one embodiment, the depth d of the payment processing accessory 2402 is less than the depth/thickness of the mobile device 2450 plus 0.25 inches. In another embodiment, the depth d of the payment processing accessory 2402 is less than the depth/thickness of the mobile device 2450 plus 0.125 inches. In another embodiment, the depth d of the payment processing accessory 2402 is less than 1 inch. In yet another embodiment, the depth d of the payment processing accessory 2402 is less than 0.75 inches. In yet other embodiments, the depth d of the payment processing accessory 2402 is less than 0.5 inches. By having a thin depth/profile, the payment processing accessory 2402 housing the mobile device 2450 can be conveniently stored, for example, in the pocket of the user. Payment processing accessories for mobile devices that have a substantially thicker depth/profile cannot comfortably be stored in the pocket of a user.

Figure 30:
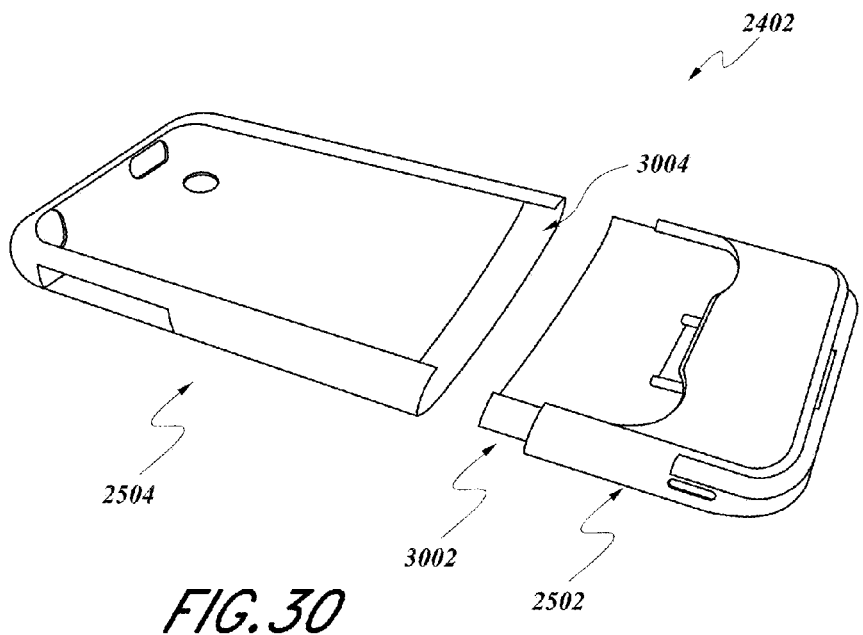
FIG. 30 illustrates the top section of the payment processing accessory detached from the bottom section.

FIG. 30 illustrates the payment processing accessory 2402 of FIG. 25 in an open configuration where the top section 2504 and a bottom section 2502 have been separated. The top section 2504 and the bottom section 2502 may come apart to allow the mobile device 2450 to be inserted into the cavity 2510. The top and bottom section 2504 and 2502 may then be secured to one another to secure the mobile device 2450 within the cavity 2510. In one embodiment, the top section 2504 may include a female connector groove 3004 that receives a male connector rail 3002 of the bottom section 2502. The mail connector rail 3002 is configured to fit inside the female connector groove 3004 to secure the top section 2504 to the bottom section 2502. In this manner, the top section 2504 can be coupled to the bottom section 2502 by pressure fit.

Figure 31:
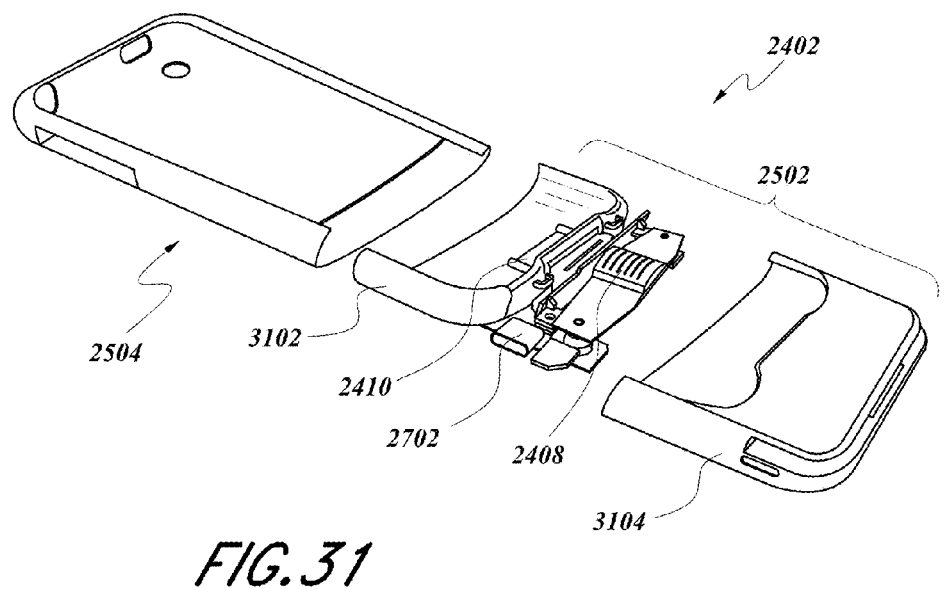
FIG. 31 illustrates an exploded view of the bottom section of the payment processing accessory.

FIG. 31 illustrates the payment processing accessory 2402 with an exploded view of the bottom section 2502. For example, the bottom section 2502 may comprise an inner section 3102, an outer section 3104, the mini-USB interface 2702, the magnetic strip reader interface 2408, and the internal interface 2410. The inner section 3102 and outer section 3104 form a top and bottom shell in between which the mini-USB interface 2702 and the magnetic strip reader interface 2408 are substantially housed. A portion of the internal interface 2410 is also housed within the inner section 3102 and outer section 3104. Consequently, the mini-USB interface 2702, the magnetic strip reader interface 2408, and the internal interface 2410 may be housed within the thickness of the bottom section 2502 of the payment processing accessory 2402.

Figure 32A:
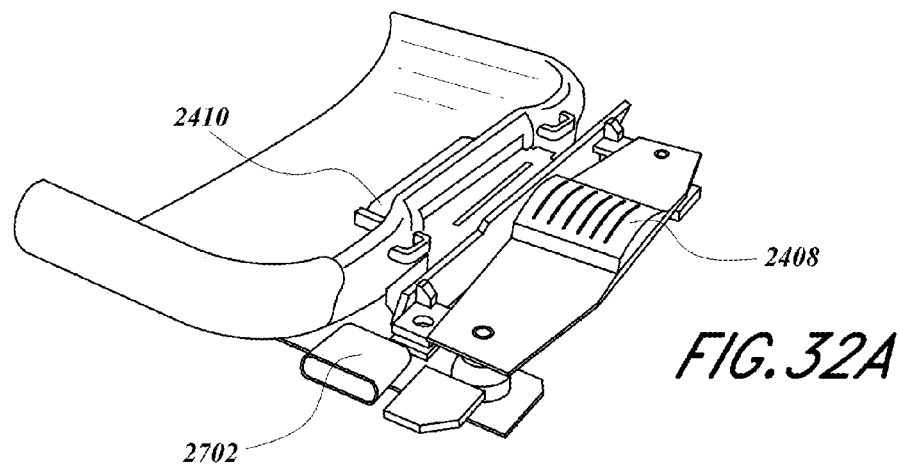
FIG. 32A-32C illustrate perspective views of the internal contents of the bottom section of the payment processing accessory.
Figure 32B:
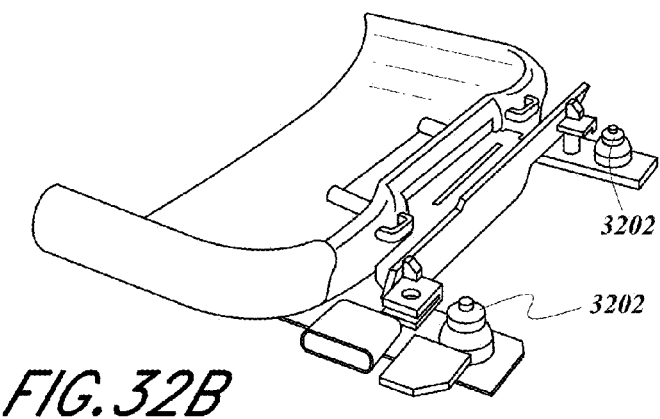
Figure 32C:
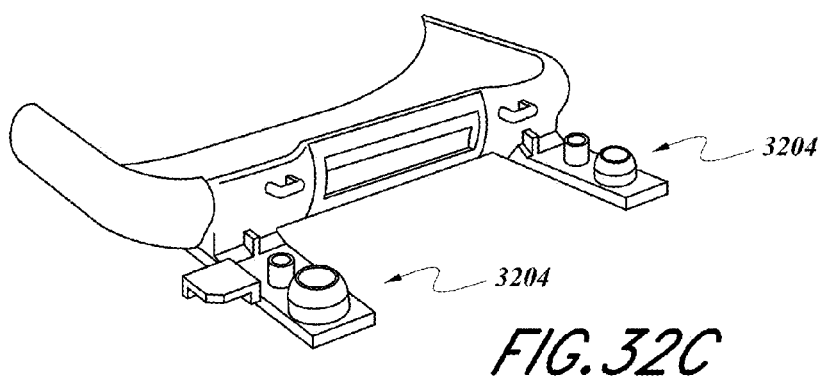

FIG. 32A illustrates a perspective view of the internal contents of the bottom section 2502, including, for example, the magnetic strip reader interface 2408, the internal interface 2410, and the mini-USB interface 2702. FIG. 32B illustrates a perspective view of the magnetic strip reader interface contact points 3202 to which the magnetic strip reader interface 2408 may secure to. FIG. 32C illustrates a perspective view of the mounting rails 3204 that secure the magnetic strip reader interface contact points 3202, the magnetic strip reader interface 2408, the internal interface 2410, and the mini-USB interface 2902.

In other embodiments, the payment processing accessory 2402 may be adapted to have an additional interface that is configured to read "chip and pin" based payment systems, such as, but not limited to, "smart cards." In yet other embodiments, the payment processing accessory 2402 may be adapted to have yet another interface that is configured to read radio frequency identification (RFID) tags that are associated with an electronic payment system of a merchant account provider. In yet other embodiments, the payment processing accessory 2402 may comprise only one of or any combination of: a magnetic card reader interface, chip and pin reader interface, and/or RFID reader interface.

Smart Card Reader Embodiment

Figure 33:
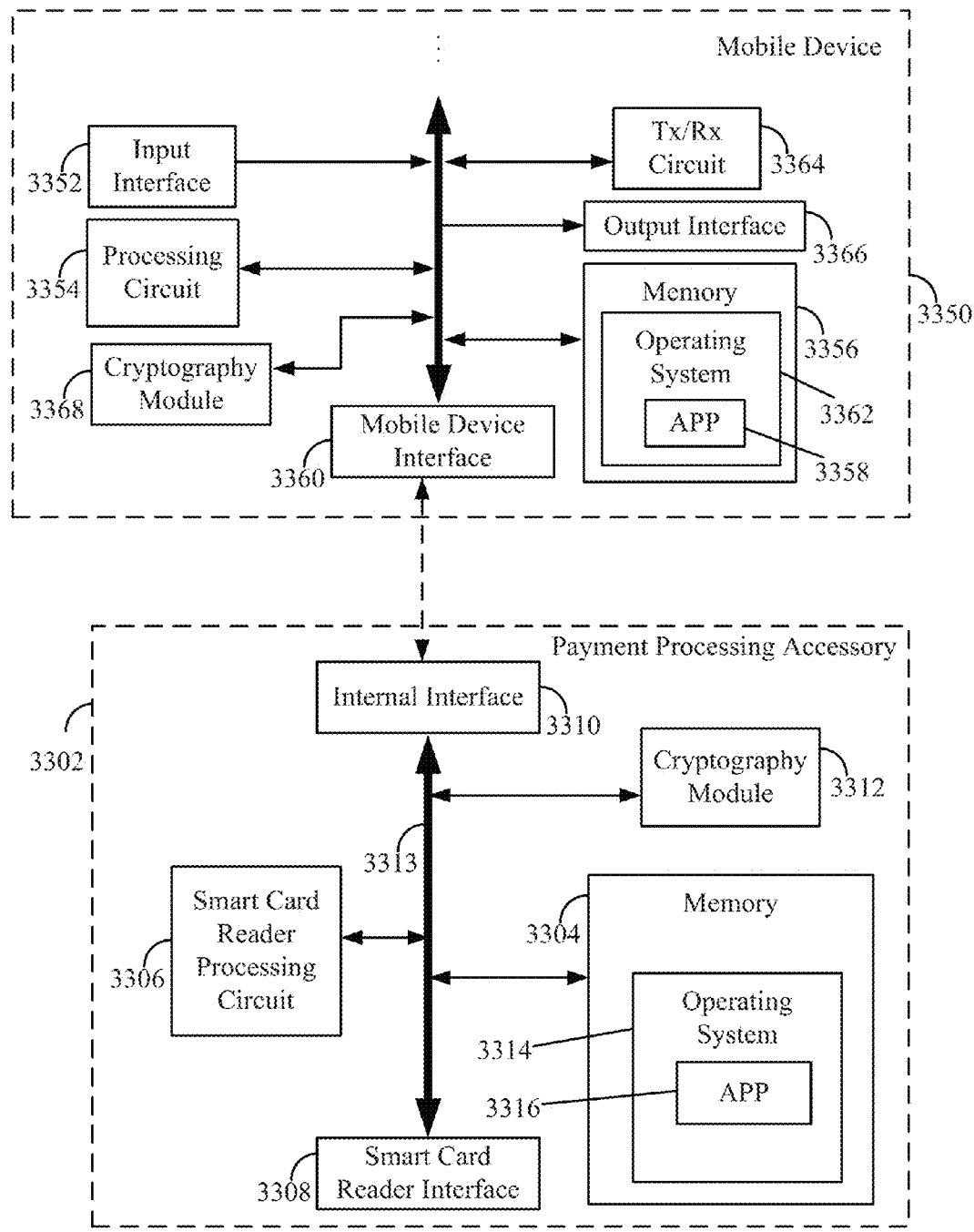
FIG. 33 illustrates a functional block diagram of one embodiment of a payment processing mobile accessory adapted to read data stored on a chip embedded into a payment card.

FIG. 33 illustrates a functional block diagram of another embodiment of a payment processing mobile accessory 3302 adapted to read data stored on an integrated chip embedded into a payment card, such as a "smart card" and/or contactless (near field communication) smart card. The payment processing accessory 3302 may comprise a memory module 3304, a smart card reader processing circuit 3306, a smart card reader interface 3308, an internal interface 3310, an encryption module 3312, and a bus 3313. The bus 3313 allows for communication between the memory module 3304, the smart card reader processing circuit 3306, the smart card reader interface 3308, the internal interface 3310, and the encryption module 3312.

The steps and functions performed by the payment processing accessory 3302 may be very similar to those described in relation to the magnetic payment processing accessory 2402 in FIG. 24. The memory module 3304 may comprise an operating system 3314, and one or more applications 3316. The memory module 2404 may comprise one or more independent computer data storage devices, such as, but not limited to, flash memory, ROM, RAM, hard disks, optical disks, and the like. The operating system (OS) 3314 can be any type of OS that adequately manages and coordinates the activities and sharing of the payment processing accessory's 3302 resources, such as, but are not limited to, Android™, iPhone OS™, Symbian OS™, BlackBerry OS™, Windows Mobile™, Linux, Palm webOS™, and Maemo™. The OS 3314 may also host a variety of computing applications that are resident on memory module 3304.

The smart card reader interface 3308 may be configured to read account information and other related data stored on a chip embedded into payment card, such as a smart card. In one embodiment, the smart card reader interface 3308 can be configured to accept and read data from a smart card featuring electrical contacts. In another embodiment, the smart card reader interface 3308 can be configured to accept and read data from a contactless smart card. In such an embodiment, the smart card reader interface uses radio-frequency waves to communicate with the chip embedded within the contactless smart card. In either embodiment, account information and/or other related data stored on the chip within the smart card is read by the smart card reader interface 3308.

Once the account information and/or other data has been received by the mobile device 3350 from the payment processing accessory 3302, and any details regarding the purchase amount and a user pin have been entered, the transmission and receive (Tx/Rx) circuit 3364 of the mobile device 3350 may wirelessly transmit the account information, pin information, and purchase transaction information through its wireless network to the merchant account provider for approval. The Tx/Rx circuit 3364 of the mobile device 3350 may also receive an acknowledgment message from the merchant account provider that the charge was approved. The acknowledgment message may be communicated to the purchaser or merchant via the output interface 3366 of the mobile device 3350.

Upon approval, a receipt detailing the transaction may be generated by the mobile device 3350. The receipt information may be transmitted wirelessly, or by wire contact, to a local printer for printing. In other embodiments, an email address associated with the purchaser or the smart card may be entered into the mobile device 3350 via the input interface 3352. Then, upon approval of the transaction the receipt can be emailed to the email address entered by the mobile device 3350. In yet, other embodiments, a receipt detailing the transaction may be generated either before or after a signature is acquired from the purchaser via the input interface 3352.

Note that, in some implementations, a payment processing accessory may include a combination of payment input interfaces, such as a smart card reader interface 3308, a magnetic strip reader interface 2408, and/or other types of payment input interfaces.

Near Field Communication Accessory

Figure 34:
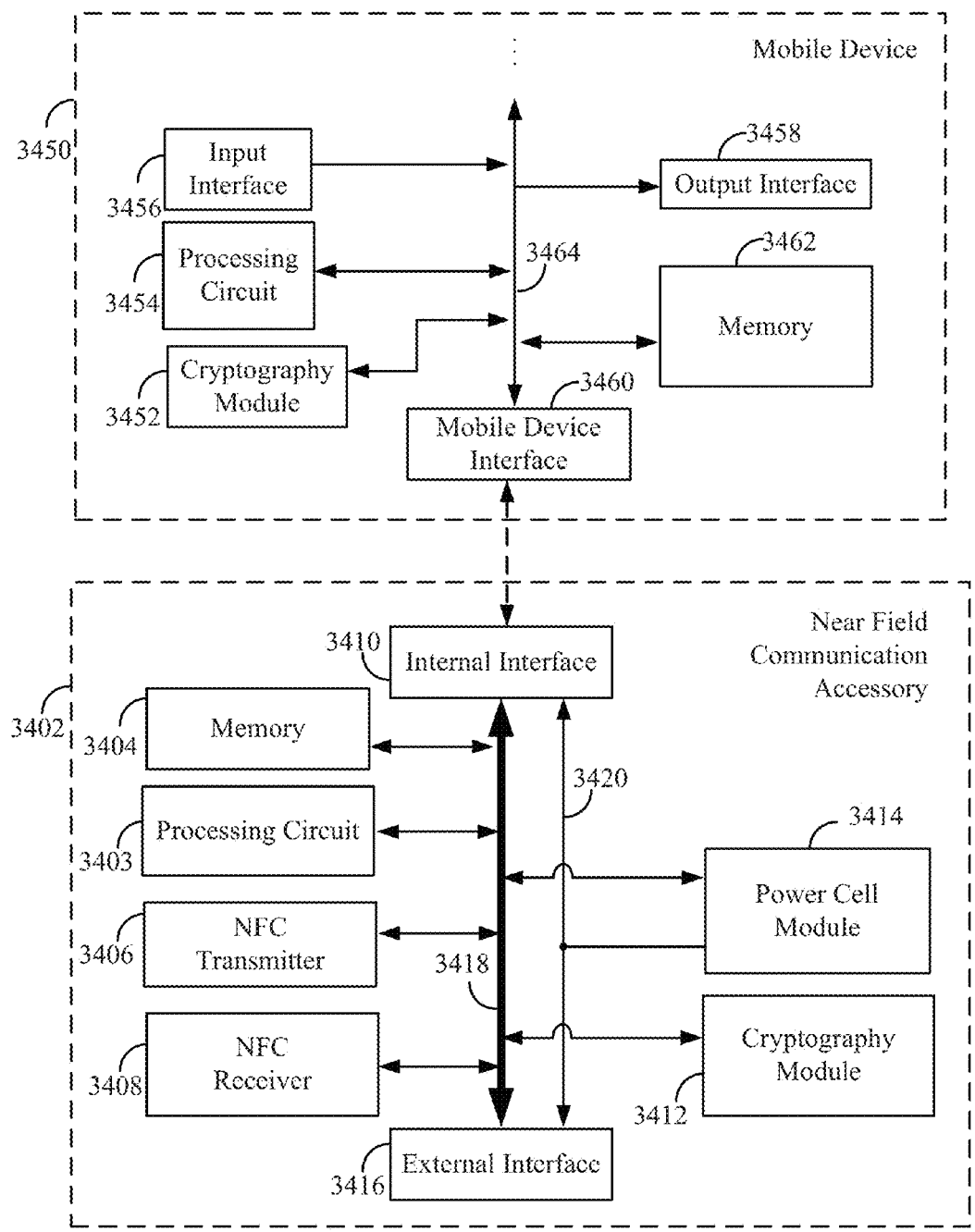
FIG. 34 illustrates a functional block diagram of a near field communication mobile accessory.

In another embodiment, FIG. 34 illustrates a near field communication (NFC) accessory 3402 for a mobile device 3450. The NFC accessory 3402 is capable of communicating with ISO/IEC 14443 smartcards and readers, as well as with other NFC devices, thereby equipping the mobile device 3450 with NFC capability. The NFC accessory 3402 may comprise a processing circuit 3403, a memory circuit 3404, an NFC transmitter 3406, an NFC receiver 3408, an internal interface 3410, a cryptography module 3412, a power cell module 3414, an external interface 3416, a data bus 3418, and a power bus 3420. The data bus 3418 communicatively couples the processing circuit 3403, the memory circuit 3404, the NFC transmitter 3406, the NFC receiver 3408, the internal interface 3410, the cryptography module 3412, the power cell module 3414, and the external interface 3416.

The NFC accessory 3402 may transmit to and receive data from the mobile device 3450. Specifically, the internal interface 3410 of the NFC accessory 3402 communicatively couples to the mobile device interface 3460 of the mobile device 3450. In one embodiment, the internal interface 3410 and mobile device interface 3460 physically couple to one another to transmit data through a wire, bus, and/or electrical contact connection. Such a connection may also serve to physically secure the NFC accessory 3402 to the mobile device 3450. Alternatively, or in addition to such a wired connection, the internal interface 3410 may transmit and receive data to the mobile device 3450 wirelessly using, for example, a Bluetooth standard, or any one of the 802.11 standards.

The power cell module 3414 is an optional module that may comprise the power cell 1404, charge level indicator 1410, recharging module 1704, and switch 1412 of FIG. 17. The power cell module 3414 and its components may perform some or all of the functions of the battery pack described in FIGS. 1-22. For example, the power cell module 3414 may provide power to the mobile device 3450 through the internal interface 3410 via the power bus 3420, and/or power the NFC accessory 3402.

The memory circuit 3404 may comprise volatile and/or non-volatile storage devices for storing an operating system, software applications, and/or data. In one example, the memory circuit 3404 may comprise one or more independent computer data storage devices, such as, but not limited to, flash memory, ROM, RAM, hard disks, optical disks, and other computer data storage devices known in the art. The operating system (OS) can be any type of OS that adequately manages and coordinates the activities and sharing of the NFC accessory's 3402 resources, such as, but not limited to, Android™, iPhone OS™, Symbian OS™, BlackBerry OS™, Windows Mobile™, Linux, Palm webOS™, and Maemo™. The OS may also host a variety of computing applications that are resident on memory circuit 3404.

The cryptography module 3412 of the external processing accessory 3402 may serve to encrypt and/or decrypt data sent wirelessly or by wire between the internal interface 3410 and the mobile device interface 3460. Various types of data encryption techniques may be utilized that are well known in the art including: symmetric-key cryptography such as DES, AES, hashing functions (MD5, SHA-1, SHA-2, SHA-3, etc.); and asymmetric-key cryptography such as digital signature schemes like RSA and DSA. The cryptography modules 3412 and 3452 may be implemented using hardware circuitry, software, or both.

The NFC transmitter 3406 and NFC receiver 3408 are responsible for transmitting and receiving, respectively, data to and from another target NFC device (also referred to as an external NFC device) using near field communication. The transmitter 3406 and receiver 3408 may utilize magnetic field induction to communicate with the target NFC device over a short distance, such as, 20 centimeters. The NFC accessory 3402 can communicate with both existing ISO/IEC 14443 smartcards and readers, as well as with other NFC devices. The transmitter 3406 and receiver 3408 may operate in either a passive communication mode or an active communication mode. Various types of data may be exchanged between the NFC accessory 3402 and the target NFC device.

For example, in one embodiment, an application executed on the mobile device 3450 allows a user to enter in payment card information, such as, credit card numbers, debit card numbers, and information associated with each payment card such as, expiration dates, PIN numbers, billing addresses, etc. via an input interface 3456. The data entered may be stored on the mobile device memory 3462 (which may also store the application executed), and/or transmitted to the NFC accessory 3402 via the mobile device interface 3460 and internal interface 3410 connection. The processing circuit 3403 of the NFC accessory 3402 may receive the payment card data for each payment card and program the NFC transmitter 3406 with the payment card data and associated information.

A user then desiring to make a payment with one of the stored cards may select a card (e.g., through the application on the mobile device 3450) and request that the NFC transmitter 3406 transmit the payment card data to another NFC device responsible for receiving the payment card data. The other NFC device may be pay station that receives and processes payment. For example, the other NFC device may transmit the payment data to a merchant account provider that processes the payment and approves the transaction. The NFC device may then communicate an acceptance message (or denial) to the NFC accessory 3402, which receives the communication via the NFC receiver 3408. The acceptance or denial message may then be transmitted to the mobile device 3450 from the NFC accessory 3402 for any further processing. In one embodiment, the cryptography module 3412 encrypts the payment card data prior to transmission of the data by the NFC transmitter 3406.

In this manner, the combination of the mobile device 3450 and NFC accessory 3402 may serve as an "electronic wallet" whereby a user may avoid having to carry a multitude of physical credit cards. This scheme may also provide improved security over traditional credit cards since the application may request the user to authenticate themselves by, for example, entering a password or PIN prior to clearance of the transaction.

In another embodiment, an application on either the mobile device 3450 or the NFC accessory 3402 keeps track of all such payment transactions and logs information related to the payment transactions to generate expense reports and the like. For example, the application may store time, date, and purchase price information for all payment card transactions that take place. This may assist a user later by having a convenient record of where each transaction took place and how much it was for. For example, a user on a business trip may keep track of all business related expenses and print out the expense report for reimbursement. The application may also utilize GPS hardware resident on the mobile device 3450 or within the accessory 3402 to monitor exactly where the transactions took place. In this fashion, the application can store the time, date, purchase price, and location information for all payment transactions executed. By further utilizing information available on the internet, the application can make an educated guess as to what specific retailer the transaction was executed at by cross referencing the GPS coordinates with a public directory of businesses according to a map.

In another embodiment, the NFC accessory 3402 may provide the mobile device with payment processing capabilities. Specifically, the NFC receiver 3408 may receive data associated with a payment card, such as credit card numbers, expiration date, etc. from another NFC device such as a smart card based credit card. In another embodiment, the NFC accessory 3402 may receive data associated with a coupon from an NFC enabled billboard. For example, an NFC capable kiosk or advertising station may store a plurality of coupon data that is available for download. A user of the NFC accessory 3402 may place the NFC accessory 3402 near the advertising station so that the NFC receiver 3408 may receive and download coupon data using near field communication. The NFC accessory 3402 may then store the coupon data within its memory 3404 and/or transmit it to the mobile device 3450 for storage and/or display of the information acquired to the user.

In another embodiment, the NFC accessory 3402 may transmit coupon data to another NFC device. For example, coupon data that was previously acquired from an advertising station as discussed above may then be redeemed by transmitting the coupon data to a coupon data receiver at, for example, the cashier of the merchant associated with the coupon. The coupon data may also have been acquired from the internet. For example, the mobile device 3450 may connect to the internet and download coupon data from a merchant's website and then transmit this data using the NFC transmitter 3406 to receiving NFC device for redemption.

In another embodiment, the NFC accessory 3402 may be programmed to store access key card information used to open doors and gain access to areas restricted by NFC door locks. Thus, a user would not have to carry around a plurality of NFC access cards. Instead, the user may program all such access card information onto the NFC accessory 3402 and use the NFC accessory 3402 to transmit this information to gain access to restricted areas.

In another embodiment, the NFC accessory 3402 may be programmed to store public transportation account information that allows a user to gain access to a subway car or other public transportation system. For example, the NFC transmitter 3406 may transmit public transportation account information such as travel credit to an NFC kiosk at the public transportation station. The NFC kiosk is configured to receive the travel credit, deduct it from the user's balance, and allow the user access to the public transportation system.

The NFC accessory 3402 can be programmed to store a plethora of information that can later be transmitted to another NFC device receiver. Other such uses may include programming plane or train ticket information onto the NFC accessory 3402 for expedited processing at the airport or train station; programming user identification and/or passport information to the NFC accessory 3402; and purchasing and receiving event tickets from a kiosk or transmitting event ticket information for redemption.

Television Signal Receiver and Battery Pack Mobile Accessory

Figure 35:
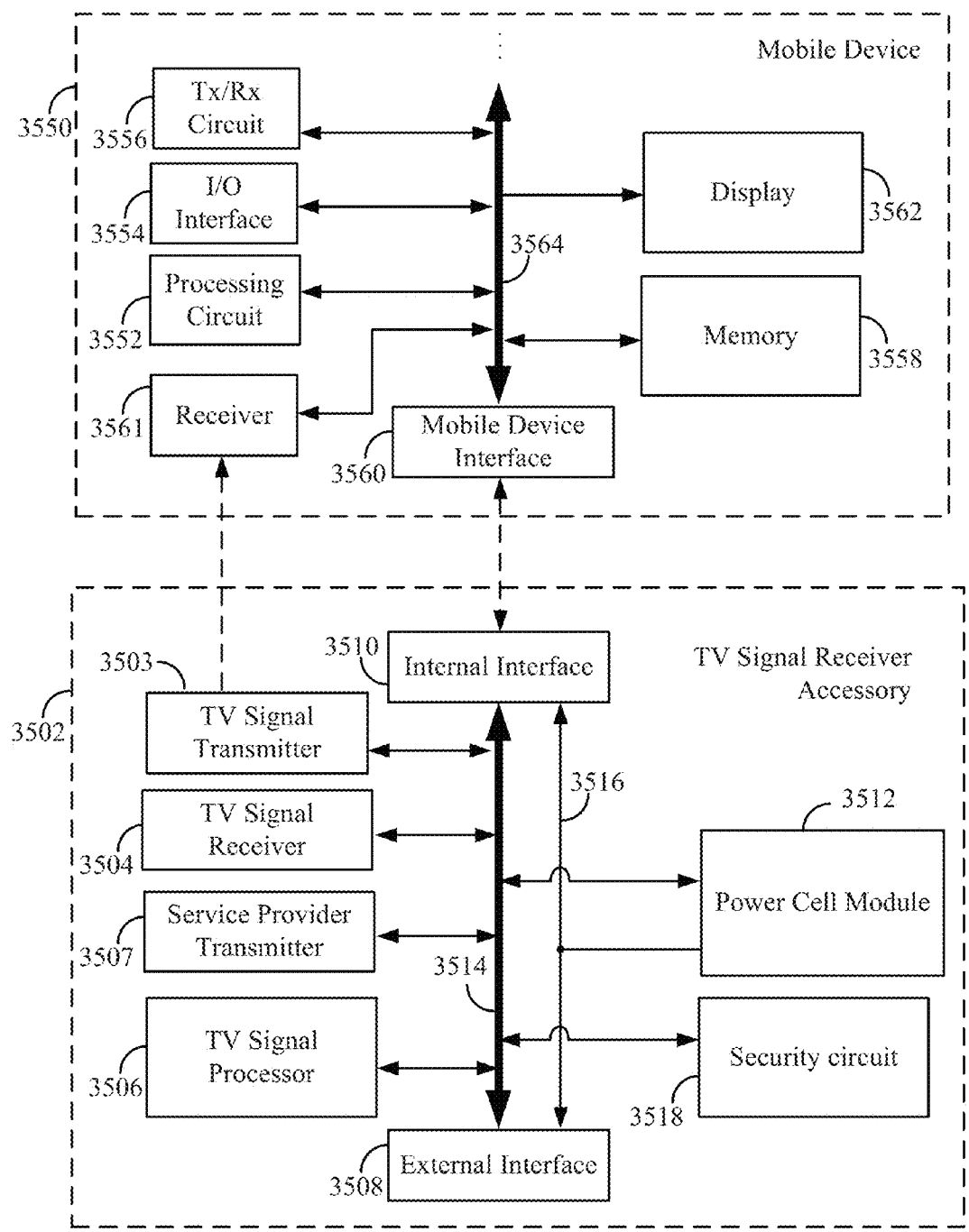
FIG. 35 illustrates a functional block diagram of a television signal receiver and battery pack mobile accessory.

In another embodiment, a television signal receiver accessory for a mobile device is disclosed. FIG. 35 illustrates a functional block diagram of a television signal receiver and battery pack mobile accessory 3502 (hereinafter "TV receiver accessory 3502"). The TV receiver accessory 3502 may comprise a TV signal receiver 3504, a TV signal processor 3506, a TV signal transmitter 3503, a service provider transmitter 3507 an external interface 3508, an internal interface 3510, a power cell module 3512, a data bus 3514, and/or a power bus 3516. The data bus 3514 may allow for communication between the TV signal receiver 3504, TV signal transmitter 3503, TV signal processor 3506, service provider transmitter 3507, the external interface 3508, the internal interface 3510, and/or the power cell module 3512.

The power cell module 3512 is an optional module that may comprise the power cell 1404, charge level indicator 1410, recharging module 1704, and switch 1412 of FIG. 17. The power cell module 3512 and its components perform all the functions of the battery pack described above. For example, the power cell module 3512 may provide power to the mobile device 3550 through the internal interface 3510 via the power path 3516. The power cell module 3512 may also power the hardware components of the TV receiver accessory. The power cell module 3512 may also recharge the battery of the mobile device 3550 through the internal interface 3510 via the power path 3516.

The TV receiver accessory 3502 may be configured to receive and process analog and/or digital television signals, and transmit the television signal data to the mobile device 3550 for viewing on the mobile device output display 3562. In one embodiment of the TV receiver accessory 3502, the TV signal receiver 3504 is configured to receive various types of television transmission signals. The TV signal receiver 3504 may comprise one or more antenna adapted for such a task. These television signals received may include, but are not limited to, one or more of the following: locally broadcast analog television signals, locally broadcast digital television signals, satellite digital multimedia broadcasting (S-DMB) signals, terrestrial digital multimedia broadcasting (T-DMB) signals, 1 Seg signals, digital video broadcasting—handheld (DVB-H or DVB-H2) signals, and MediaFLO based signals, such as FLOTV™ signals. In other embodiments, the TV signal receiver 3504 may also be configured to receive satellite digital audio radio service (SDARS) signals, such as XM™ and Sirius™ signals. In yet other embodiments, the TV receiver accessory 3502 may comprise additional circuitry and a separate antenna that is dedicated to receiving SDARS signals.

After the TV signal receiver 3504 receives the TV signals, the TV signal processor 3506 may perform any required processing, such as decryption, filtering, and/or data conditioning. The processed data may then be transmitted to the mobile device 3550 for display on the mobile device's display 3562. The processed data may either be transmitted wirelessly by the TV signal transmitter 3503 or by wire line connection through the internal interface 3510. The TV signal transmitter 3503 may transmit the data to a corresponding wireless receiver 3561 on the mobile device 3550. For example, the TV signal transmitter 3503 may utilize a Blue-Tooth™ communication protocol, or any 802.11 wireless protocol. The wireless link should have a bandwidth capable of transmitting audio and video signal components, including high definition video and sound signals.

In another embodiment, the TV signals may be transmitted to the mobile device 3550 through a wire line connection via the internal interface 3510 coupled to the corresponding mobile device interface 3560. The internal interface 3510 and the mobile device interface 3560 may physically and electrically couple to one another to facilitate transmission and reception of data between the mobile device 3550 and the TV receiver accessory 3502. This data may include the TV signals transmitted from the TV receiver accessory 3502 to the mobile device, service order data (e.g., pay per view order requests) transmitted from the mobile device 3550 to the TV receiver accessory 3502, and also power from the power cell module 3512 to the mobile device 3550.

The mobile device 3550 may comprise, among other things, a processing circuit 3552, an input and output (I/O) interface 3554, a transmission and receive (Tx/Rx) circuit 3556, memory 3558, the mobile device interface 3560, a TV signal receiver 3561, a display 3562, and/or a bus 3564. The bus 3564 may allow for communication between the processing circuit 3552, the I/O interface 3554, the transmit and/or receive (Tx/Rx) circuit 3556, memory 3558, the mobile device interface 3560, the receiver 3561, the display 3562, and/or other components of the mobile device 3550.

The processing circuit 3552 may receive the TV signals from the TV receiver accessory 3502 (via either the receiver 3561 or mobile device interface 3560), and perform further processing. For example, in one embodiment, the mobile device's memory 3558 contains an application that can be executed by the processing circuit 3552 to further process the television signal data received. The application may allow a user of the mobile device 3550 to display a channel guide feature by which the user may select a television program channel. The input interface 3554 may be used to select a channel, select recording options for recording select programs at select times, and change resolution and other display features. The processing circuit 3552 may also transmit the TV signals to the display 3562 for viewing by a user of the mobile device 3550.

In one embodiment, the TV receiver accessory 3502 comprises a service provider transmitter 3507 that allows the TV receiver accessory 3502 to transmit data to the service provider of the TV signals. For example, a user may choose to purchase certain programs (e.g., pay per view programs or movies) offered for purchase by the service provider. The selection may be made via the I/O interface 3554 (e.g., a keyboard) on the mobile device 3550 and transmitted to the TV receiver accessory 3502. The TV receiver accessory may then transmit this purchase order information to the service provider for processing.

In one embodiment, the user of the mobile device 3550 can utilize the Tx/Rx circuit 3556 of the mobile device 3550 to communicate with a television signal service provider (e.g., FLOTV™) to order and/or pay for select services. Communication may be performed wirelessly and carried out by the wireless network and/or service associated with the mobile device 3550. Thus, pay per view services may be ordered utilizing the transmitter circuit 3556 that the mobile device ordinarily uses for making and placing calls or data transfers.

In another embodiment, the TV receiver accessory comprises a security circuit 3518 that is configured to identify a subscriber/user of the TV accessory. For example, the security circuit may be a subscriber identity module (SIM) card that is removably coupled to the TV receiver accessory 3502 and contains a unique subscriber identity number. The security circuit 3518 may disable the TV receiver accessory if the SIM is not authenticated. For example, if a subscriber loses their TV receiver accessory 3502 or does not financially maintain their account, the service provider can disable functionality of the TV receiver accessory 3502 through the SIM card.

Thus, the TV receiver accessory 3502 allows a mobile device 3550 that does not have an integrated television tuner or circuit to receive and display over-the-air television signals (e.g., analog and/or digital).

Additional Features of the External Processing Accessory

Referring again to FIG. 23A, in various implementations the external processing mobile accessory 2302 may comprise an input interface 2308a that is configured to scan bar codes, such as, but not limited to, universal product codes (UPC) and two dimensional bar codes. The processor 2306a may process the data scanned by the bar code scanning input interface 2308a, and transmit the product information to the mobile device 2350 via the internal interface 2310. An application resident on the mobile device's memory 2356 may enable the user of the mobile device 2350 to identify the product/item scanned and carry out certain functions including, updating inventory records, generating purchase/sale transactions, etc. In another embodiment, the external processing accessory 2302 communicatively couples through external interface 2312 to an application specific accessory 2380 configured to scan such barcodes.

In another embodiment, the external processing mobile accessory 2302 may comprise an input interface 2308a that is configured to scan finger prints. The processor 2306a may process the finger print data scanned by the finger print reader input interface 2308, and transmit the finger print data to the mobile device 2350 via the internal interface 2310. An application resident on the mobile device's memory 2356 may be executed by the processing circuit 2354 to identify the finger print scanned. In one embodiment, the finger print scanned is compared to finger print data stored in either memory module 2304 and/or the mobile device memory 2356 for authentication. If the scanned finger print data matches finger print data stored then the user authentication is deemed successful and functionality of the mobile device 2350 is unlocked/allowed to the user. In another embodiment, the external processing accessory 2302 communicatively couples through external interface 2312 to an application specific accessory 2380 configured to scan such finger print data.

In another embodiment, the external processing mobile accessory 2302 may comprise an input interface 2308a that is configured to wirelessly receive restaurant menu information that is broadcast locally from a dining establishment. The processor 2306a may process the data received from the input interface 2308a, and transmit the menu information data to the mobile device 2350 via the internal interface 2310. An application resident on the mobile device's memory 2356 may be executed by the processing circuit 2354 to cause the menu to be displayed on the mobile device's output interface 2362. In one embodiment, the user of the mobile device 2350 may then select one or more food or beverage items, and/or make other requests, and this information may then be transmitted via an output transmitter interface 2308b to a receiver of the dining establishment. In this fashion, a user can see the menu items available and order without the need for a menu or wait staff for assistance. In another embodiment, the external processing accessory 2302 communicatively couples through external interface 2312 to an application specific accessory 2380 configured to receive such menu information broadcast, and transmit menu selection information to a receiver in the dining establishment for quicker order preparation.

Two Piece Casing for Mobile Accessories

Figure 36:
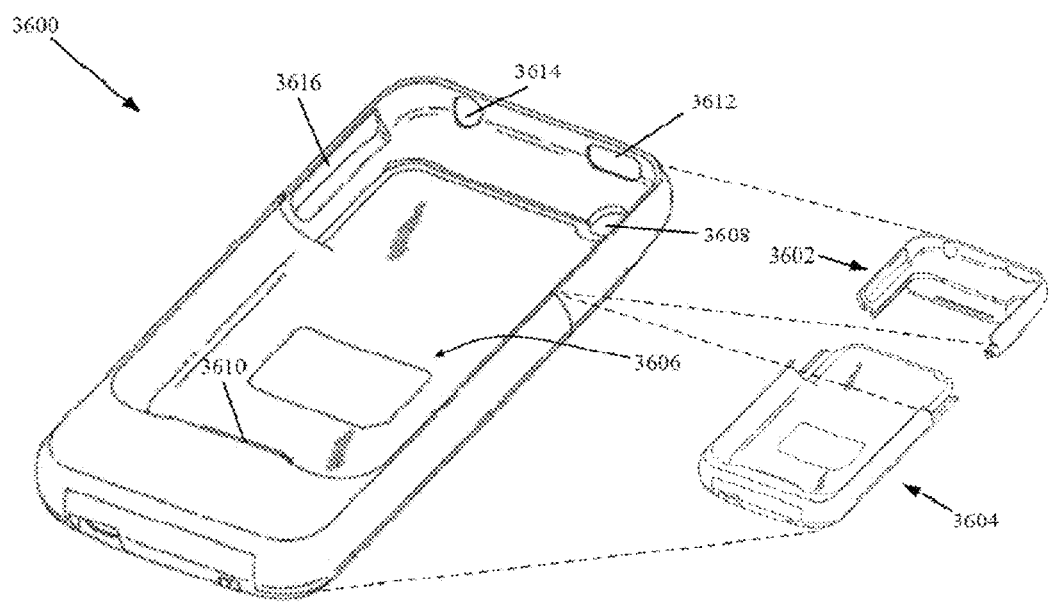
FIG. 36 illustrates a perspective view of a two piece casing that may be used to house an external processing accessory, NFC accessory, TV receiver accessory, or a payment processing accessory.

All of the mobile device accessories disclosed herein, including for example, the external processing accessory 2302, magnetic card payment processing accessory 2402, smart card payment processing accessory 3302, NFC accessory 3402, and TV receiver accessory 3502 may be housed within a casing 3600 (also referred to as a holster) as shown in FIGS. 36-42. FIG. 36 illustrates a perspective view of one embodiment of the casing 3600 in an open and a closed configuration. Specifically, the casing 3600 may comprise a top section 3602 and a bottom section 3604 that separates to allow a mobile device to be housed within a cavity 3606.

Figure 37:
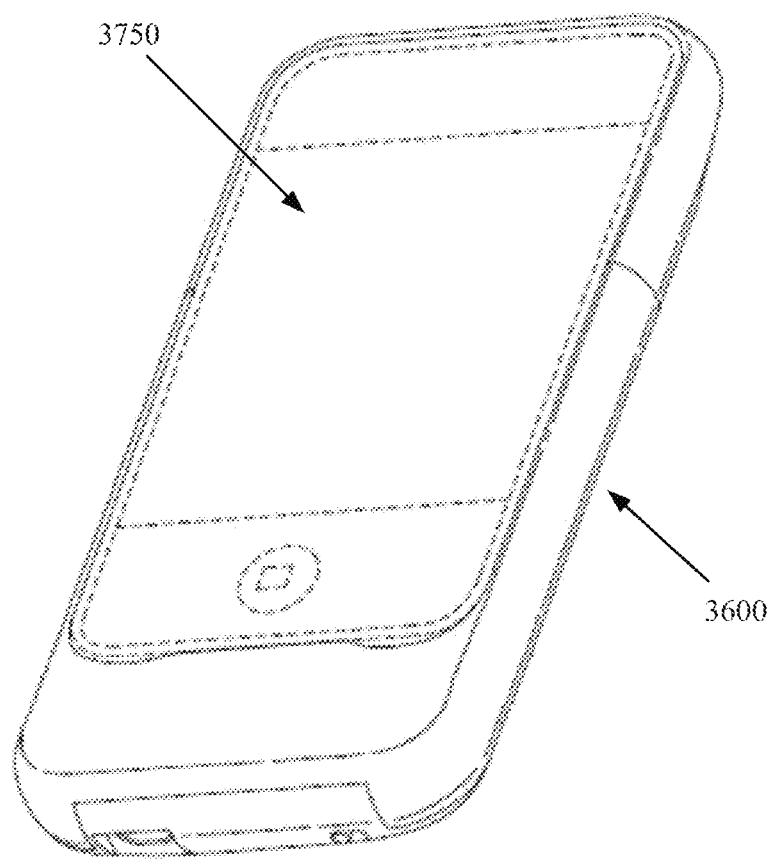
FIG. 37 illustrates the casing of FIG. 36 with a mobile device housed therein.

FIG. 37 illustrates how a mobile device can be housed within the cavity 3606 of the casing 3600. As can be appreciated from this figure, the casing 3600 is shaped to closely wrap around the mobile device 3750, and serves as a protective case for the mobile device 3750.

Figure 38:
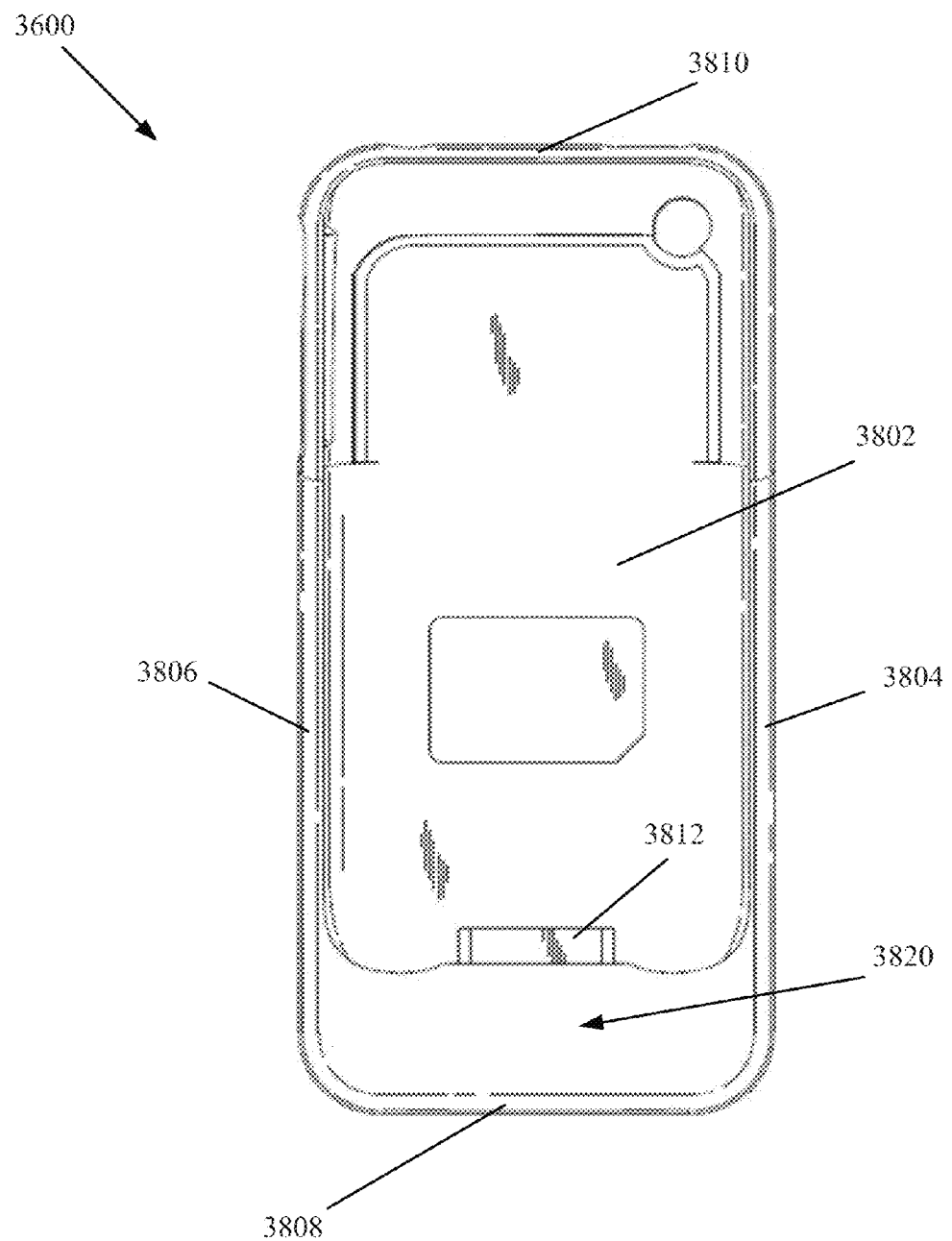
FIG. 38 illustrates a front view of the casing of FIG. 36 in a closed configuration.

FIG. 38 illustrates a front view of the casing 3600. The casing 3600 includes a back plane 3802, first and second sides 3804 and 3806, a bottom side 3808, a top side 3810, an internal interface 3812, and an end section 3820. The back plane 3802, first and second sides 3804 and 3806, bottom side 3808 and top side 3810 may be shaped to form a pocket or cavity 3606 in which the mobile device 3750 may be housed. The top side 3810 of the casing 3600 may slide out to allow insertion and removal of the mobile device 3750. The casing 3600 comprises a bottom end portion 3820 that may house within its thickness the hardware components of the various accessories 2302, 2402, 3302, 3402, and 3502. For example, the bottom end portion 3820 of the casing 3600 may house the internal interface 2310, processors 2306a, 2306b, I/O interfaces 2308a, 2308b, cryptography module 2314, memory circuit 2304, external interface 2312, power cell module 2316, the data bus 2320, and the power bus 2322 of the external processing accessory 2302. In another embodiment, the bottom end portion 3820 of the casing 3600 may house the internal interface 2410, cryptography module 2412, magnetic strip reader processing circuit 2406, magnetic strip reader interface 2408, memory 2404, and the data bus 2413 of the magnetic strip payment processing accessory 2402. In another embodiment, the bottom end portion 3820 of the casing 3600 may house the internal interface 3310, cryptography module 3312, smart card reader processing circuit 3306, smart card reader interface 3308, memory circuit 3304, and the data bus 3313 of the smart card payment processing accessory 3302. In another embodiment, the bottom end portion 3820 of the casing 3600 may house the internal interface 3410, the cryptography module 3412, near field communication processing circuit 3403, near field communication memory circuit 3404, near field communication transmitter 3406, near field communication receiver 3408, power cell module 3414, external interface 3416, data bus 3418, and power bus 3420 of the near field communication accessory 3402. In another embodiment, the bottom end portion 3820 of the casing 3600 may house the internal interface 3510, TV signal transmitter 3503, TV signal receiver 3504, service provider transmitter 3507, TV signal processor 3506, external interface 3508, security circuit 3518, data bus 3514, power bus 3516, and power cell module 3512 of the TV receiver accessory 3502.

FIG. 38 also illustrates the internal interface connector 3812 that couples to the corresponding mobile device interface (e.g, mobile device interface 2460) of the mobile device for the transmission of data between mobile device and the internal interfaces 2310, 2410, 3310, 3410, or 3510 of the particular accessory 2302, 2402, 3302, 3402, or 3502 the casing 3600 houses. The internal interface connector 3812 may snap or lock into place with the mobile device interface to provide a secure physical connection between the accessory 2302, 2402, 3302, 3402, or 3502 and mobile device. The internal interface may also transmit power from a power cell module 2316, 3414, or 3512 that may be present in the accessory 2302, 3402, or 3502. In one embodiment the power cell modules 2316, 3414, and 3512 may be housed within the bottom end portion 3820 as disclosed above. However, in another embodiment, the power cell modules 2316, 3414, and 3512 may be housed within the thickness of the back plane 3802 of the casing 3600. In this case the power cells should be thin so that they can adequately fit within the thickness of the back plane 3802 without significantly increasing the depth/thickness of the casing 3600.

Referring again to FIG. 36, the casing 3600 may include one or more openings 3608, 3612, 3614, 3616 to facilitate access to various features of the mobile device 3750. For instance, a first opening 3608 on the back plane 3802 of the casing 3600 may allow an unobstructed view for a camera lens on the back of the mobile device 3750. A second opening 3612 may provide access to a screen on/off switch for the mobile device 3750. A third opening 3614 may provide access to an audio jack on the mobile device 3750. A fourth opening 3616 on the second side 3806 may provide access to a volume control sliding switch.

Figure 39:
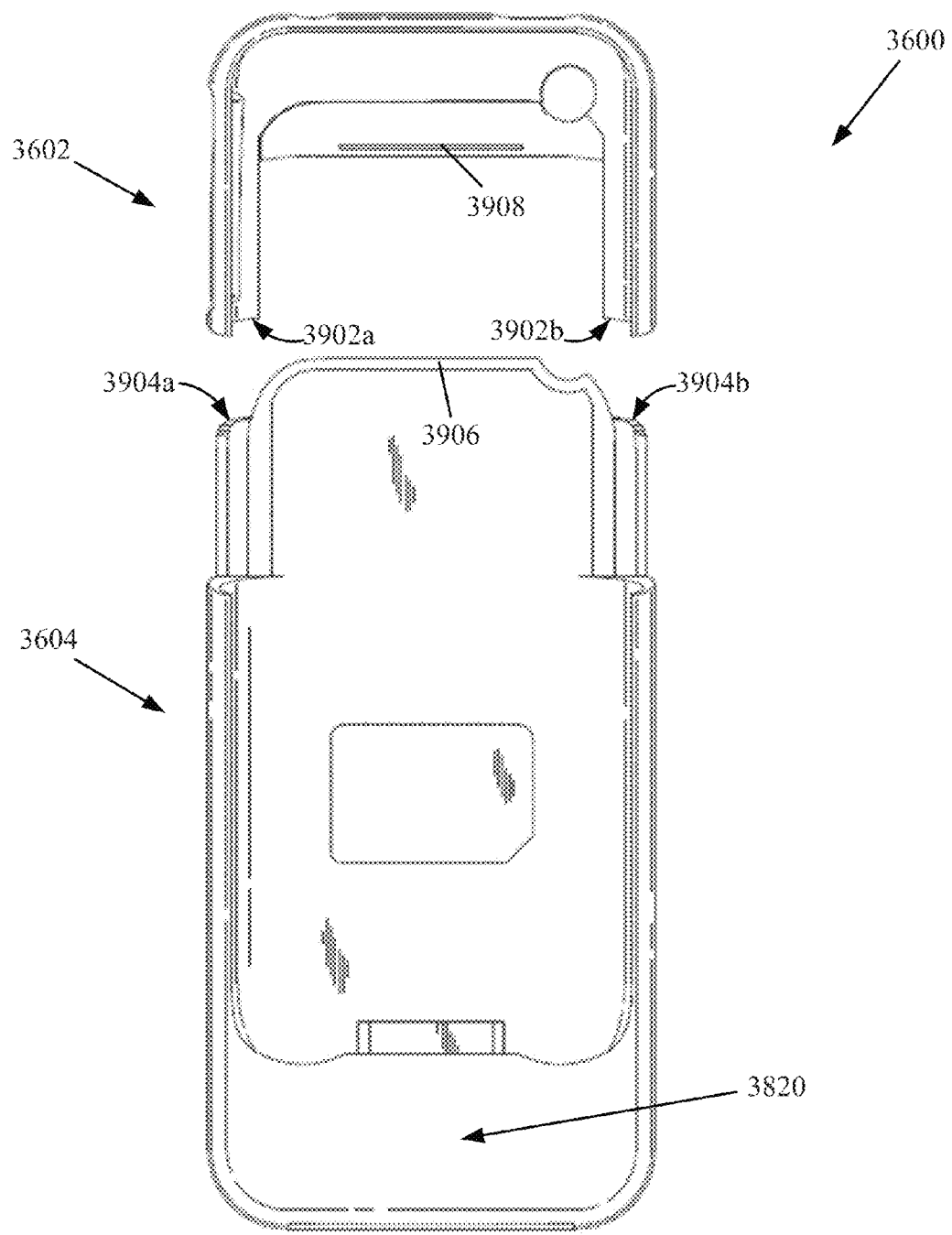
FIG. 39 illustrates a front view of the casing of FIG. 36 in an open configuration.

FIG. 39 illustrates the casing 3600 in an open configuration. The casing 3600 may include a top section 3602 and a bottom section 3604 that can be separated from each other to insert a mobile device within the casing 3600, and then be coupled together to secure the mobile device in place. For example, the top section 3602 may include receiving female grooves 3902a and 3902b that receive male rails 3904a and 3904b located on the bottom section 3604. In this manner, the top section 3602 can be coupled to the bottom section 3604 by pressure fit. For example, a tongue section 3906 (see also FIG. 42) may slide on to an engaging tab 3908 on the top section 3602 to couple the engaging tab 3908 to a receiving groove 4208 (see FIG. 42) to secure the top section 3602 to the bottom section 3604.

Figure 40:
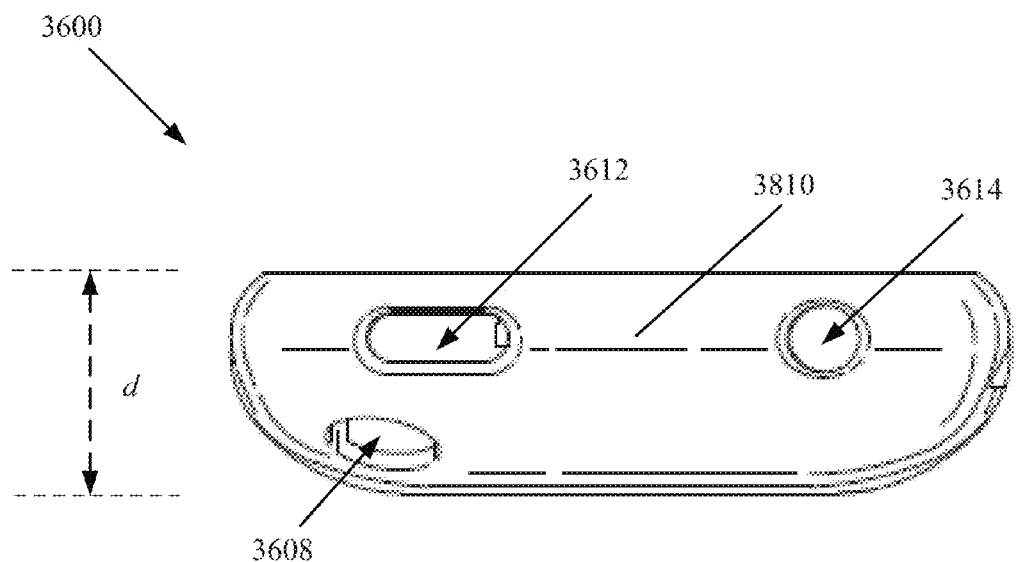
FIG. 40 illustrates a top view of the casing of FIG. 36.
Figure 41:
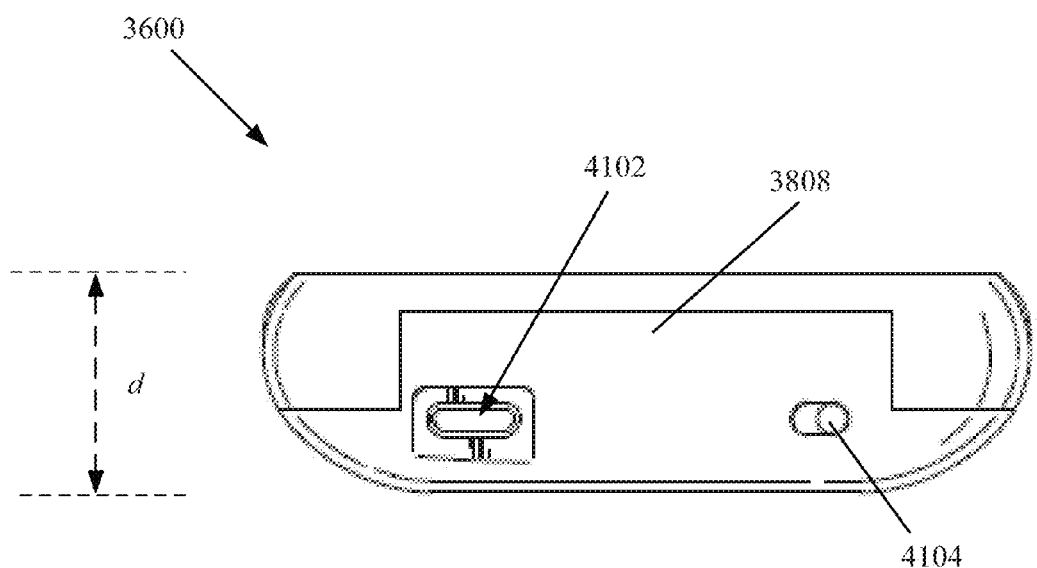
FIG. 41 illustrates a bottom view of the casing of FIG. 36.

FIGS. 40 and 41 illustrate a top view and a bottom view, respectively, of the casing 3600. FIG. 40 shows the top side 3810 of the casing 3600, including the first opening 3608, second opening 3612, and third opening 3614. FIG. 41 shows the bottom side 3808 of the casing 3600, including an external interface 4102 (e.g., external interface 2312 of the external processing accessory 2302, external interface 3416 of the near field communication accessory 3402, or the external interface 3508 of the TV receiver accessory 3502), such as a mini-USB connector. The external interface 4102 may serve to recharge a power cell module 2316, 3414, and 3512 within the casing 3600, and/or recharge the mobile device 3750 via the internal interface connector 3812. Additionally, the external interface 4102 may provide a pass-through signaling interface for the internal interface connector 3812, thereby allowing the mobile device 3750 to communicate to an external source via the external interface 4102. A switch 4104 may also be located on the bottom side 3808 of the casing 3600. The switch 4104 may power on or off the external processing accessory 2302, near field communication accessory 3402, or TV receiver accessory 3502 on one setting, and allow the power cell modules within these accessories 2302, 3402, and 3502 to recharge the mobile device 3750 on another setting.

FIGS. 40 and 41 also illustrate a measurement d that represents the maximum depth of the casing 3600 (also referred herein as the maximum thickness of the casing 3600). In the preferred embodiment, the depth d is designed to be as thin as possible so that the overall depth/thickness of the mobile device 3750 and casing 3600 when joined together is not substantially more than the depth/thickness of the mobile device 3750 by itself. In one embodiment, the depth d of the casing 3600 is less than the depth/thickness of the mobile device 3750 plus 0.50 inches. In another embodiment, the depth d of the casing 3600 is less than the depth/thickness of the mobile device 3750 plus 0.25 inches. In another embodiment, the depth d of the casing 3600 is less than the depth/thickness of the mobile device 3750 plus 0.125 inches. In another embodiment, the depth d of the casing 3600 is less than 1 inch. In yet another embodiment, the depth d of the casing 3600 is less than 0.75 inches. In yet other embodiments, the depth d of the casing 3600 is less than 0.5 inches. By having a thin depth/thickness/profile, the casing 3600 housing the mobile device 3750 can be conveniently stored, for example, in the pocket of the user. Casings for mobile device accessories that have a thick depth/profile cannot comfortably be stored in the pocket of a user.

Figure 42:
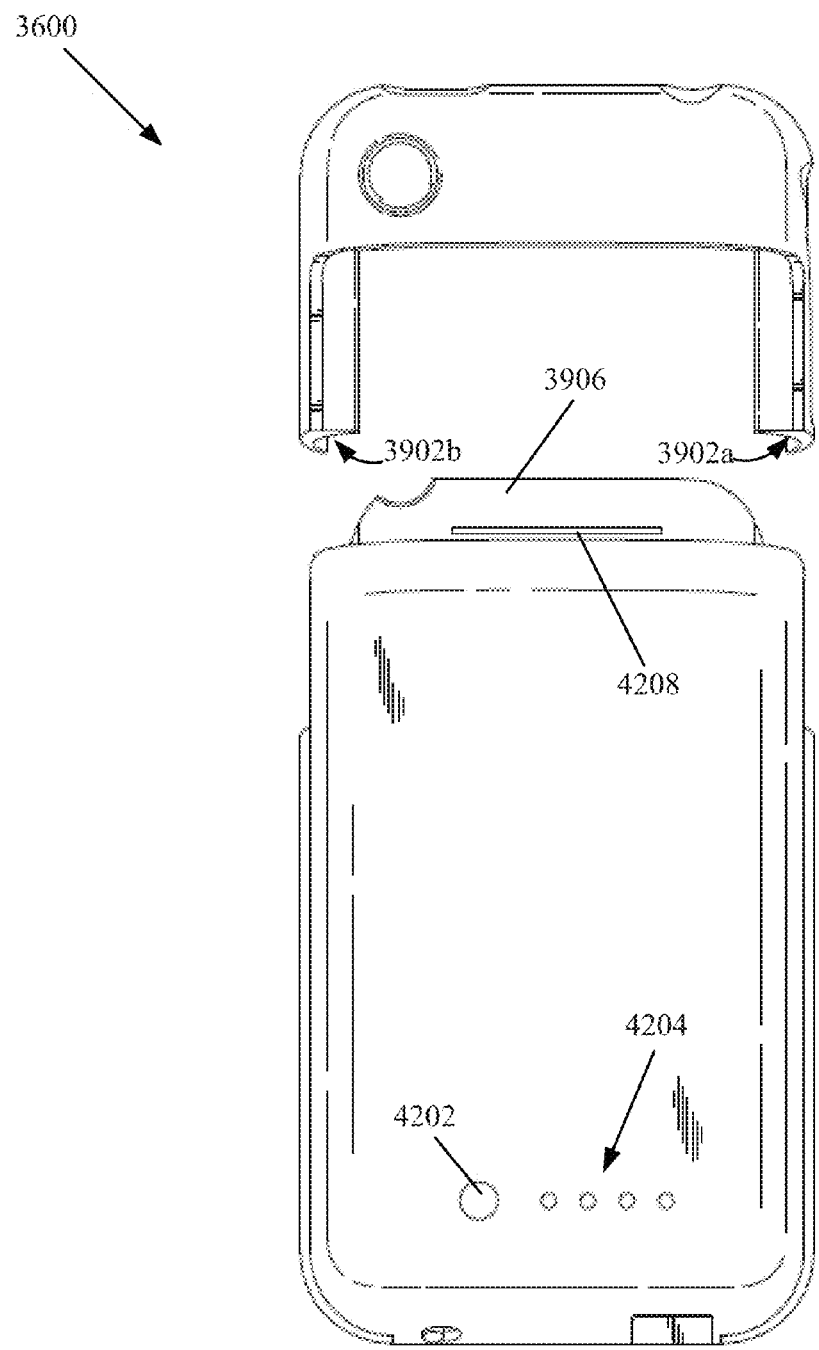
FIG. 42 illustrates a back view of the casing of FIG. 36.

FIG. 42 illustrates a back view of the casing 3600. In one embodiment, the casing 3600 may feature a test button 4202 that when pushed causes plurality of LED lights 4204 to light up. In one embodiment, the LED lights 4204 may indicate the power or charge level of the power cell module 2316, 3414, and 3512. In another embodiment, the LED lights 4204 may indicate the signal strength of the TV signals being received from the TV service provider by the TV receiver accessory 3502. In another embodiment, the LED lights 4204 may indicate the signal strength detected by a near field communication device to which the near field communication accessory 3402 is attempting to communicate with.

Single Piece Bottom Mounted Casing

Figure 43:
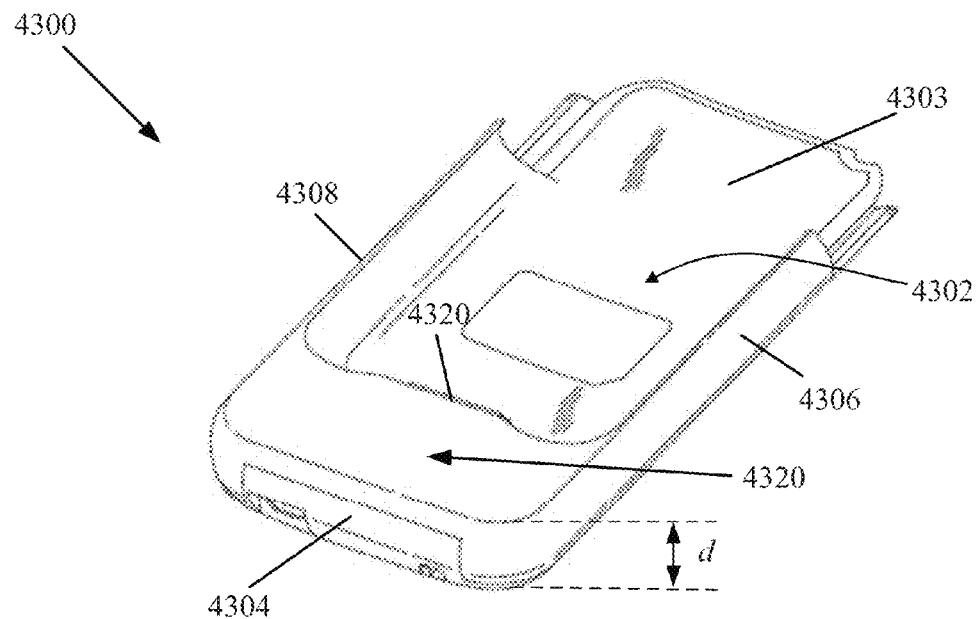
FIG. 43 illustrates a perspective view of a single piece casing that leaves at least one surface of the mobile device exposed. The casing may be used to house an external processing accessory, NFC accessory, TV receiver accessory, or a payment processing accessory.
Figure 44:
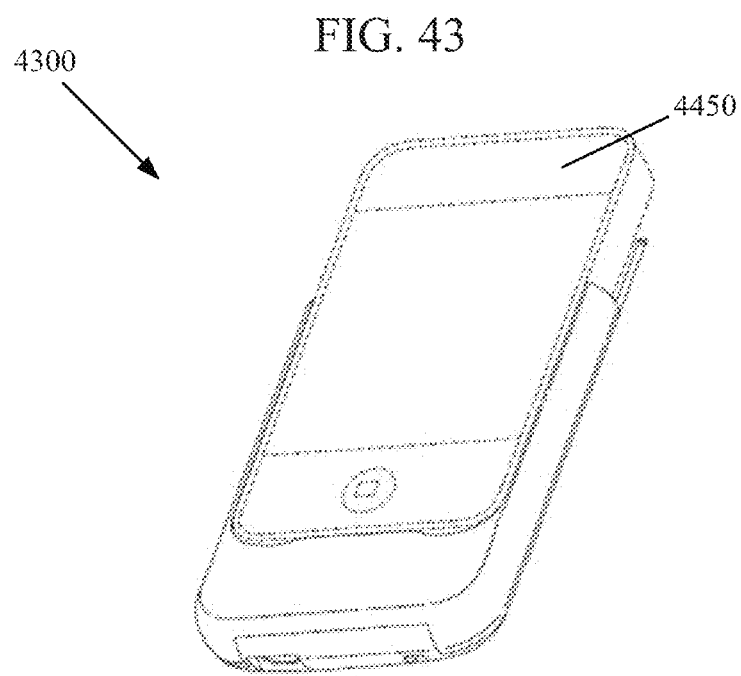
FIG. 44 illustrates the casing of FIG. 43 with a mobile device housed therein.

All of the mobile device accessories disclosed herein, including for example, the external processing accessory 2302, magnetic card payment processing accessory 2402, smart card payment processing accessory 3302, NFC accessory 3402, and TV receiver accessory 3502 may be housed within a casing 4300 (also referred to as a holster) as shown in FIGS. 43 and 44. The casing 4300 is similar to the casing 3600 shown in FIG. 36 but it does not have a top section. Instead, the casing 4300 leaves at least one side of the mobile device 4450 exposed. The casing 4300 comprises a back plane 4303, a bottom side 4304, a first side 4306, and a second side 4308. The back plane 4303, the bottom side 4304, the first side 4306, and the second side 4308 together form a cavity 4302 in which a mobile device may be housed.

FIG. 44 illustrates how a mobile device 4450 may be housed within the cavity 4302 of the casing 4300. FIGS. 43 and 44 also illustrate that the casing 4300 comprises an end section 4320 that—similar to the end section 3820—may house within its thickness the hardware components of the various accessories 2302, 2402, 3302, 3402, and 3502. As can be appreciated from FIG. 44, the casing 4300 is shaped to closely wrap around the mobile device 4450, and serves as a protective case for the mobile device 4450.

The casing 4300 also comprises an internal interface connector 4310 that couples to the corresponding mobile device interface (e.g., interface 2410) of the mobile device for the transmission of data between the mobile device 4450 and the internal interfaces 2310, 2410, 3310, 3410, or 3510 of the particular accessory 2302, 2402, 3302, 3402, or 3502 the casing 4300 houses. The internal interface connector 4310 may snap or lock into place with the mobile device interface to provide a secure physical connection between the accessory 2302, 2402, 3302, 3402, or 3502 and mobile device 4450. The internal interface may also transmit power from a power cell module 2316, 3414, or 3512 that may be present in the accessory 2302, 3402, or 3502. In one embodiment the power cell modules 2316, 3414, and 3512 may be housed within the bottom end portion 4320 as disclosed above. However, in another embodiment, the power cell modules 2316, 3414, and 3512 may be housed within the thickness of the back plane 4303 of the casing 4300. In that case, the power cells should be thin so that they can adequately fit within the thickness of the back plane 4303 without significantly increasing the depth/thickness of the casing 4300.

FIG. 43 illustrates a measurement d that represents the maximum depth of the casing 4300 (also referred herein as the maximum thickness of the casing 4300). In the preferred embodiment, the depth d is designed to be as thin as possible so that the overall depth/thickness of the mobile device 4450 and casing 4300 when joined together is not substantially more than the depth/thickness of the mobile device 4450 by itself. In one embodiment, the depth d of the casing 4300 is less than the depth/thickness of the mobile device 4450 plus 0.50 inches. In another embodiment, the depth d of the casing 4300 is less than the depth/thickness of the mobile device 4450 plus 0.25 inches. In another embodiment, the depth d of the casing 4300 is less than the depth/thickness of the mobile device 4450 plus 0.125 inches. In another embodiment, the depth d of the casing 4300 is less than 1 inch. In yet another embodiment, the depth d of the casing 4300 is less than 0.75 inches. In yet other embodiments, the depth d of the casing 4300 is less than 0.5 inches. By having a thin depth/thickness/profile, the casing 4300 housing the mobile device 4450 can be conveniently stored, for example, in the pocket of the user.

By removing the top section, the mobile accessory may be more compact in size and ergonomic so that it does not significantly increase or change the size, thickness, and/or shape of the mobile device secured there to.

Bottom Mounted Simple Casing

Figure 45:
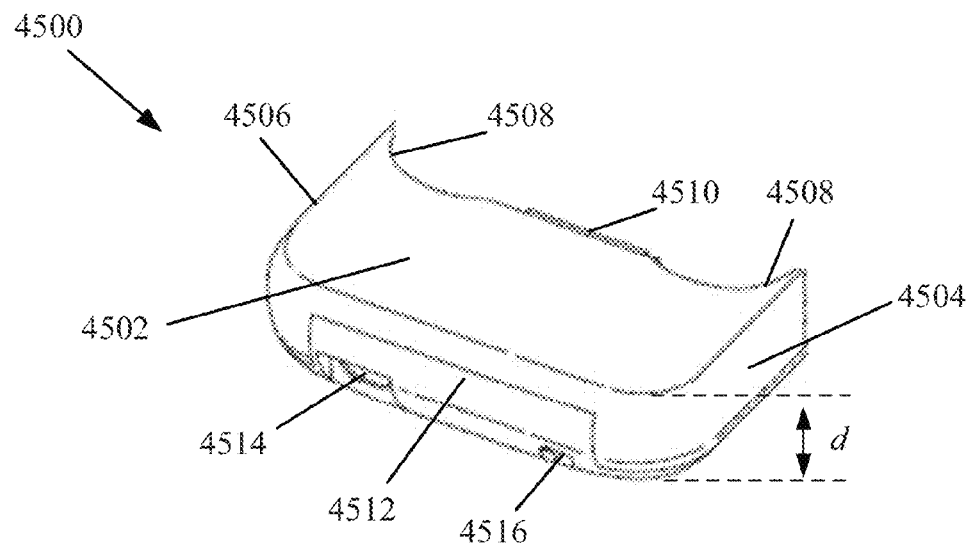
FIG. 45 illustrates a perspective view of a single piece casing that attaches onto the end of the mobile device. The casing may be used to house an external processing accessory, NFC accessory, TV receiver accessory, or a payment processing accessory.
Figure 46:
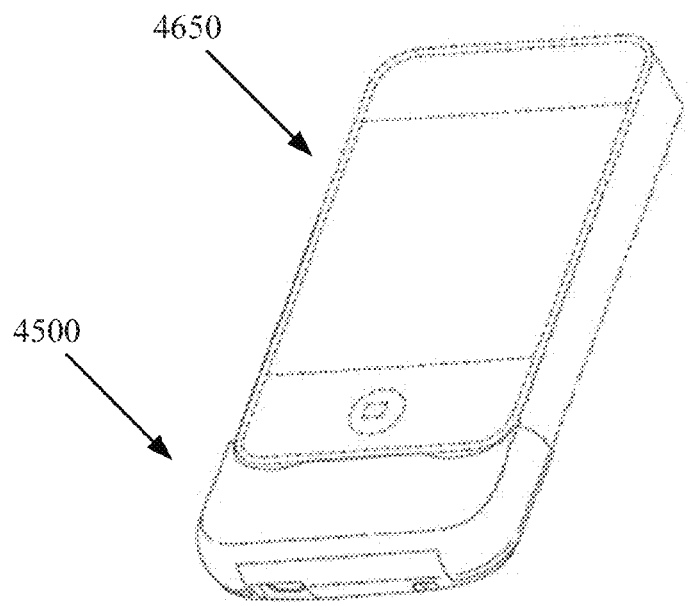
FIG. 46 illustrates the casing of FIG. 45 with a mobile device housed therein.

All of the mobile device accessories disclosed herein, including for example, the external processing accessory 2302, magnetic card payment processing accessory 2402, smart card payment processing accessory 3302, NFC accessory 3402, and TV receiver accessory 3502 may be housed within a casing 4500 as shown in FIGS. 45 and 46. The casing 4500 is configured to mount onto an end portion of a mobile device. In the preferred embodiment, the casing 4500 mounts onto the end portion of the mobile device having a mobile device interface, such as, interface 2460 to allow for wire line communication between the mobile device and the accessory that may be necessary.

The casing 4500 may include a front side 4502, a back side, a first side 4504, a second side 4506, a top side 4508, a bottom side 4512, an internal interface connector 4510, an external interface 4514, and a switch 4516. Hardware components of the various accessories 2302, 2402, 3302, 3402, and 3502 may be housed within the space formed by the front 4502, back, first 4504, second 4506, top 4508 and bottom 4512 sides. The top side 4508 of the casing is preferably shaped to match the end portion of the mobile device to which the casing will adhere to. The internal interface connector 4510 is configured to physically and communicatively couple to a corresponding mobile device interface of the mobile device. As shown in FIG. 46, once attached to the mobile device interface, the connector 4510 secures the accessory to the mobile device 4650.

The casing 4500 shown in FIGS. 45 and 46 allows an accessory 2302, 2402, 3302, 3402, or 3502 to be coupled to a mobile device 4650 without the accessory significantly increasing the weight, thickness and overall size of the mobile device 4650. The thin depth (also referred to as the thickness) of the casing 4500 and mobile device 4650 combination allows a user to put the combination (accessory and mobile device) in a small space, such as, a pocket. For example, FIG. 45 illustrates a measurement d that represents the maximum depth of the casing 4500. In one embodiment, the depth d is designed to be as thin as possible so that the overall depth/thickness of the mobile device 4650 and casing 4500 when joined together is not substantially more than the depth/thickness of the mobile device 4650 by itself. For example, in one embodiment, the depth d of the casing 4500 is less than the depth/thickness of the mobile device 4650 plus 0.125 inches. In another embodiment, the maximum depth d of the casing 4500 may be equal or less than the depth/thickness of the mobile device 4650.

FIG. 45 illustrates the external interface 4514, which in one embodiment may be a mini-USB connector, that enables communication for the external interface 2312 of the external processing accessory 2302, external interface 3416 of the near field communication accessory 3402, or the external interface 3508 of the TV receiver accessory 3502. The external interface 4514 may serve to recharge a power cell module 2316, 3414, and 3512 within the casing 4500, and/or recharge the mobile device 4650 via the internal interface connector 4510. Additionally, the external interface 4514 may provide a pass-through signaling interface for the internal interface connector 4510, thereby allowing the mobile device 4650 to communicate to an external source via the external interface 4514. A switch 4516 may also be located on the bottom side 4512 of the casing 4500. The switch 4516 may power on or off the external processing accessory 2302, near field communication accessory 3402, or TV receiver accessory 3502 on one setting, and allow the power cell modules within these accessories 2302, 3402, and 3502 to recharge the mobile device 4650 on another setting.

Thus, the mobile device accessories disclosed herein, including the external processing accessory 2302, magnetic strip payment processing accessory 2402, smart card payment processing accessory 3302, NFC accessory 3402, TV receiver accessory 3502, a bar code reader mobile accessory, a finger print reader mobile accessory, and/or a menu viewing and ordering mobile accessory may all be housed within any one of the casings 3600, 4300, and 4500.

Modular Mobile Accessory Configurations

In various implementations, the mobile accessory may include multiple different functionalities and/or capabilities. In order to allow a consumer to tailor the mobile accessory to his/her needs, the mobile accessory may be comprised of separate modules or components that can be coupled together to create the physical enclosure of the mobile accessory.

Figure 47:
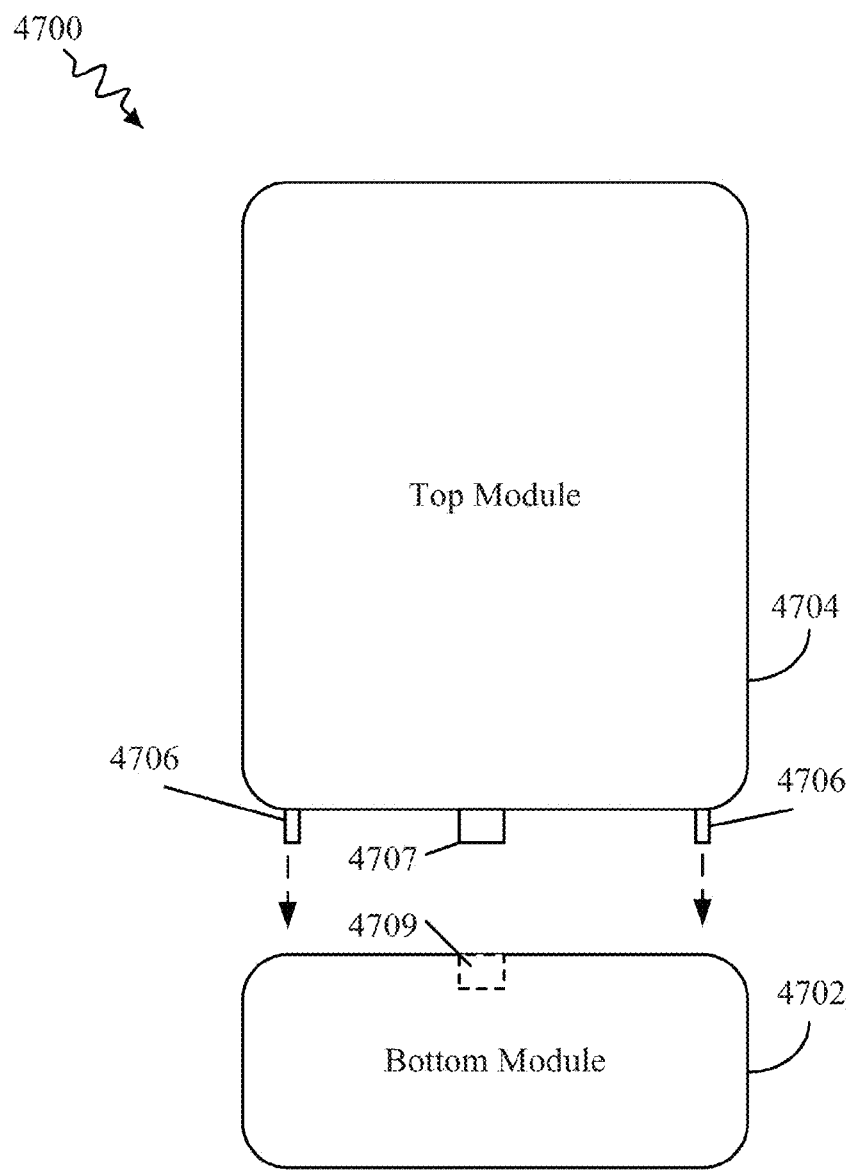
FIG. 47 illustrates a functional block diagram of a two-piece modular mobile device accessory scheme that comprises a bottom module and top module.
Figure 48:
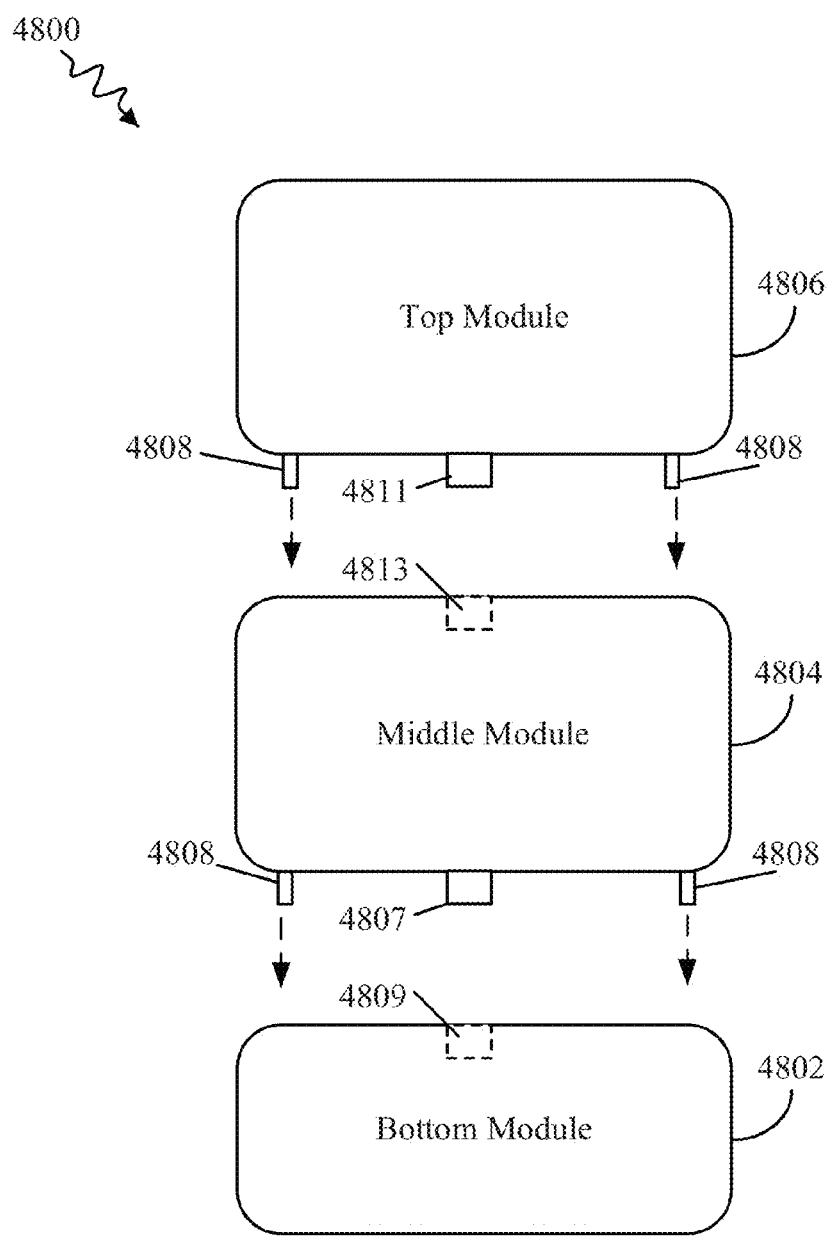
FIG. 48 illustrates a functional block diagram of a three-piece modular mobile device accessory scheme that comprises a bottom module, middle module, and top module.

FIGS. 47 and 48 illustrate various examples of a modular mobile accessory, where each module may provide a different function. Thus, a consumer is able to purchase the desired modules and combine them to form the casing enclosure of the mobile accessory.

FIG. 47 illustrates a two-piece modular mobile device accessory scheme 4700 that comprises a bottom module 4702 and top module 4704. Each module may incorporate circuits and/or devices that perform different functions, either alone or in combination with other modules. For instance, each module may house any one of the mobile accessories described above. For example, bottom module 4702 and top module 4704 can each be a battery pack, an external processing accessory 2302, a magnetic strip payment processing accessory 2402, a smart card payment processing accessory 3302, an NFC accessory 3402, a television signal receiver and battery pack mobile accessory 3502, a bar code reader mobile accessory, a finger print reader mobile accessory, and/or a menu viewing and ordering mobile accessory.

The top module 4704 and bottom module 4702 may join together via contact points 4706 to substantially enclose a mobile device contained therein. For example, each contact point 4706 may include a pin that engages a corresponding cavity in the opposite module. In alternative implementations, the contact point 4706 may be a magnetic coupler between the top and bottom modules 4704 and 4702. Additionally, the modules 4702 and 4704 may include corresponding connectors 4707 and 4709 (e.g., male/female connectors) that may electrically couple the two modules together to allow for electrical communication (e.g., data and/or control signals) and/or power transfer between the two modules 4702 and 4704. For example, the top module 4704 may be a battery pack and the bottom module 4702 may be a magnetic strip payment processing accessory 2402. In such a configuration, the connectors 4707/4709 may provide power to the magnetic strip payment processing accessory in the bottom module 4702 from the battery pack in the top module 4704.

FIG. 48 illustrates a functional block diagram of a three-piece modular mobile device accessory scheme 4800 that comprises a bottom module 4802, middle module 4804, and top module 4806. Each module may incorporate circuits and/or devices that perform different functions, either alone or in combination with other modules. For instance, each module may house any one of the mobile accessories described above. For example, the bottom module 4802, middle module 4804, and top module 4806 can each be a battery pack, a magnetic strip payment processing accessory 2402, a smart card payment processing accessory 3302, a programmable smart card mobile accessory 3402, a television signal receiver and battery pack mobile accessory 3502, a bar code reader mobile accessory, a finger print reader mobile accessory, or a menu viewing and ordering mobile accessory.

The bottom module 4802, middle module 4804, and top module 4806 may be secured together via contact points 4808 to substantially enclose a mobile device contained therein. That is, the contact points 4808 may provide physical connectors between the modules 4802, 4804, and 4806.

Additionally, the modules 4802, 4804, and 4806 may include corresponding connectors 4807/4809 and 4811/4813 (e.g., male/female connectors) that may electrically couple the modules together to allow for electrical communication (e.g., data and/or control signals) and/or power transfer between the three modules 4802, 4804, 4806. For example, the top module 4806 may be a bar code scanner, the middle module 4804 may be finger print reader, and the bottom module 4802 may be a credit card reader (e.g., magnetic strip payment processing accessory 2402). In such a configuration, the connectors 4807/4809 and 4811/4813 may provide data and/or control signal communications between the modules 4802, 4804, and/or 4806 and, possibly, with the mobile device to which the mobile device accessory 4800 may couple.

The above modular schemes allow multiple mobile accessories to be used with one mobile device at the same time. Moreover, rather than having a top section 2504 that merely secures the bottom section 2502 and protects the mobile device enclosed within, the top, middle, and/or bottom modules of the modular schemes illustrated in FIGS. 47 and 48 may serve to add a plurality of different combinations of functions or capabilities to the mobile device since some of the modules may be interchangeable. For example, a user may select have two modules with battery pack and a third module with a television receiver. Alternatively, a user may select a first module with a bar code scanner, a second module with a credit card reader, and a third module with a programmable smart card device.

Data Management Mobile Accessory

Figure 49:
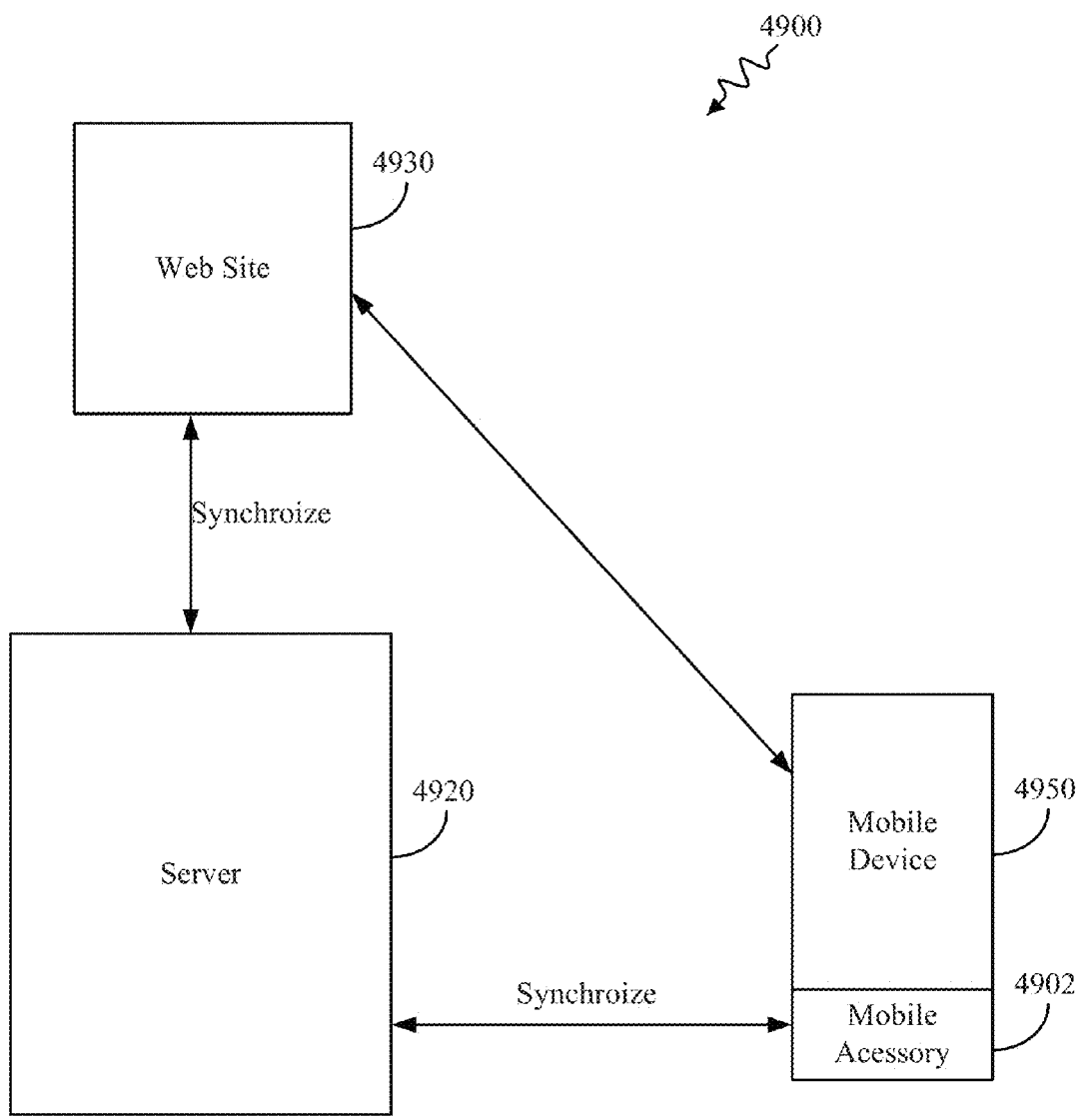
FIG. 49 illustrates a functional block diagram of a data management system that allows a mobile device equipped with a data management mobile accessory to synchronize with and update data stored on a server.

FIG. 49 illustrates a functional block diagram of a data management system 4900 that allows a mobile device 4950 equipped with a data management mobile accessory 4902 to synchronize with and update data stored on a server 4920. For example, the server 4920 may store inventory/product information for one or more distribution centers or warehouses. This inventory/product information may comprise, but is not limited to, type, quantities, images, prices, stock-keeping unit (SKU) identifiers, availability, shipping information, and/or origin of various products. The server 4920 systematically tracks the movement, e.g., in or out, of the products within the one or more distribution centers.

The server 4920 may also be synchronized with a website 4930. The website 4930 may display products and product information associated with the server 4920 to the anyone accessing the website 4930. The website 4930 may also be configured to process purchase orders of the products, and is capable of updating inventory/product information stored in the server 4920.

Figure 50:
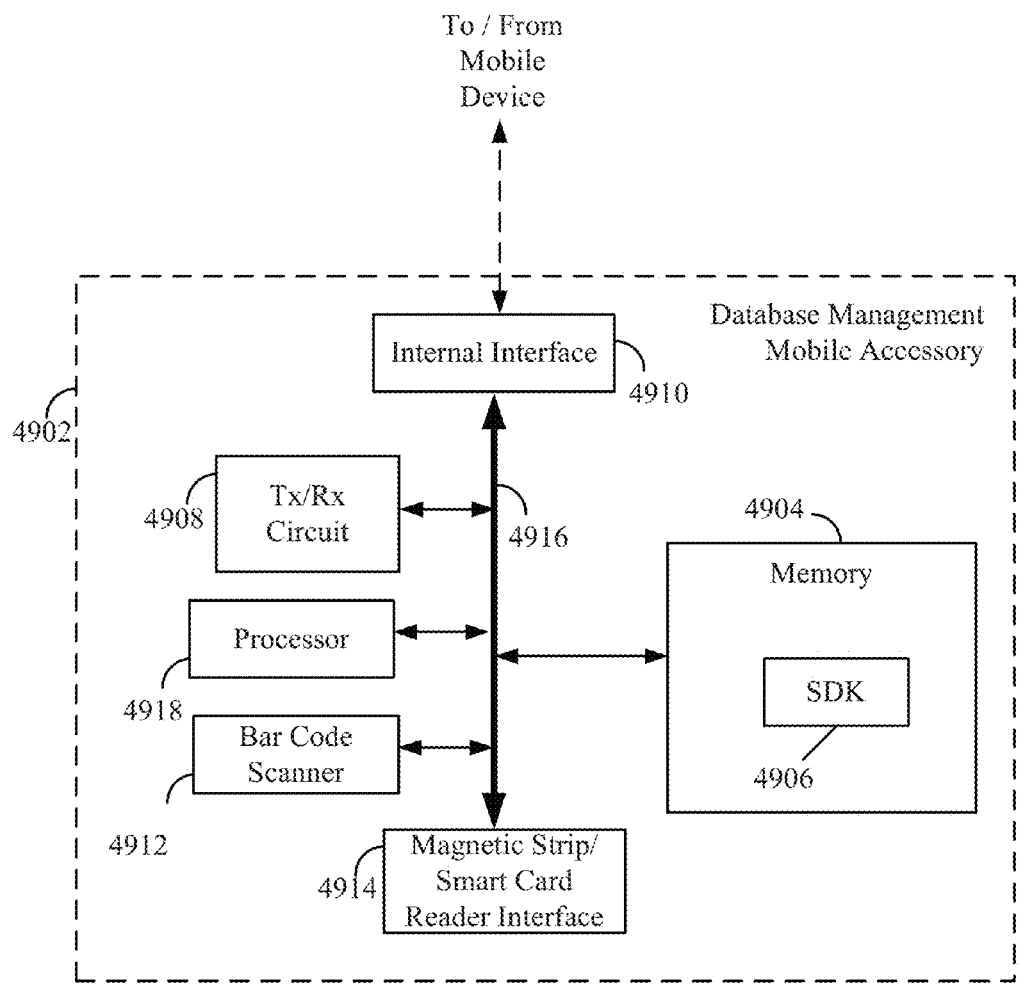
FIG. 50 illustrates a functional block diagram of one embodiment of the data management mobile accessory.

Referring to FIG. 49 and FIG. 50, the data management mobile accessory 4902 and mobile device 4950 include hardware and software that allow it to synchronize with and communicate to the server 4920. For example, a unique database management application for a particular data management system 4900 can be designed and created using the SDK 4906 tools available on the data management mobile accessory's memory 4904. The database management application can be loaded onto and executed on the mobile device 4950 through the internal interface 4910. The database management application allows the user of the mobile device 4950 to connect to and synchronize with the server 4920 using the data management mobile accessory 4902. For example, the data management mobile accessory 4902 may include a transmitter and receiver circuit 4908 (Tx/Rx Circuit) that allows it to wirelessly connect to the server 4920 in order to update any changes that need to be made to the inventory/product information stored within the server 4920, or otherwise access the contents of the server 4920.

In one embodiment, the database management application allows the user of the mobile device 4950 to connect to and synchronize with the server 4920 via the website 4930. The mobile device 4950 can connect to the website 4930 using the wireless network service provider associated with the mobile device 4950. The user of the mobile device 4950 may then wirelessly update any changes that need to be made to the inventory/product information stored within the server 4920, or otherwise access the contents of the server 4920.

In other embodiments, the data management mobile accessory 4902 may further comprise a processor 4918, a bar code scanner 4912, a magnetic strip/smart card reader interface 4914, and a bus 4916. The bus 4916 serves as a line of communication between the internal interface 4910, the processor 4918, the Tx/Rx circuit 4908, the memory 4904, the bar code scanner 4912, and the magnetic strip/smart card reader interface 4914. The bar code scanner 4912 allows the user of the data management mobile accessory 4902 to scan items/products, and update the inventory/product information stored within the server 4920. For example, scanning an item may increment the quantity value stored within the server 4920 for that particular product. The magnetic strip/smart card reader interface 4914 enables the user of the data management mobile accessory 4902 to accept payment card information from a consumer for a sale transaction according to one of the processes described above under "Payment Processing Mobile Accessories." If a sale is made the data management mobile accessory 4902 can update the inventory/product information stored within the server 4920 by, for example, decrementing the quantity value stored within the server 4920 for that particular product sold.

Speakers & Microphone

Another feature may provide for one or more speakers to be included as part of the battery packs or holster (illustrated in FIGS. 1-22). For instance a low-profile speaker may be housed within the back plane of a battery pack so that the sound may be emitted from the rear or sides of the battery pack. When a mobile device is inserted and coupled to the battery pack, it couples to an interface that electrically connects the speaker to the mobile device. The mobile device may send audio or sound signals to the speaker via an interface with the battery pack. This allows a user to listen to audio stored in the mobile device without the need for headphones.

Similarly, another feature may provide for one or more microphones to be included as part of the battery packs (illustrated in FIGS. 1-22). One or more microphones may be housed within the battery pack (e.g., back plane) so that they may capture sound from a user. The microphone may be electrically coupled to an interface that allows sending captured audio signals to a mobile device that may be coupled to the battery pack.

According to yet another feature, when the mobile device is coupled to the battery pack 1702, it may cause one or more applications to execute on the processors 1706. These applications may continue to operate or execute even if the mobile device is removed or decoupled from the battery pack 1702. For example, the battery pack may continue to collect data (e.g., monitor medical conditions for a patient to which it is coupled) and wirelessly transmits the collected data or an alarm to the mobile device. This is possible since the processors 1706 may be powered by the power cell 1404 and can be configured to operate whether or not the mobile device is coupled to the battery pack.

Integrated Display

In some embodiments of the battery pack 1702, battery pack 1702 may also include an integrated display or screen. For example, the integrated display may be on the outer surface of the back plane of the battery pack. Alternatively, the display 1710 may slide out from within the housing of the battery pack. This integrated display 1720 may allow displaying additional information or data to a user. The additional display screen may be electrically coupled to the mobile device (via an interface) to allow the mobile device to send images or video to the additional display screen. Alternatively the wireless communication accessory's processor could send a battery charge indicator to the integrated display.

In another example, the rear of the back plane may house a Braille input and/or output interface that electrically coupled a mobile device mounted within the holster or battery pack.

In yet another embodiment, the rear of the back plane may provide a keypad that serves as an input to the mobile device.

According to another feature, the battery pack and/or holster may provide an external interface (e.g., Bluetooth wireless interface, USB port, infrared port, etc.) that may allow the mobile device mounted in the battery pack and/or holster to communicate via that external interface. Thus the external interface may provide a different wireless interface than provided or supported by the internal system of the mobile device.

Repeater Antenna

Figure 52:
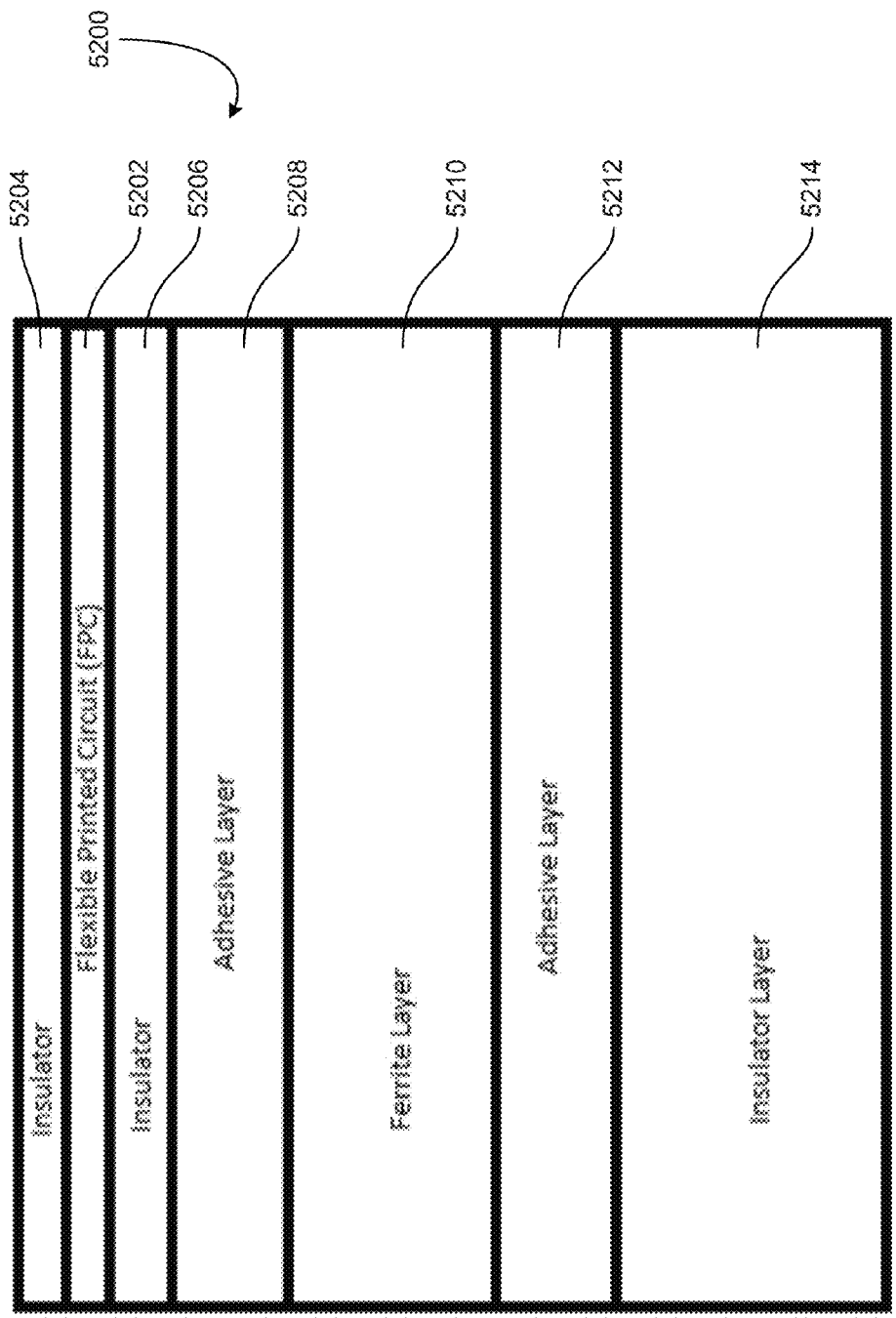
FIG. 52 illustrates an example embodiment of an antenna assembly.

In some embodiments of the mobile device peripheral, a protective case can incorporate a repeater antenna. FIG. 52 reveals a depth diagram of one potential antenna assembly 5200 of one half of an NFC repeater antenna. In specific illustrated embodiment, the antenna assembly 5200 comprises a flexible printed circuit (FPC) 5202, which can be made of copper sandwiched between two thin flexible insulator layers 5204 and 5206. The actual antenna does not have to be a flexible printed circuit 5202, nor does it have to be made of copper, but these are low-cost options that may be suitable or advantageous for mass production. The Insulator/FPC/Insulator 5204/5202/5206 combination can then be attached to a Ferrite layer 5210 (which can be made of Manganese-Zinc (Mn—Zn)), e.g., with an adhesive layer 5208. The Ferrite layer 5210 can be attached to another insulator layer 5214 (e.g., for physical and electrical shielding). In some embodiments, an adhesive layer 5212 can be used to couple the insulator layer 5214 to the ferrite layer 5210. The bottom insulator layer 5214 can be made of a thermoplastic such as Polyethylene Terephthalate. The Ferrite layer 5210 and insulator layers 5214, 5204, 5206 may be made of other chemical combinations as well. In some embodiments, the total thickness of antenna assembly 5200 can be less than about 1000 micrometers, less than about 800 micrometers, less than about 600 micrometers, less than about 500 micrometers, less than about 400 micrometers, less than about 350 micrometers, or less; however thicker antennas can be constructed to form either more durable or stronger antenna. A thinner antenna assembly is generally more flexible and would add less total thickness to a mobile device peripheral. In some embodiments the thickness of the antenna assembly 5200 can be at least about 100 micrometers, at least about 200 micrometers, at least about 300 micrometers, at least about 400 micrometers, at least about 500 micrometers, or more.

Figure 53:
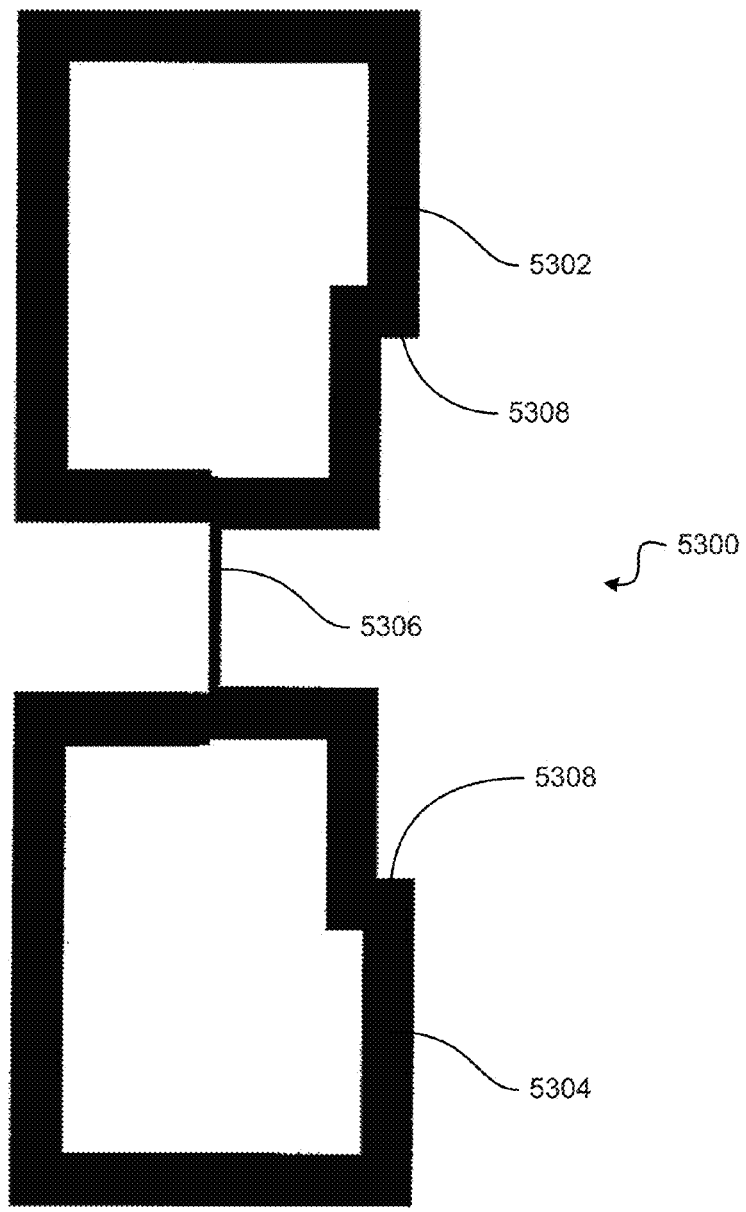
FIG. 53 illustrates an example embodiment of a repeater antenna that includes a first antenna and a second antenna.

FIG. 53 shows an example embodiment of a NFC repeater antenna 5300 laid flat. The repeater antenna 5300 can include a first antenna 5302, a second antenna 5304, and an electrical connection 5306 between the first and second antennas 5202 and 5204. The antennas 5302 and 5304 can each have a structure that is similar to, or the same as, the antenna assembly 5200 of FIG. 52. Though one electrical conductor 5306 is shown connecting the external termination point of the first antenna 5302 to the external termination point of the second antenna 5304, there can be a second electrical conductor (not shown in FIG. 53) that connects the internal termination point of the first antenna 5302 to the internal termination point of the second antenna 5304. Through these two electrical conductors 5306, a signal received by the first antenna 5302 can be transmitted to the second antenna 5304, where the signal can be re-transmitted. In some embodiments, the entire structure of the repeater antenna 4300 can be flexible and can be bent so that the first antenna 5302 can be mounted to the back plane of a protective case near the mobile device antenna, and the second antenna 5304 can be aligned wherever the designer wants the case antenna to be located. In some embodiments, the first antenna 5302 can be mounted next to or near a mobile device, and the second antenna 5304 can be mounted at, near, or along an external wall to extend the communication range beyond the thickness of the protective case.

The distance between the first antenna 5302 and the second antenna 5304 can be less than about 10 centimeters, less than about 5 centimeters, less than about 3 centimeters, less than about 2 centimeters, less than about 1.5 centimeters, less than about 1.0 centimeter, or less. The distance between the first antenna 5302 and the second antenna 5304 can be at least about 0.5 centimeters, at least about 1.0 centimeter, at least about 1.5 centimeters, at least about 2.0 centimeters, or more.

Figure 54:
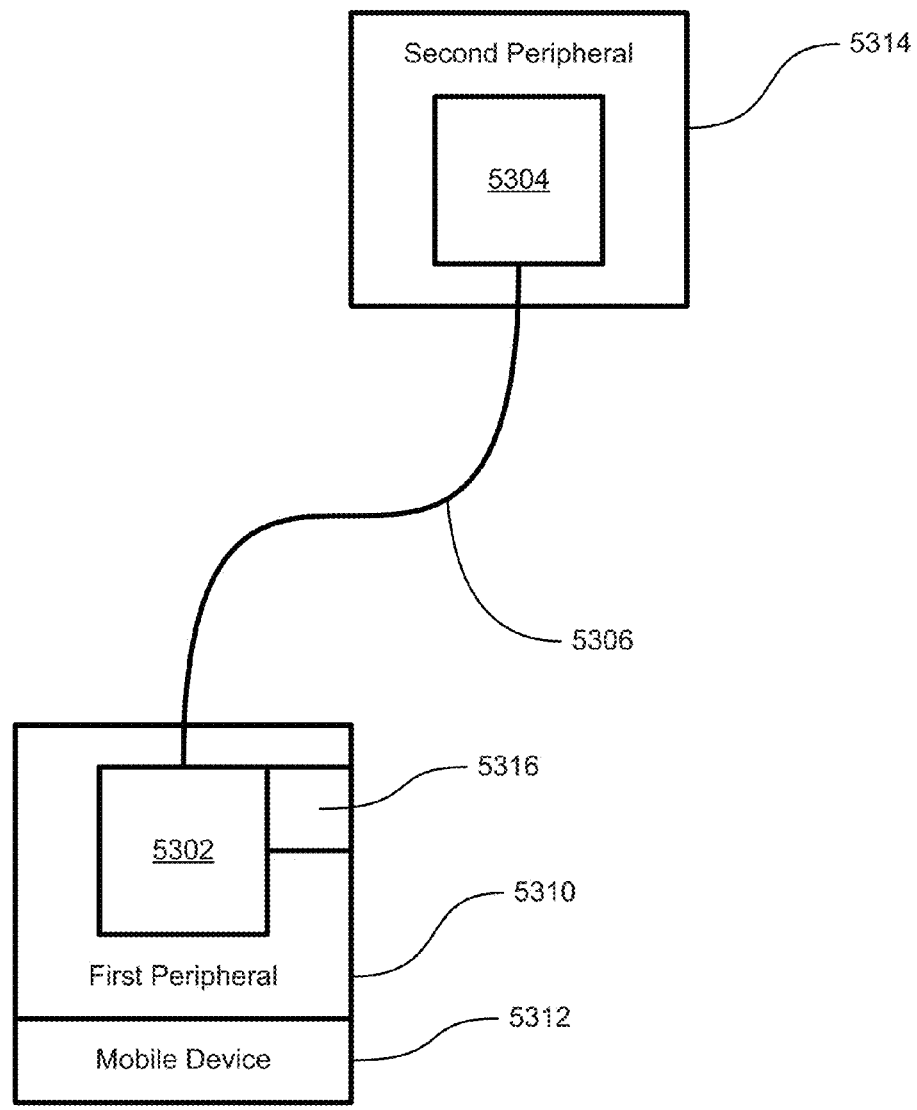
FIG. 54 illustrates an example embodiment of a system in which the first antenna is in a first peripheral device and the second antenna is in a second peripheral device.

The distance between the first antenna 5302 and the second antenna 5304 can be extended beyond the ranges described above, and at the point where signal strength is noticeably affected by the distance between the antennas, the electrical signal could be amplified to make up for signal loss. With reference to FIG. 54, in some embodiments, the first antenna 5302 can be located in a first peripheral 5310 (e.g., the case for the mobile device 5312) while the second antenna 5304 can be located in a second peripheral 5314 (e.g., headphones or another peripheral device separate from the case for the mobile device), and the electrical conductor 5306 between the two antennas 5302 and 5304 can extend between the two peripherals 5310 and 5314, e.g., via a flexible cable or wire 3506. In some embodiments, the electrical connection 5306 between the first and second antennas 5302 and 5304 can be detachable (e.g., by unplugging a flexible cable 5306 from the first peripheral 5310 or from the second peripheral 5314). In some embodiments, a mobile device 5312 could transmit a signal that is received by the first antenna 5302, which can be built into a protective case 5310, and the signal could travel along a wire or cable 5306 to the second antenna 5304 located in headphones 5314 (which can re-transmit the signal). Signals received by the second antenna 5304 in the headphones 5314 can travel along the same wire or cable to be re-transmitted by the first antenna 5302, which can be built into the protective case 5310 for the mobile device 5312.

Thus, in some embodiments, the local wireless communication range (e.g., for near field communication) for the mobile device 5312 can extend to the area around the remote peripheral 5314 and is not limited to the area near the mobile electronic device 5312. The distance between the first antenna 5302 and the second antenna 5304 can be at least about 0.1 meters, at least about 0.25 meters, at least about 0.5 meters, at least about 1 meter, at least about 2 meters, at least about 3 meters, at least about 5 meters, or longer. The distance between the first antenna 5302 and the second antenna 5304 can be less than or equal to 10 meters, less than or equal to 5 meters, less than or equal to 2 meters, although values outside these ranges can be used in some embodiments. In some cases, the signal can weaken as it is relayed from the first antenna 5302 to the second antenna 5304, or from the second antenna 5304 to the first antenna 5302. Accordingly, in some embodiments, the system can include a power source 5316 (e.g., the battery of the protective case) that is electrically coupled to the first antenna 5302 and/or to the second antenna 5304 and configured to amplify the power of the signal, as described herein. The battery 5316 of the first peripheral 5310 can also be configured to provide electrical charge the mobile device 5312 (e.g., to power or recharge the mobile device 5312), as discussed herein.

Short-range magnetic coupling could also be used in some embodiments to attach peripherals without direct electrical connections. In this way, a peripheral such as a pair of headphones could receive a signal from a mobile device without actually plugging into a headphone port.

Although the first antenna 5302 and the second antenna 5304 appear solid in the FIG. 53, in some embodiments, the antennas 5302 and 5304 can include tightly coiled wire, e.g., on a plane. Some embodiments can include 11 coils of wire for one or both of the antennas 5302 and 5304. Though the area and length of wire used in the antenna impact the frequency range of the antenna, the antenna shape is not controlling, and different shaped antennas could be used without impacting performance. The first and second antennas 5302 and 5304 can be different shapes to fit in different shaped cavities (e.g., without substantial signal loss). In some cases, an first antenna 5302 can capture a stronger signal from the mobile device if the first antenna 5302 closely outlines the antenna in the mobile device. The irregular notched shape 5308 of the antenna 5302 and 5304 in FIG. 53 illustrates that while outlining the antenna of the mobile device to increase signal strength, additional area can be added on one or more sides to meet the total area or wire length requirements to transmit at the specific frequency.

While FIG. 52 and FIG. 53 illustrate an example embodiment of a repeater antenna that can be operable, for example, at 13.56 megahertz (MHz) and communicate within the Near Field Communication (NFC) standard, repeater antennas that communicate in other frequency ranges and with other standards can be easily designed without departing from the scope of the disclosure provided herein.

Figure 55:
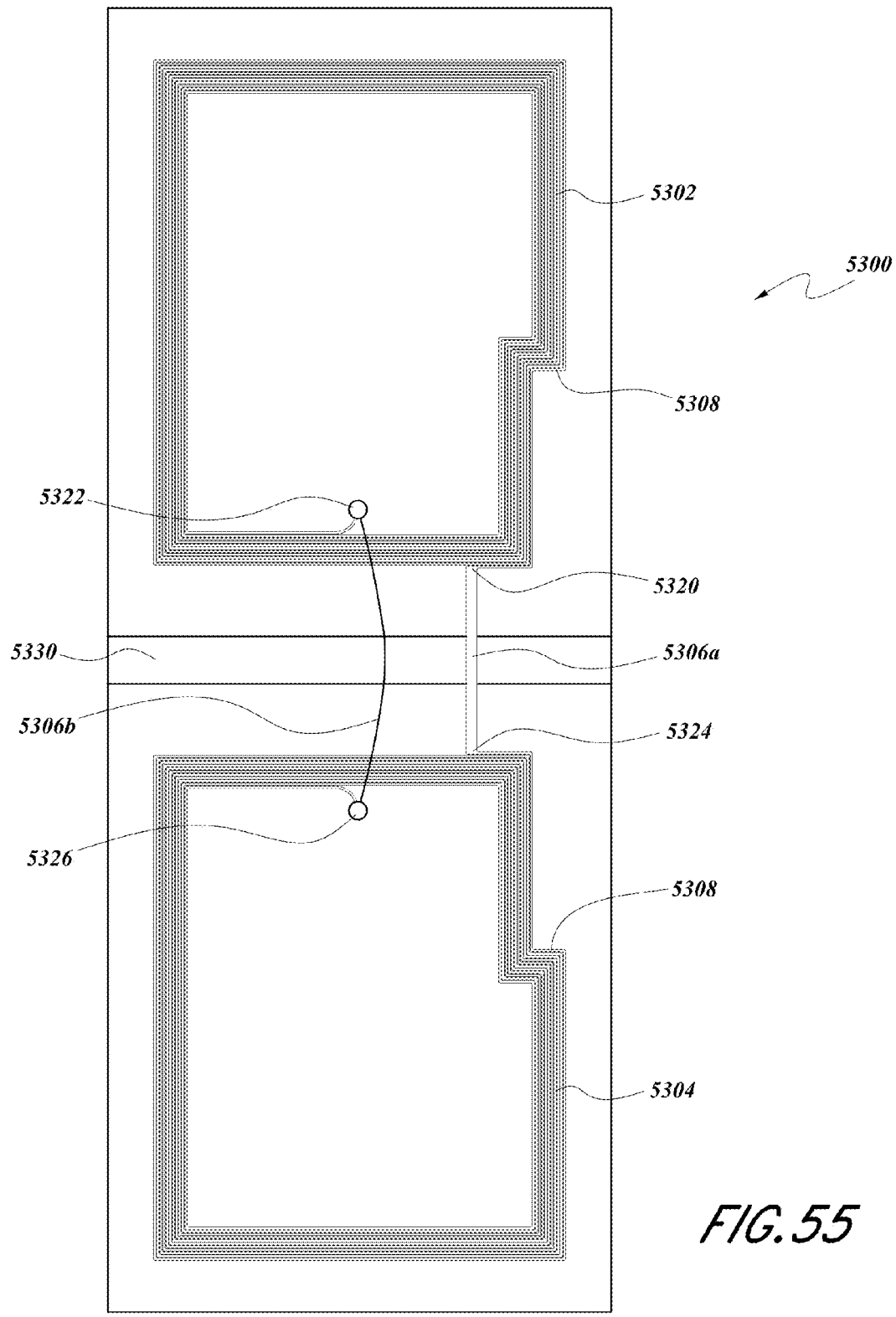
FIG. 55 illustrates an example embodiment of a repeater antenna.

FIG. 55 shows an example embodiment of a repeater antenna 5300 laid flat. The repeater antenna 5300 has a first antenna 5302 (e.g., a coil antenna) and a second antenna 5304 (e.g., a coil antenna). The first antenna 5302 and the second antenna 5304 can be electrically connected (e.g., by two wires 5306a and 5306b).

In one or both of the first antenna 5302 and the second antenna 5304, rectangular spiral-shaped conductor patterns of one or more turns are provided in at least one layer. The repeater antenna 5300 can be formed on a printed circuit, e.g., a printed flexible circuit. The printed flexible circuit can include one or more conductive layers (e.g., layer 5202 of FIG. 52) disposed between insulator layers (e.g., layers 5204 and 5206 of FIG. 52). Insulating material can be disposed between coils of the antennas 5302 and 5304. The printed circuit can include one layer, or multiple layers of conductive material, which can form one or both of the antennas 5302 and 5304. When there are multiple conductive layers formed in either the first coil antenna 5302 or the second coil antenna 5304, the coil (e.g., rectangular spiral-shaped) of conductor patterns of the layers are connected through an interlayer connection conductor so that the directions of induced currents generated owing to the passage of magnetic fluxes or electro-magnetic field waves in a same direction are aligned in a same direction.

As illustrated in FIG. 55, the first antenna 5302 can have two end portions 5320 and 5322 and the second antenna 5304 has two end portions 5324 and 5326. The two end portions 5320 and 5322 of the first antenna 5302 can be electrically connected to the end portions 5324 and 5326 of the second antenna 5304 (e.g., in parallel). As such, a communication signal or wireless power received by any of the first antenna 5302 and the second antenna 5304 can be relayed to the other of the first antenna 5302 and the second antenna 5304 via the wires 5306a and 5306b. In some embodiments, as shown in FIG. 55, the end portion 5320 of the first antenna 5302 electrically connects to the end portion 5324 of the second antenna 5304 via the conductor 5306a. The conductor 5306a can be a conductive material on the printed circuit that is in the same layer as the conductive material forming one or both of the antennas 5302 and 5304. Thus the electrical connection 5306a can be formed as part of the printed circuit (e.g., the flexible printed circuit). The end portion 5322 of the first antenna 5302 can be electrically connected to the end portion 5326 of the second antenna 5304, e.g., via the wire 5306b. The wire 5306 can be in a layer or plane that is different than the layer of conductive material used to form one or both of the antennas 5302 and 5304. For example, the wire 5306b can be external to the structure of the printed circuit, and the printed circuit can include interconnection structures (e.g., vias) to provide electrical connection between the wire 5306b and the ends 5322 and 5326 of the antennas 5302 and 5304. In a multi-layer printed circuit, the electrical connections 5306a and 5306b can both be formed on the printed circuit (e.g., on different conductive layers).

In some embodiments, the repeater antenna 5300 can have a structure that is flexible and bendable, e.g., such that the first antenna 5302 can be mounted onto any surface of a host (e.g., a battery or a back plane of a protective case near a mobile device antenna) and the second antenna 5304 can be aligned so that the first and second antennas 5302 and 5304 are not parallel and/or are not disposed in substantially the same plane. In one example implementation, the first antenna 5302 can be mounted inside a protective case such that the first antenna 5302 is positioned sufficiently near a mobile device such that the first antenna 5302 can send or receive wireless signals (e.g., Near Field Communication signals) to or from the mobile device. The second antenna 5304 can be mounted along or near an external wall of the protective case (e.g., on an inside portion of the well) to extend the communication range beyond a thickness of the protective case. In some embodiments, the structure of the repeater antenna 5300 is partially flexible such that only a part of the repeater antenna 5300 can be flexibly mounted on to any internal or external surface of a mobile device peripheral (e.g., a protective case). In one example implementation, the second antenna 5304 can be fixed into or embedded into an external wall of an external protective case.

The repeater antenna 5300 can include a flexible portion 5330. For example the flexible portion 5330 can include the insulating layers 5204 and 5206. In some embodiments, the flexible portion 5330 can include fewer layers than the structure of the repeater antenna 5300 that is at the first and second antennas 5302 and 5304. For example, the structure of at the first and second antennas 5302 and 5304 can include the layers shown in FIG. 52. In some embodiments, the ferrite layer 5210, the insulator layer 5214, the adhesive layer 5208, and/or the adhesive layer 5212 can be omitted for the flexible portion 5330 of the repeater antenna 5300. In some embodiments, the same insulator layers 5202 and 5204 can extend across the first antenna 5302 and the second antenna 5304. The first antenna 5302 and the second antenna 5304 can include separate ferrite layers 5210, separate insulator layers 5214, and/or separate adhesive layers 5208 and 5212.

Many alternative structures are possible. For example, repeater antenna 5300 can have the first antenna 5302 formed on a first printed circuit or disposed on a first substrate or insulating film, and the second antenna 5304 can be formed on a second printed circuit or disposed on a second substrate or insulating film. The first antenna 5302 and the second antenna 5304 can be connected by two wires 5306a and 5306b. In some embodiments, both the first printed circuit, substrate or insulating film and the second printed circuit, substrate or insulating film can be disposed on a base film or substrate, which can be flexible. The insulating films may be formed of a flexible insulating film such as a polyimide film or a polyester film. The antennas 5302 and 5304 may be formed on top of the insulation films or substrates. In one implementation, at least one of the antennas 5302 and 5304 can be embedded into insulating films, respectively, so that the top surface and the bottom surface of the embedded antenna are physically isolated from an outside environment.

In some embodiments of the repeater antenna 5300, the first antenna 5302 can have a first resonant frequency f1 and the second coil antenna 5304 can have a second resonant frequency f2. The first resonant frequency f1 may be the same as the second resonant frequency f2 so that a communication signal or wireless power can be efficiently relayed between the two antennas 5302 and 5304. In one implementation, the first resonant frequency f1 is substantially the same as a resonant frequency of a mobile device antenna such that the first antenna 5302 can efficiently receive a communication signal or wireless power from the mobile device antenna. In another implementation, the second resonant frequency f2 can be substantially the same as a carrier frequency of a communication signal or wireless power that it receives such that it can efficiently receive the communication signal or wireless power.

Figure 56:
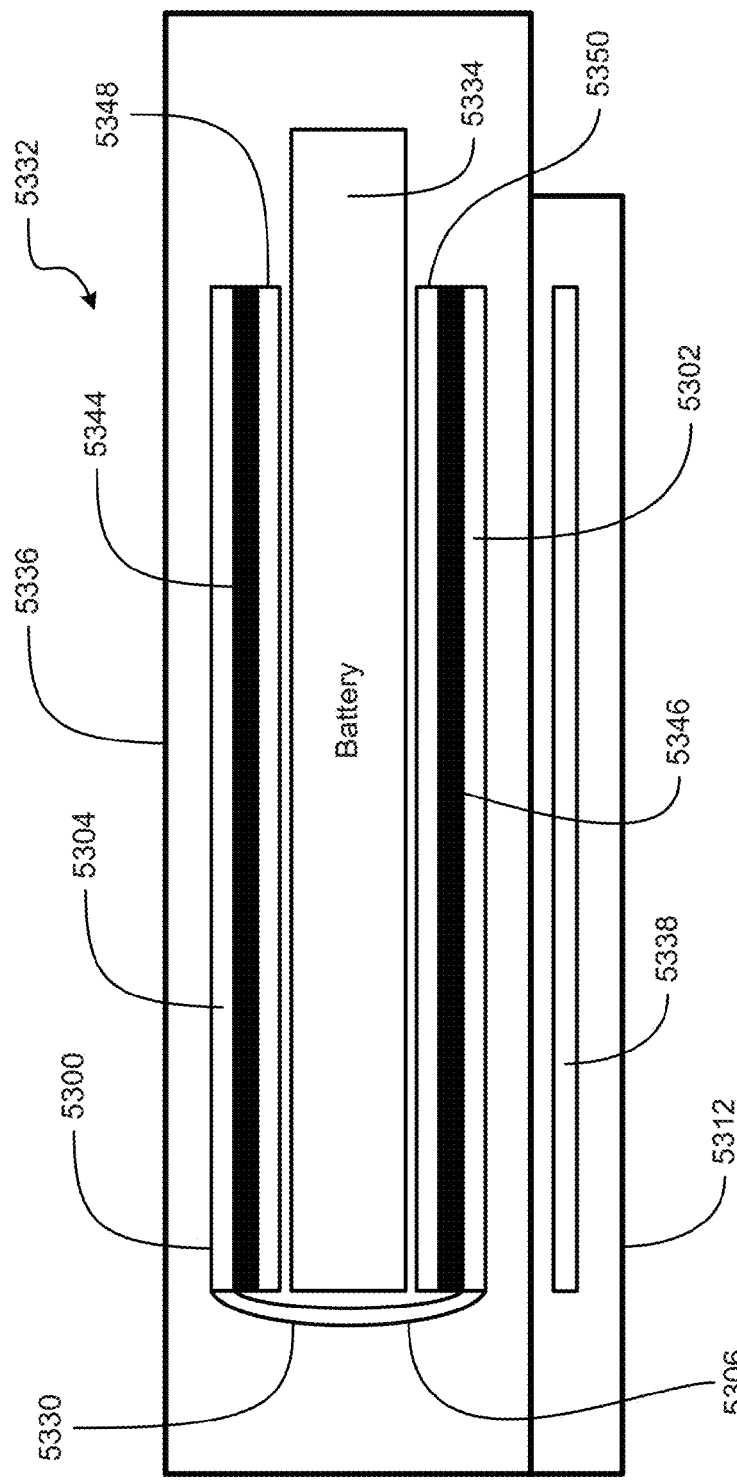
FIG. 56 illustrates an example embodiment of a repeater antenna incorporated into a case for a mobile device.
Figure 57:
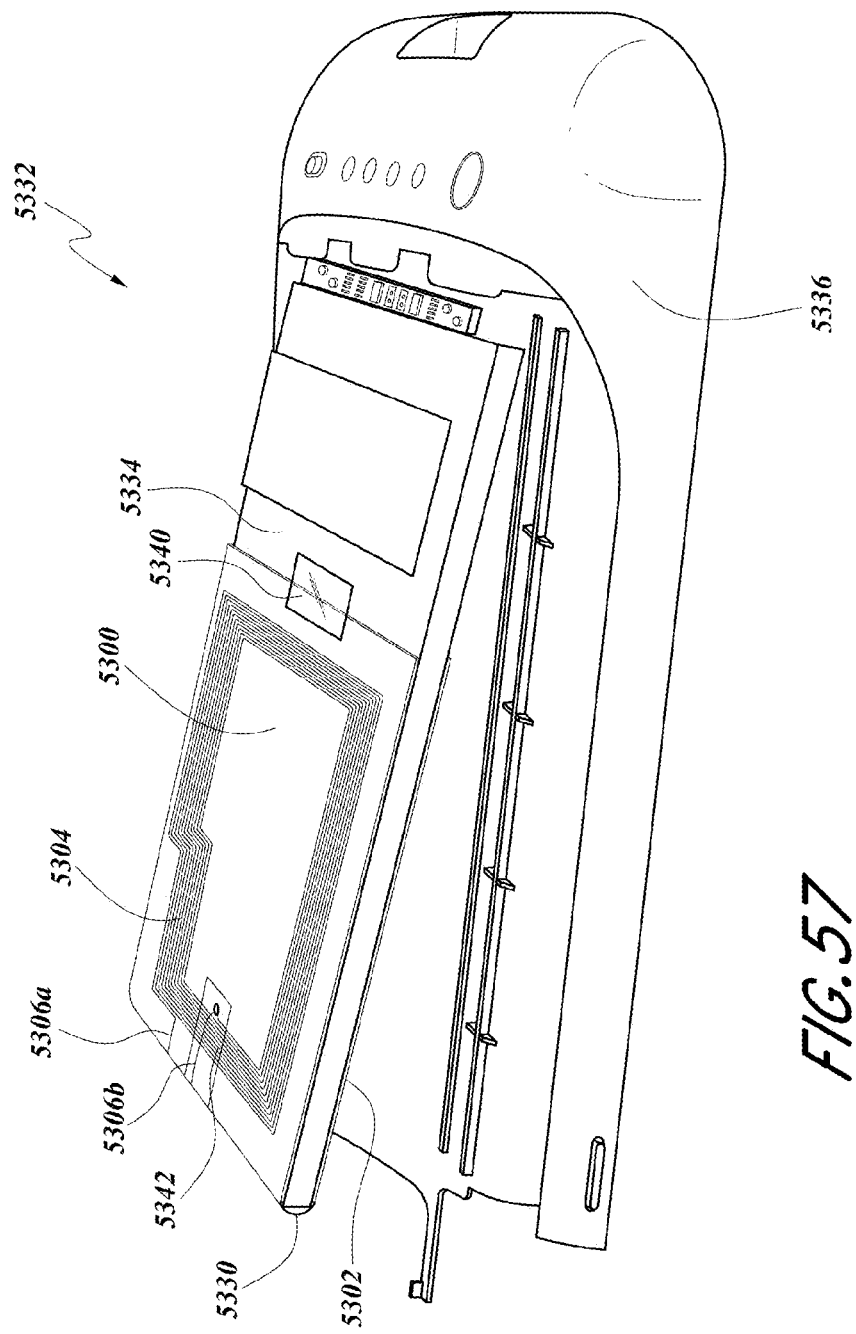
FIG. 57 shows a perspective view of an example embodiment of a repeater antenna incorporated into a case for a mobile device.

FIG. 56 schematically shows an example embodiment of the repeater antenna 5300 incorporated into a mobile device peripheral (e.g., a protective case). FIG. 57 shows a perspective view of a repeater antenna 5300 incorporated into a protective case 5332. In some embodiments, the repeater antenna 5300 can be saddled on a battery 5334. Though FIGS. 56 and 57 show a battery 5334 disposed between the two antennas 5302 and 5304, those of skill in the art will appreciate that other objects may disposed between the antennas 5302 and 5304 instead of the battery 5334. For example, a processor or other circuitry for the protective case 5332 can be disposed between the antennas 5302 and 5304. In some cases, an air gap or a filler material (e.g., plastic) can be disposed between the antennas 5302 and 5304.

The case 5332 can include a housing 5336, which can be configured to couple to a mobile electronic device 5312, as discussed herein. The case 5332 can include a battery 5334 and can be configured to charge the mobile device 5312 (e.g., providing power to the mobile device 5312 or recharging a battery of the mobile electronic device). The mobile device can include a mobile device antenna 5338, which can be configured to send and/or receive local wireless communication signals (e.g., Near Field Communication signals).

The first antenna 5302 may be disposed on a first side of the battery 5334 and the second antenna 5304 may be disposed on a second side of the battery 5334. The first antenna 5302 may be positioned at a location on the case 5332 (e.g., inside the housing 5336) such that the first antenna 5302 can receive or send a local wireless communication signal (e.g., a NFC signal) from or to the antenna 5338 of the mobile electronic device 5312 when the mobile electronic device 5312 is coupled to the case 5332. For example, the first antenna 5302 can be positioned a distance of less than or equal to about 3 centimeters, less than or equal to about 2 centimeters, less than or equal to about 1 centimeter, less than or equal to about 0.5 centimeters, less than or equal to about 0.25 centimeters, less than or equal to about 0.1 centimeters, or less. The distance between the first antenna 5302 and the antenna 5338 of the mobile device 5312 can be at least about 0.05 centimeters, at least about 0.075 centimeters, at least about 0.1 centimeters, at least about 0.25 centimeters, at least about 0.5 centimeters, at least about 1 centimeter or more, so long as the distance is sufficiently small to allow the antenna 5338 to communicate with the antenna 5302.

An electrical connection 5306 can electrically couple the first antenna 5302 to the second antenna 5304 and can relay signals (e.g., NFC signals) from the first antenna 5402 to the second antenna 5404. The electrical connection 5306 may also relay signals (e.g., NFC signals) from the second antenna 5304 to the first antenna 5302. The second antenna 5304 may re-transmit signals (e.g., NFC signals) that were relayed, via the electrical connection 5306, from the first antenna 5302. The first antenna 5302 may also re-transmit signals (e.g., NFC signals) that were relayed, via the electrical connection 5306, from the second antenna 5304.

With reference to FIG. 57, in some embodiments, the first antenna 5302 can be on a first (e.g., forward) side of the battery 5334, and the second antenna 5304 can be on a second (e.g., rear) side of the battery 5334. FIG. 57 shows a portion of the case 5332 laying face-down with a cover in an open configuration to expose the inside of the housing 5336. In FIG. 57, the battery 5334 is shown lifted slightly for ease of illustration, but when the housing is closed, the battery 5334 can sit flat inside the housing 6336. One or both of the antennas 5302 and 5304 can be attached to the batter 5334, e.g., using tape 5340 or a different suitable coupling mechanism. Many alternatives are possible. For example, the first antenna 5302 can be attached to the back side of the front wall of the housing 5336, e.g., using tape or other suitable coupling mechanism. The second antenna 5304 can be attached to the front side of the back wall of the housing 5336, e.g., using tape or other suitable coupling mechanism. In some embodiments, an insulating material 5342 (e.g., tape or a plastic material) can be disposed over the wire 5306b.

With reference to FIG. 56, the repeater antenna 5300 can include one or more ferrite layers disposed between the antennas 5302 and 5304. For example, a first ferrite layer 5344 can be disposed under the first antenna 5302 (e.g., between the antenna 5302 and the battery 5334 or between the antennas 5302 and 5304). A second ferrite layer 5346 can be disposed under the second antenna 5304 (e.g., between the antenna 5304 and the battery 5334 or between the antennas 5302 and 5304). The repeater antenna 5300 can include one or more insulating layers disposed between the antennas 5302 and 5304. For example, a first insulating layer 5348 can be disposed under the first antenna 5302 (e.g., between the antenna 5302 and the battery 5334, between the first ferrite layer 5344 and the battery 5334, or between the antennas 5302 and 5304). A second insulating layer 5350 can be disposed under the second antenna 5304 (e.g., between the antenna 5304 and the battery 5334, between the second ferrite layer 5346 and the battery 5334, or between the antennas 5302 and 5304). In some embodiments, one or more of the ferrite layers 5344 and 5346 and/or the insulating layers 5348 and 5350 can be omitted.

Figure 58:
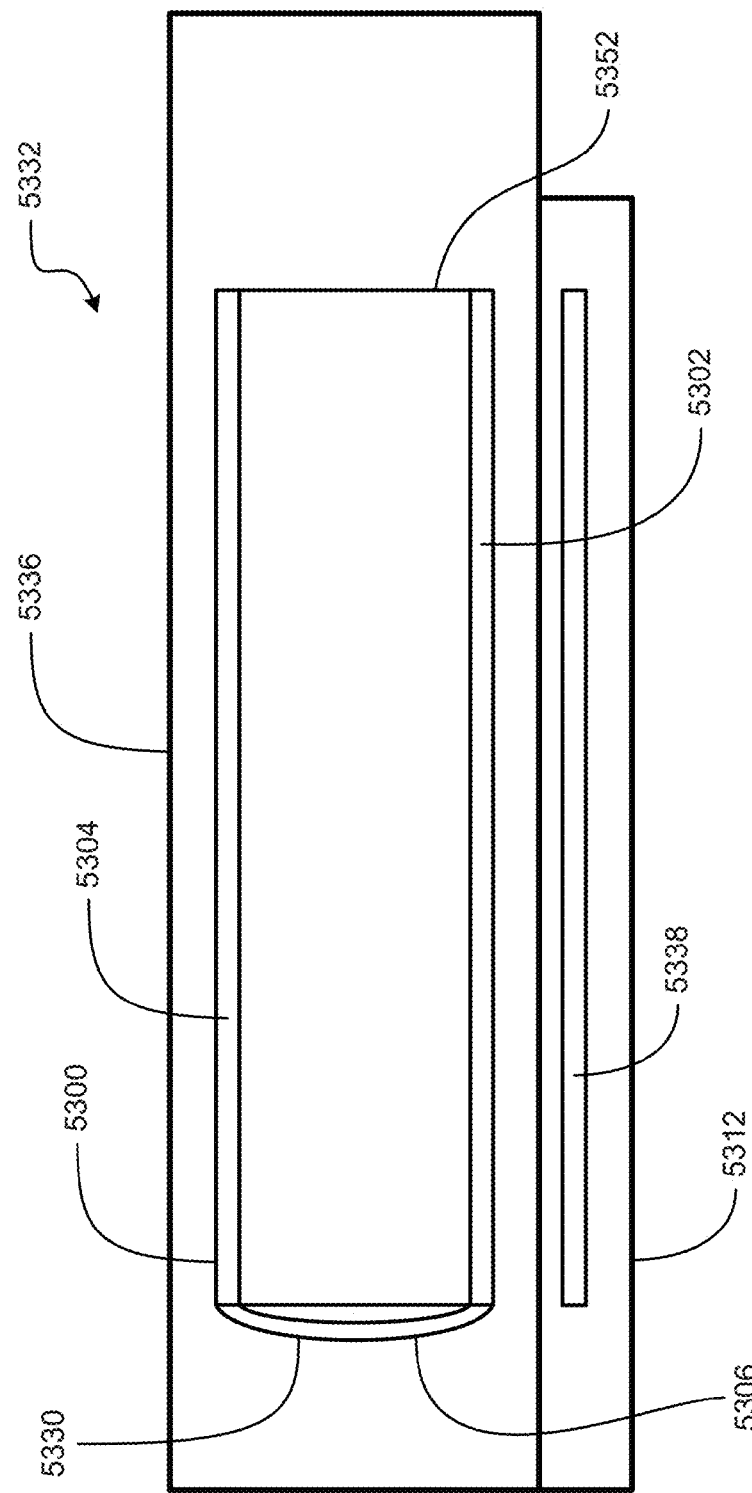
FIG. 58 shows another example embodiment of a repeater antenna incorporated into a case for a mobile device.

FIG. 58 is another example embodiment of a repeater antenna 5300 incorporated into a case 5332 for a mobile device 5312. As shown in FIG. 58, in some embodiments, a single insulating layer 5352 can be disposed between the antennas 5302 and 5304. The layer 5352 can be a spacer layer that is configured to position the second antenna 5304 at or near the back of the housing 5336. The antennas 5302 and 5304 can be attached to the insulating layer 5352, e.g., using tape or other suitable coupling mechanism. In some embodiments, the insulating layer 5352 can be a substrate onto which the first and second antennas 5302 and 5304 can be formed. Though FIG. 58 shows the single piece insulation 5352 disposed between the two antennas 5302 and 5304, those of skill in the art will appreciate that more than one insulation object may replace the insulation object 5352 and be disposed between the antennas 5302 and 5304. In some embodiments, one or more ferrite layers (e.g., layers 5344 and/or 5346 of FIG. 56) can be disposed between the antennas 5302 and 5304 and the insulating layer 5352.

Figure 59:
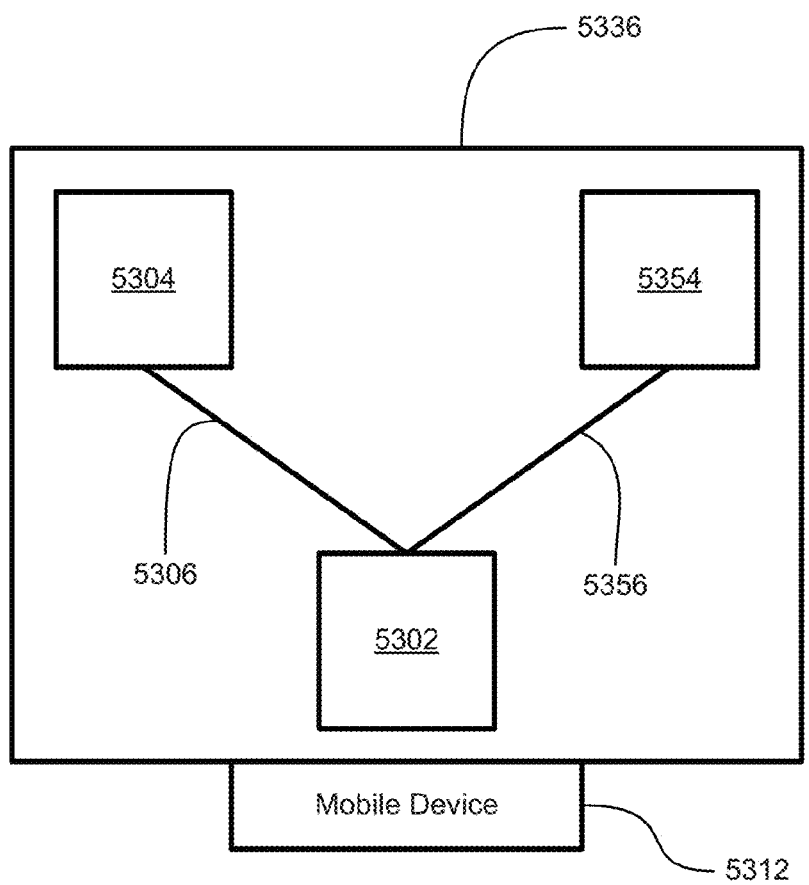
FIG. 59 illustrates an example embodiment of a repeater antenna that includes three antennas.

FIG. 59 is example embodiment of a repeater antenna 5300 that includes more than three or more antennas. A first antenna 5302 can be positioned to be in communication with an antenna on the mobile device 5312, as discussed herein. The second antenna 5304 can be positioned at a first portion of the case housing 5336, and a third antenna 5354 can be positioned at a second portion of the case housing 5336. The second antenna 5304 can be electrically coupled to the first antenna 5302 by one or more electrical connections 5306, and the third antenna 5354 can be coupled to the first antenna 5302 by one or more electrical connections 5356. Thus a signal received by the first antenna 5302 (e.g., from the mobile device 5312) can be relayed to both the second antenna 5304 and the third antenna 5354, which can re-transmit the signal. A signal received by either the second antenna 5304 and the third antenna 5354 can be relayed to the first antenna 5302, which can re-transmit the signal to the mobile device 5312. Thus, the case can be configured to send or receive signals (e.g., NFC signals) at both the first location and the second location on the housing 5336. Additional antennas can be added similar to the third antenna 5354.

Many variations are possible. In some embodiments, the second antenna 5304 can be positioned in a second peripheral device (e.g., headphones), as discussed herein. In some embodiments, the third antenna 5354 can be positioned in a third peripheral device. In some embodiments, a power source, e.g., a battery (not shown) of the case can amplify a signal, as discussed herein.

Figure 60:
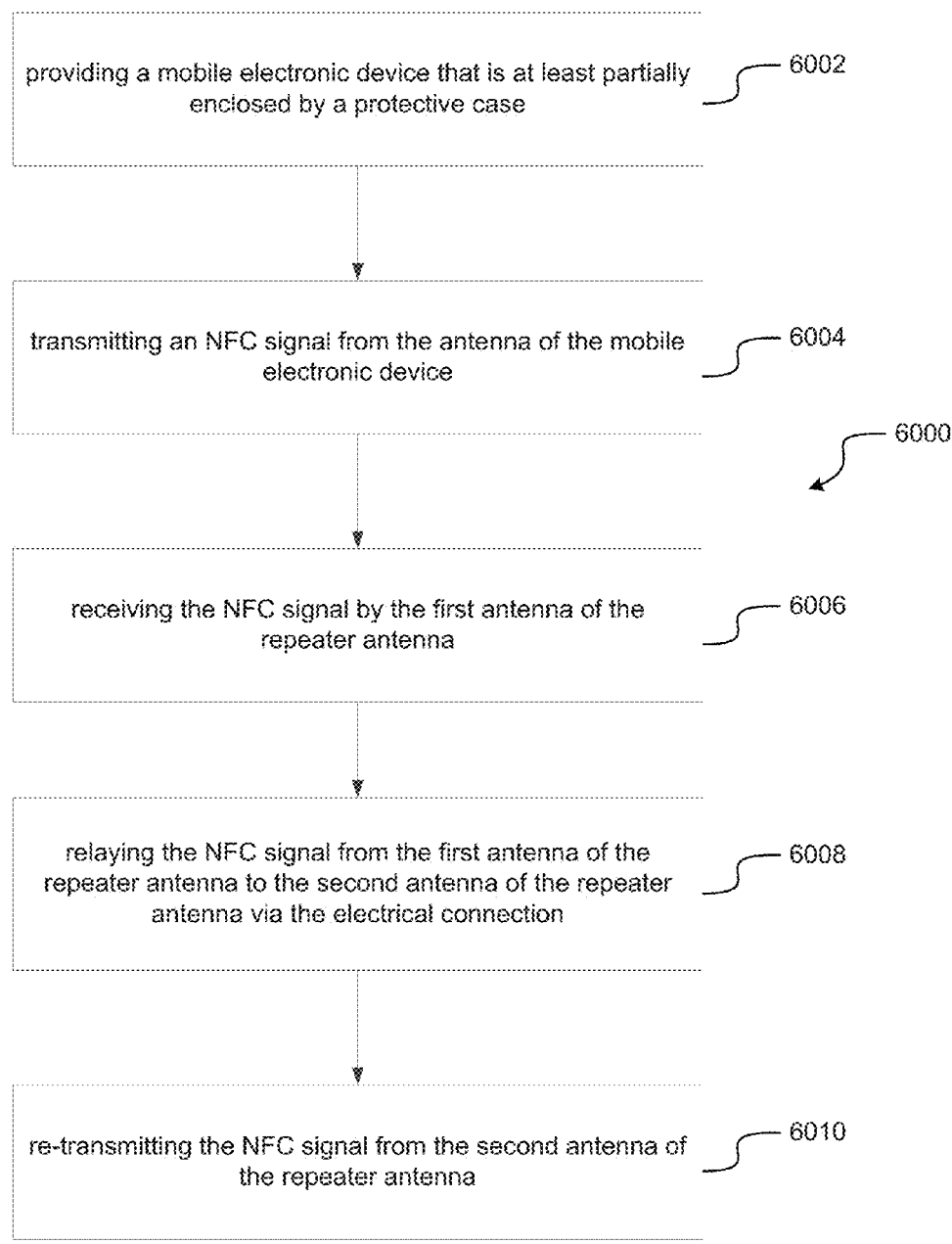
FIG. 60 is a flowchart of an example method for transmitting a local wireless signal from a mobile device.

FIG. 60 is flowchart showing an example method 6000 of transmitting a wireless signal (e.g., a Near Field Communication (NFC) signal) from a mobile electronic device that is at least partially enclosed by a protective case. At block 6002, the mobile electronic device and case are provided. For example, a user can pick up, or otherwise access the mobile device and case. The mobile electronic device may comprise a battery and an antenna configured to transmit local wireless signals (e.g., Near Field Communication (NFC) signals). The protective case can include a supplemental battery, which can be configured to charge the mobile electronic device, as discussed herein. The protective case may include a repeater antenna that includes a first antenna (e.g., the first antenna 5302) disposed on a first side of the supplemental battery, a second antenna (e.g., the second antenna 5304) disposed on a second side of the supplemental battery, and an electrical connection that electrically couples the first antenna to the second antenna.

At block 6004, the method continues by transmitting a local wireless signal (e.g., an NFC signal) from the antenna of the mobile electronic device. The supplemental battery 5602 can be positioned to block or otherwise impede the signal from the mobile device. At block 6006, the method continues by receiving the local wireless signal by the first antenna of the repeater antenna. At block 6008, the method continues by relaying the local wireless signal from the first antenna of the repeater antenna to the second antenna of the repeater antenna via the electrical connection. At block 6010, the method continues by re-transmitting the local wireless signal from the second antenna of the repeater antenna.

Figure 61:
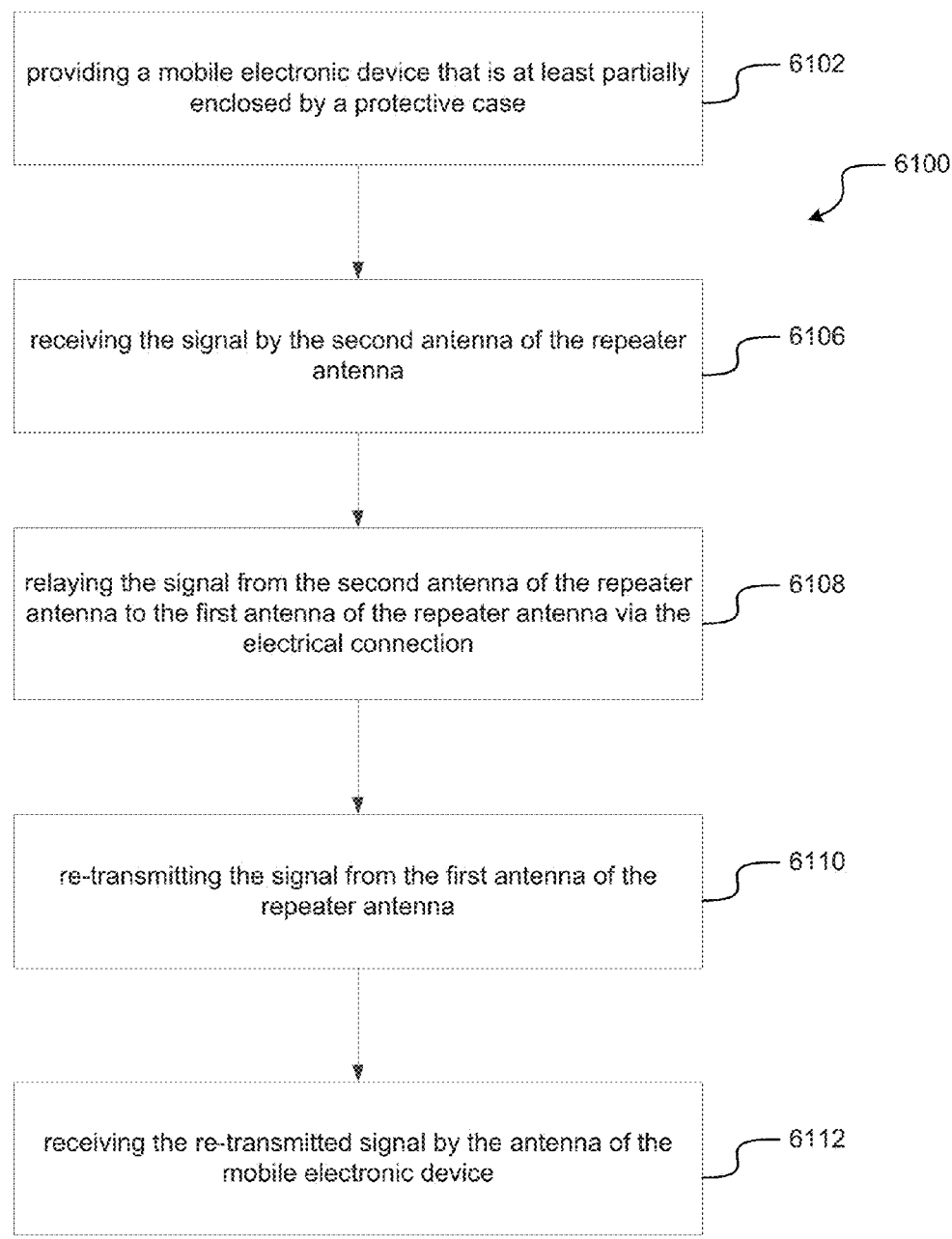
FIG. 61 is a flowchart of an example method for receiving a local wireless signal by a mobile device.

FIG. 61 is flow chart that illustrates an example method 6100 of receiving a wireless signal (e.g., a Near Field Communication (NFC) signal) by a mobile electronic device that is at least partially enclosed by a protective case. At block 6102, the mobile electronic device and case are provided. For example, a user can pick up, or otherwise access the mobile device and case. The mobile electronic device may comprise a battery and an antenna configured to transmit local wireless signals (e.g., Near Field Communication (NFC) signals). The protective case can include a supplemental battery, which can be configured to charge the mobile electronic device, as discussed herein. The protective case may include a repeater antenna that includes a first antenna (e.g., the first antenna 5302) disposed on a first side of the supplemental battery, a second antenna (e.g., the second antenna 5304) disposed on a second side of the supplemental battery, and an electrical connection that electrically couples the first antenna to the second antenna.

At block 6106, the method continues by receiving a local wireless signal (e.g., an NFC signal) by the second antenna of the repeater antenna. At block 6108, the method continues by relaying the local wireless signal from the second antenna of the repeater antenna to the first antenna of the repeater antenna via the electrical connection. At block 6110, the method continues by re-transmitting the local wireless signal from the first antenna of the repeater antenna. At block 6112, the re-transmitted signal can be received by the antenna on the mobile electronic device.

Wireless Charging

In some embodiments, the repeater antenna can be used for wireless charging of the mobile electronic device. Wireless charging pads can produce magnetic fields that induce a current in an inductor, and that induced current can be collected to charge a battery. An antenna can be used as an inductor. Some modern AC wireless charging stations operate at approximately 9 kilohertz (KHz), which can be a substantially lower frequency than Near Field Communication (NFC), which can coperate, for example, at about 13.56 megahertz (MHz) or Bluetooth, which can operate, for example, at about 2.4 gigahertz (GHz). In one embodiment, a protective case can include a repeater antenna to relay a signal for charging the mobile device, and in some cases a single repeater antenna can be used to both extend short-range communications from a mobile device and to wirelessly charge either the battery in the mobile device or an external battery incorporated in the protective case. Either a software or hardware solution could detect what type of signal the antenna is receiving and either decipher the signal as data or collect the signal as power. Some embodiments can use two separate antennas designed for two separate frequencies, with one antenna operating as a short-range communication repeater while a magnetic field from a charging pad induces current in a second antenna to charge a battery.

With reference to FIG. 56, by way of example, the mobile device 5312 can include a battery (not shown) that is coupled to the antenna 5338, and the mobile device 5312 can be configured to receive a signal (e.g., a magnetic field) and to use the signal to recharge the battery in the mobile device 5312. When the case 5332 is coupled to the mobile device 5312, in some embodiments, the case 5332 (e.g., the battery 5334 therein) can block or otherwise impede the charging signal from reaching the mobile device 5312. The second antenna 5304 can receive the charging signal (e.g., a magnetic field), and the charging signal can be relayed to the first antenna 5302 via the electrical connection 5306. For example, the magnetic field can induce a current of electricity. The first antenna 5302 can re-transmit the charging signal (e.g., magnetic field). For example, the first antenna 5302 can receive the induced current of electricity and can produce a magnetic field. The re-transmitted signal (e.g., magnetic field from the first antenna 5302) can be received by the antenna 5338 on the mobile device 5312 and can be used, for example, to recharge the battery on the mobile electronic device 5312. Many variations are possible, as will be understood to one of skill in the art based on the disclosure herein.

One or more of the features illustrated in the drawings and/or described herein may be rearranged and/or combined into a single component or embodied in several components. Additional components may also be added. While certain exemplary embodiments have been described and shown in the accompanying drawings, it is to be understood that such embodiments are merely illustrative of and not restrictive.

Thus, the inventions are not limited to the specific constructions and arrangements shown and described, since various other modifications may occur to those ordinarily skilled in the art based on the present disclosure.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Method step and/or actions disclosed herein can be performed in conjunction with each other, and steps and/or actions can be further divided into additional steps and/or actions.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA), or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine, etc. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

It is to be understood that the claims are not limited to the precise configuration and components illustrated above. Various modifications, changes and variations may be made in the arrangement, operation and details of the methods and apparatus described above.

What is claimed is:

1. A method of transmitting a near field communication (NFC) signal from a mobile electronic device that is at least partially enclosed by a protective case, the method comprising:
   providing a mobile electronic device that is at least partially enclosed by a protective case;
      wherein the mobile electronic device comprises a battery and an antenna configured to transmit near field communication (NFC) signals;
      wherein the protective case comprises a supplemental battery configured to charge the mobile electronic device;
      wherein the protective case comprises a repeater antenna that includes a first antenna disposed on a first side of the supplemental battery, a second antenna disposed on a second side of the supplemental battery, and an electrical connection that electrically couples the first antenna to the second antenna;
   transmitting an NFC signal from the antenna of the mobile electronic device using an NFC wireless communication protocol, wherein the supplemental battery is positioned to block the NFC signal;
   receiving the NFC signal by the first antenna of the repeater antenna;
   relaying the NFC signal from the first antenna of the repeater antenna to the second antenna of the repeater antenna via the electrical connection; and
   re-transmitting the NFC signal from the second antenna of the repeater antenna using the same NFC wireless communication protocol.

2. The method of claim 1, further comprising
   receiving an incoming NFC signal by the second antenna of the repeater antenna;
   relaying the incoming NFC signal from the second antenna of the repeater antenna to the first antenna of the repeater antenna via the electrical connection;
   re-transmitting the NFC signal from the first antenna of the repeater antenna; and
   receiving the re-transmitted signal by the antenna of the mobile electronic device.

3. A protective case for a mobile electronic device, the protective case comprising:
   a housing that includes a cavity configured to at least partially enclose a mobile electronic device that has an antenna for transmitting and receiving signals from a rear of the mobile electronic device, the housing comprising a back surface configured to be disposed rearward of the mobile electronic device, and the housing comprising an external wall disposed rearward of the back surface;
   a battery inside the housing such that the battery is configured to be disposed rearward of the mobile electronic device between the back surface and the external wall;
   a first antenna disposed on a first side of the battery between the back surface and the battery, the first antenna facing forward and configured to receive signals from, and transmit signals to, the antenna of the mobile electronic device;
   a second antenna disposed on a second side of the battery between the external wall and the battery, the second antenna facing rearward; and an electrical connection that electrically couples the first antenna to the second antenna, wherein the electrical connection is configured to communicate signals between the first antenna and the second antenna;

wherein the first antenna is configured to re-transmit the same signals, or amplified versions of the same signals, received by the second antenna, and wherein the second antenna is configured to re-transmit the same signals, or amplified versions of the same signals, received by the first antenna.

4. The protective case of claim 3, further comprising a mobile electronic device at least partially enclosed by the housing of the protective case.

5. The protective case of claim 4, wherein the mobile electronic device comprises:
an antenna for transmitting and receiving signals from a rear of the mobile electronic device;
a battery; and
a device interface;
wherein the protective case comprises an interface configured to couple to the device interface to provide an electrical connection for the battery of the protective case to charge the mobile electronic device.

6. The protective case of claim 4, wherein the mobile electronic device comprises a mobile phone or a tablet computer.

7. The protective case of claim 3, further comprising an interface configured to couple to a device interface on the mobile electronic device to provide an electrical connection for the battery of the protective case to charge the mobile electronic device.

8. The protective case of claim 3, wherein the first antenna and the second antenna are formed on a flexible printed circuit board.

9. The protective case of claim 3, further comprising:
a first ferrite layer disposed between the battery and the first antenna; and
a second ferrite layer disposed between the battery and the second antenna.

10. The protective case of claim 3, wherein the first antenna and the second antenna are configured to receive and transmit near field communication (NFC) signals.

11. A case for a mobile electronic device, the case comprising:
a housing configured to removably couple to a mobile electronic device, the housing comprising a back surface configured to be disposed rearward of the mobile electronic device, and the housing comprising an external wall disposed rearward of the back surface;
a battery inside the housing between the back surface and the external wall;
a first antenna inside the housing between the back surface and the battery; and
a second antenna inside the housing and spaced apart from the first antenna, the second antenna disposed between the battery and the external wall; and
a communication link between the first antenna and the second antenna;
wherein the first antenna is configured to emit a signal that is based at least in part on a signal received by the second antenna, or wherein the second antenna is configured to emit a signal that is based at least in part on a signal received by the first antenna, wherein the first antenna and the second antenna are configured to use the same wireless communication protocol.

12. The case of claim 11, further comprising an interface configured to couple to a device interface on the mobile electronic device to provide an electrical connection for the battery of the protective case to charge the mobile electronic device.

13. The case of claim 11, further comprising one or more insulating layers disposed between the first antenna and the second antenna.

14. The case of claim 13, further comprising one or more ferrite layers disposed between the first antenna and the second antenna.

15. The case of claim 11, further comprising:
one or more insulating layers disposed between the first antenna and the second antenna;
a first ferrite layer disposed between the one or more insulating layers and the first antenna; and
a second ferrite layer disposed between the one or more insulation layers and the second antenna.

16. The case of claim 15, wherein the battery is disposed between the first antenna and the second antenna, wherein the one or more insulation layers comprises a first insulating layer disposed between the battery and the first ferrite layer and a second insulating layer disposed between the battery and the second ferrite layer.

17. The case of claim 11, further comprising one or more ferrite layers disposed between the first antenna and the second antenna.

18. The case of claim 11, wherein the first antenna and the second antenna are positioned such that the first antenna is configured to be closer than the second antenna to the mobile electronic device.

19. The case of claim 11, wherein the battery is configured to amplify the signal emitted by the first antenna or the signal emitted by the second antenna.

20. The case of claim 11, wherein the first antenna and the second antenna are configured to relay a signal for charging the mobile electronic device.

21. The case of claim 20, further comprising a mobile electronic device coupled to the housing, wherein the mobile electronic device comprises:
a mobile device antenna;
a mobile device battery; and
an electrical connection between the mobile device antenna and the mobile device battery;
wherein the second antenna is configured to receive an input charging signal, wherein the first antenna is configured to emit an output charging signal based at least in part on the input charging signal, and wherein the mobile device antenna is configured to receive the output charging signal and to charge the mobile device battery via the electrical connection.

22. The case of claim 20, wherein the signal for charging the mobile electronic device comprises a magnetic field.

23. The case of claim 11, further comprising:
a third antenna; and
a communication link between the first antenna and the third antenna;
wherein the second antenna is configured to emit a signal that is based at least in part on a signal received by the first antenna, and wherein the third antenna is configured to emit a signal that is based at least in part on a signal received by the first antenna.

24. The case of claim 11, wherein the wireless communication protocol used by the first antenna and the second antenna is near field communication (NFC).

25. A peripheral for a mobile electronic device comprising:
a case configured to hold a mobile electronic device configured to transmit or receive a short-range wireless communication signal via a wireless communication protocol;
a battery disposed inside the case such that the battery blocks the short-range wireless communication signal from the mobile electronic device; and
a repeater antenna at least partially disposed inside the case, wherein the repeater antenna comprises a first antenna and a second antenna, wherein the first antenna is configured to receive or transmit the short-range wireless communication signal via the wireless communication protocol, wherein the second antenna is configured to transmit or receive the short-range wireless communication signal via the same wireless communication protocol, and wherein the battery is situated between the first antenna and the second antenna.

26. The peripheral of claim 25, wherein the repeater antenna comprises:
an electrical connection between the first antenna and the second antenna;
wherein the first antenna is configured to emit a signal that is based at least in part on a signal received by the second antenna, or wherein the second antenna is configured to emit a signal that is based at least in part on a signal received by the first antenna.

27. The peripheral of claim 25, wherein the wireless communication protocol is near field communication (NFC).

\* \* \* \* \*